United States Patent
Kang et al.

(10) Patent No.: US 12,181,206 B2
(45) Date of Patent: Dec. 31, 2024

(54) ELECTRIC APPARATUS AND CONTROL METHOD THEREOF

(71) Applicant: SAMSUNG ELECTRONICS CO., LTD., Suwon-si (KR)

(72) Inventors: Seungwan Kang, Suwon-si (KR); Kyungtae Ko, Suwon-si (KR); Sungho Cho, Suwon-si (KR); Daesung Ki, Suwon-si (KR); Chanyoung Park, Suwon-si (KR); Hyunuk Park, Suwon-si (KR); Taein Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 17/851,603

(22) Filed: Jun. 28, 2022

(65) Prior Publication Data

US 2023/0003075 A1    Jan. 5, 2023

Related U.S. Application Data

(63) Continuation of application No. PCT/KR2022/007111, filed on May 18, 2022.

(30) Foreign Application Priority Data

Jun. 30, 2021    (KR) ........................ 10-2021-0085747

(51) Int. Cl.
     *F25D 23/02*      (2006.01)
     *E05F 15/63*      (2015.01)
     *E05F 15/79*      (2015.01)

(52) U.S. Cl.
     CPC .............. *F25D 23/02* (2013.01); *E05F 15/63* (2015.01); *E05F 15/79* (2015.01);
     (Continued)

(58) Field of Classification Search
     CPC ....... E05F 15/614; E05F 15/07; E05F 15/619; E05F 15/616; E05F 2015/767;
     (Continued)

(56) References Cited

U.S. PATENT DOCUMENTS

| | | |
|---|---|---|
| 10,132,555 B2 | 11/2018 | Yasaka et al. |
| 10,197,326 B2 | 2/2019 | Son et al. |

(Continued)

FOREIGN PATENT DOCUMENTS

| | | |
|---|---|---|
| CN | 110411110 A | 11/2019 |
| JP | 2005-214490 | 8/2005 |

(Continued)

OTHER PUBLICATIONS

International Search Report dated Aug. 25, 2022 in International Patent Application No. PCT/KR2022/007111 (3 pages; 4 pages English translation).

(Continued)

*Primary Examiner* — Hiwot E Tefera
(74) *Attorney, Agent, or Firm* — STAAS & HALSEY LLP

(57) ABSTRACT

An electric apparatus and a control method thereof. The electronic apparatus including a housing; a first door rotationally arranged on one side of the housing; a second door rotationally arranged on the other side of the housing; a first motor operationally connected to the first door; a second motor operationally connected to the second door; a first motor driver electrically connected to the first motor; a second motor driver electrically connected to the second motor; and a processor electrically connected to the first motor driver and the second motor driver, wherein the processor may control the first motor driver to drive the first motor to close the first door at a time different than a time (Continued)

the second door that is connected to the second motor driven by the second motor driver closes.

22 Claims, 40 Drawing Sheets

(52) U.S. Cl.
CPC ..... *E05Y 2201/41* (2013.01); *E05Y 2400/326* (2013.01); *E05Y 2400/35* (2013.01); *E05Y 2900/31* (2013.01)

(58) Field of Classification Search
CPC ........ E05F 15/79; E05F 15/63; F25D 23/028; F25D 2323/024; F25D 2700/02; F25D 29/00; F25D 2700/04; F25D 23/02; E05Y 2900/31; E05Y 2201/426; E05Y 2201/434; E05Y 2400/44; E05Y 2201/43; E05Y 2400/32; E05Y 2201/71; E05Y 2201/46; E05Y 2201/41; E05Y 2400/326; E05Y 2400/35
See application file for complete search history.

(56) References Cited

U.S. PATENT DOCUMENTS

| | | | |
|---|---|---|---|
| 10,900,271 B2 | 1/2021 | Eom et al. | |
| 2012/0017512 A1* | 1/2012 | Lee | E05F 15/614 49/358 |
| 2015/0217631 A1 | 8/2015 | Warburton et al. | |
| 2017/0097185 A1* | 4/2017 | Yasaka | E05F 15/614 |
| 2017/0260794 A1* | 9/2017 | Son | E05F 15/619 |
| 2017/0261252 A1* | 9/2017 | Son | F25D 11/00 |
| 2017/0284144 A1* | 10/2017 | Yasaka | F25D 23/028 |
| 2017/0336132 A1* | 11/2017 | Chang | F25D 23/028 |
| 2018/0119475 A1* | 5/2018 | Kim | E05F 15/614 |
| 2018/0223582 A1* | 8/2018 | Shin | E05F 15/619 |
| 2018/0334846 A1* | 11/2018 | Eom | E05F 15/73 |
| 2019/0086141 A1* | 3/2019 | Kim | B21D 5/00 |
| 2020/0095818 A1* | 3/2020 | Lee | F25D 23/028 |
| 2020/0263918 A1 | 8/2020 | Lee et al. | |

FOREIGN PATENT DOCUMENTS

| | | | |
|---|---|---|---|
| JP | 2008256231 A | * | 10/2008 |
| JP | 2014-214893 | | 11/2014 |
| JP | 2015-114065 | | 6/2015 |
| JP | 6378950 B2 | | 8/2018 |
| KR | 20-0270001 Y1 | | 3/2002 |
| KR | 10-2007-0020705 A | | 2/2007 |
| KR | 10-1618552 | | 5/2016 |
| KR | 10-2017-0040738 | | 4/2017 |
| KR | 10-2018-0126271 | | 11/2018 |
| KR | 102076190 B1 | * | 2/2020 |

OTHER PUBLICATIONS

PCT/ISA/220 dated Aug. 25, 2022 in International Patent Application No. PCT/KR2022/007111 (2 pages).
Supplementary European Search Report dated Jul. 9, 2024 issued in European Application No. EP 22 83 3400.

* cited by examiner

FIG. 24
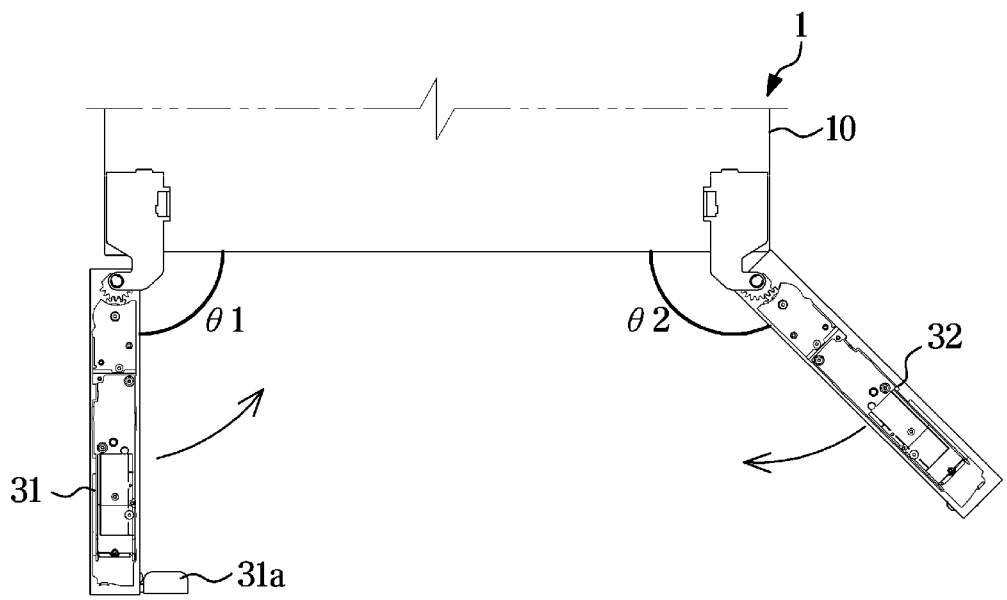
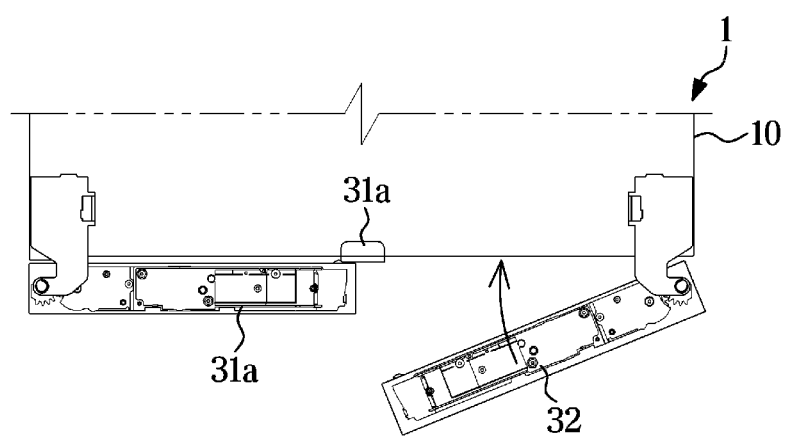

ELECTRIC APPARATUS AND CONTROL METHOD THEREOF

CROSS-REFERENCE TO RELATED APPLICATION

This application is a continuation application, under 35 U.S.C. § 111(a), of international application No. PCT/KR2022/007111, filed on May 18, 2022, which is claims priority under 35 U. S. C. § 119 to Korean Patent Application No. 10-2021-0085747 filed on Jun. 30, 2021, the disclosure of which is incorporated herein by reference in its entirety.

BACKGROUND

1. Field

The disclosure relates to an electric apparatus and control method thereof, and more particularly, to an electric apparatus capable of automatically opening or closing a door and a control method of the electric apparatus.

2. Discussion of Related Art

Various electric apparatuses with a door installed thereon are around today. It is common for electric apparatuses including a chamber to accommodate items to include a door. For example, refrigerators, washing machines, ovens, micro-ovens, garment care systems, dish washers, etc., include doors.

Further, it is also common for electric apparatuses including a passenger cabin to have a door. For example, a vehicle includes a door.

The doors of the electric apparatuses are usually opened or closed manually by the user.

However, when the user holds items with both hands to put the items into the chamber of the electric apparatus, the door may need to be opened automatically. In addition, when the door is not closed by the user or closed incompletely, the door may need to be closed automatically.

SUMMARY

According to an aspect of the disclosure, an electric apparatus includes a housing; a first door rotationally arranged on one side of the housing; a second door rotationally arranged on the other side of the housing; a first motor operationally connected to the first door; a second motor operationally connected to the second door; a first motor driver electrically connected to the first motor; a second motor driver electrically connected to the second motor; and a processor electrically connected to the first motor driver and the second motor driver. The processor may control the first motor driver to drive the first motor to close the first door at a time different than a time the second door that is connected to the second motor driven by the second motor driver closes.

According to an aspect of the disclosure, a control method of an electric apparatus including a housing, which includes receiving a signal to close both a first door rotationally arranged on one side of the housing and a second door rotationally arranged on another side of the housing; and controlling the first door to close at a time different than a time different time than a time the second door closes based on the signal.

According to an aspect of the disclosure, an electric apparatus includes a housing; a first door rotationally arranged on one side of the housing; a second door rotationally arranged on another side of the housing; a first motor operationally connected to the first door; a second motor operationally connected to the second door; a first motor driver electrically connected to the first motor; a second motor driver electrically connected to the second motor; and a processor electrically connected to the first motor driver and the second motor driver. The processor may control the first motor driver and the second motor driver to drive the first motor and the second motor to sequentially close the first and second doors based on a signal or determination to close both the first and second doors.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 24 illustrates an example of a refrigerator closing first and second doors opened at different angles, according to an embodiment of the disclosure;

DETAILED DESCRIPTION OF EXEMPLARY EMBODIMENTS

Figure 1:
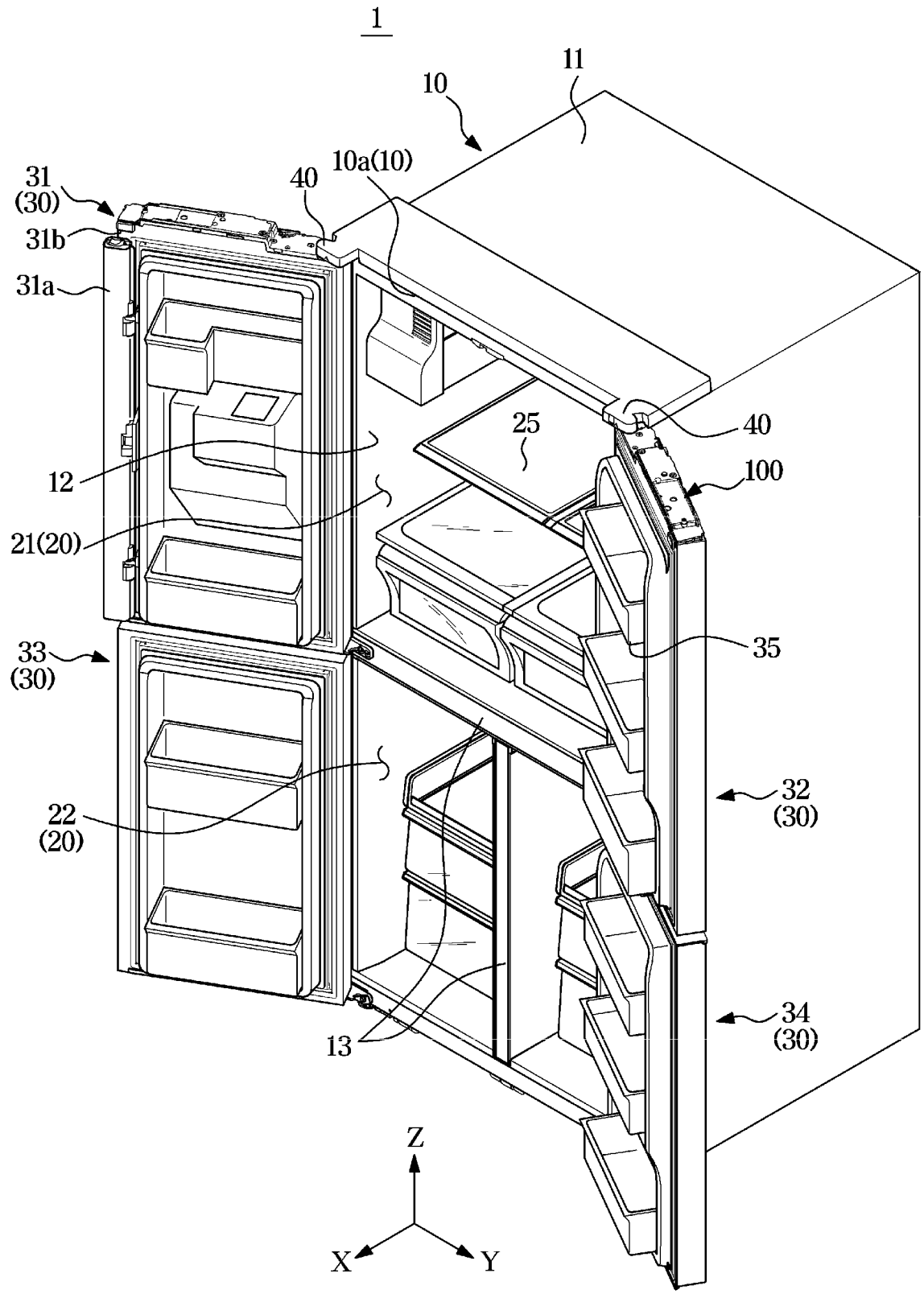
FIG. 1 illustrates an electric apparatus, according to an embodiment of the disclosure.

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it may be directly on/under the other member, or one or more intervening members may in addition be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise. Hereinafter, the operating principles and embodiments of the disclosure will be described with reference to the accompanying drawings.

Hereinafter, the operating principles and embodiments of the disclosure will be described with reference to the accompanying drawings.

The disclosure provides an electric apparatus capable of automatically opening or closing a door and a control method of the electric apparatus.

FIG. 1 illustrates an electric apparatus, according to an embodiment of the disclosure.

Referring to FIG. 1, a refrigerator 1 is illustrated as the electric apparatus. It is not, however, limited thereto, and the electric apparatus may include many different kinds of electric apparatuses, such as a refrigerator, a washing machine, an oven, a micro-oven, a garment care system, a dish washer, a vehicle, etc.

The refrigerator 1 may include a housing 10 defining a main body with a portion of the front side opened, a storeroom 20 arranged in the housing 10 with the front side opened, and a door 30 rotationally coupled to the housing 10 to open or close the open front of the storeroom 20.

The housing 10 may include an inner casing 12 forming the storeroom 20 and an outer casing 11 forming the external appearance. Insulation (not shown) may be foamed between the inner casing 12 and the outer casing 11 of the housing 10 to prevent cold air leak from the storeroom 20.

There may be a cold air supplier (not shown) arranged in the housing 10 for supplying cold air into the storeroom 20. The cold air supplier may include a compressor, a condenser, an expansion valve, an evaporator, a fan, a cold air duct, etc.

The storeroom 20 may be divided by a partition wall 13 into a first storeroom 21 and a second storeroom 22. A plurality of racks 25 may be arranged in the storeroom 20 and may divide each of the first and second storerooms 21 and 22 into multiple sections. The racks 25 may be removably mounted on projections (not shown) formed at the storeroom 20.

The door 30 may be coupled to hinges 40 fixed to the housing 10 to be rotated around a hinge shaft of the hinge 40. The hinges 40 arranged on left and right sides of the housing 10 at the same height may be integrally formed and may also constitute a portion of a housing front 10a. It is not, however, limited thereto, and the hinges 40 may be separately arranged. On the rear side of the door 30, a plurality of door guards 35 may be installed to contain e.g., foods.

A first door 31 and a second door 32 may open or close the first storeroom 21. A third door 33 and a fourth door 34 may open or close the second storeroom 22.

As shown in FIG. 1, the second storeroom 22 may be divided by a vertical partition wall 13 into two chambers while the first storeroom 21 may define an integral chamber. Hence, due to a gap between the first door 31 and the second door 32, the first storeroom 21 may not be completely shielded from the outside. To prevent this, a rotating bar 31a may be arranged at an edge 31b of the first door 31 to seal the gap between the first door 31 and the second door 32.

The rotating bar 31a may be arranged at an opposite edge to the hinge 40 of the first door 31, and may be rotated around the edge 31b of the first door 31. For example, while the first door 31 is closed, the rotating bar 31a may be unfolded toward a direction in which the first door 31 extends, to seal the gap between the first door 31 and the second door 32. While the first door 31 is opened, the rotating bar 31a may be folded in a direction perpendicular to the direction in which the first door 32 extends, to avoid interference with the second door 32.

The door 30 may be manually opened or closed by the user, or may be automatically opened or closed by the door opening/closing device 100. The door opening/closing device 100 may include a driving motor 110 (see FIG. 3) provided inside, and may open or close the door 30 by using power of the driving motor 110.

The door opening/closing apparatus 100 will now be described.

The door 30 as will be described below may include the first door 31, the second door 32, the third door 33, and the fourth door 34. The door opening/closing apparatus 100 may be arranged to correspond to all or some of the doors of the refrigerator 1. The refrigerator 1 may include a plurality of door opening/closing devices 100.

The following description will be focused on the door opening/closing device 100 for a door appearing to be positioned on the right-hand side when the refrigerator 1 is viewed from the front, but they may be equally applied to the door opening/closing apparatus 100 for a door positioned on the left-hand side when the refrigerator 1 is viewed from the front.

The door opening/closing device 100 may be arranged on one side of the door 30. Specifically, the door opening/closing device 100 may be arranged on the top of the door 30. However, it is not limited thereto. For example, the door opening/closing device 100 may be arranged on the bottom of the door 30.

Figure 2:
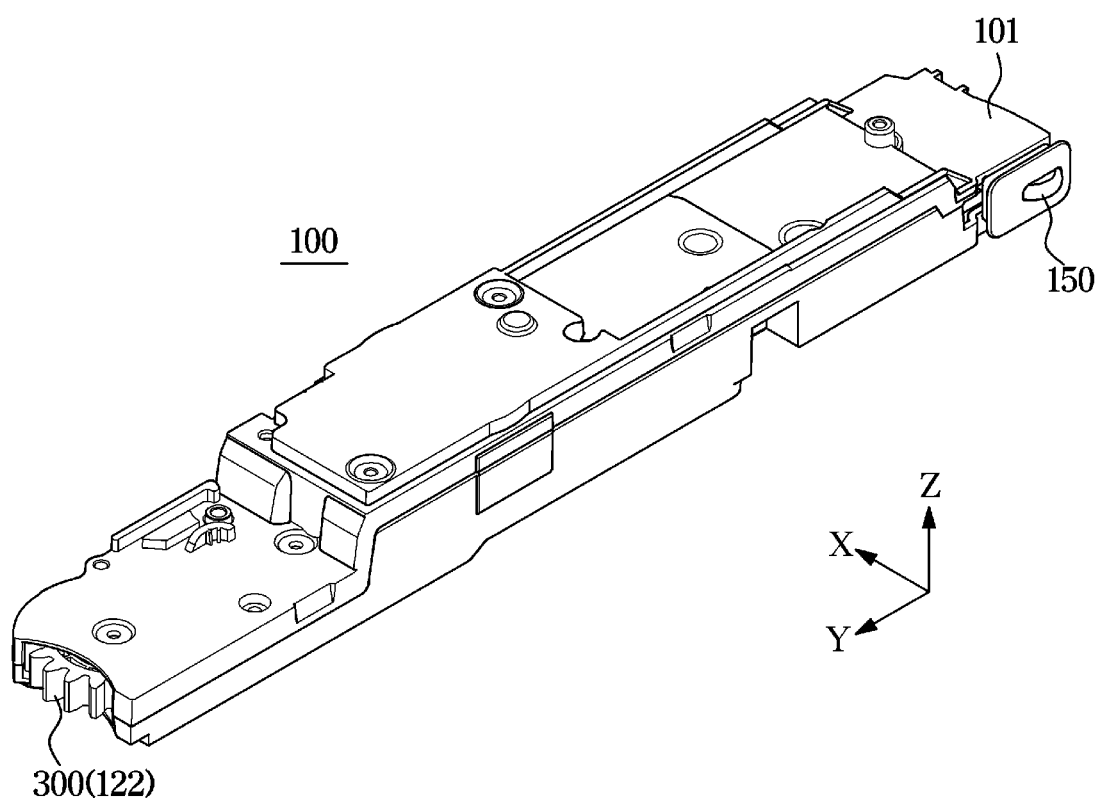
FIG. 2 illustrates a door opening/closing device, according to an embodiment of the disclosure.
Figure 3:
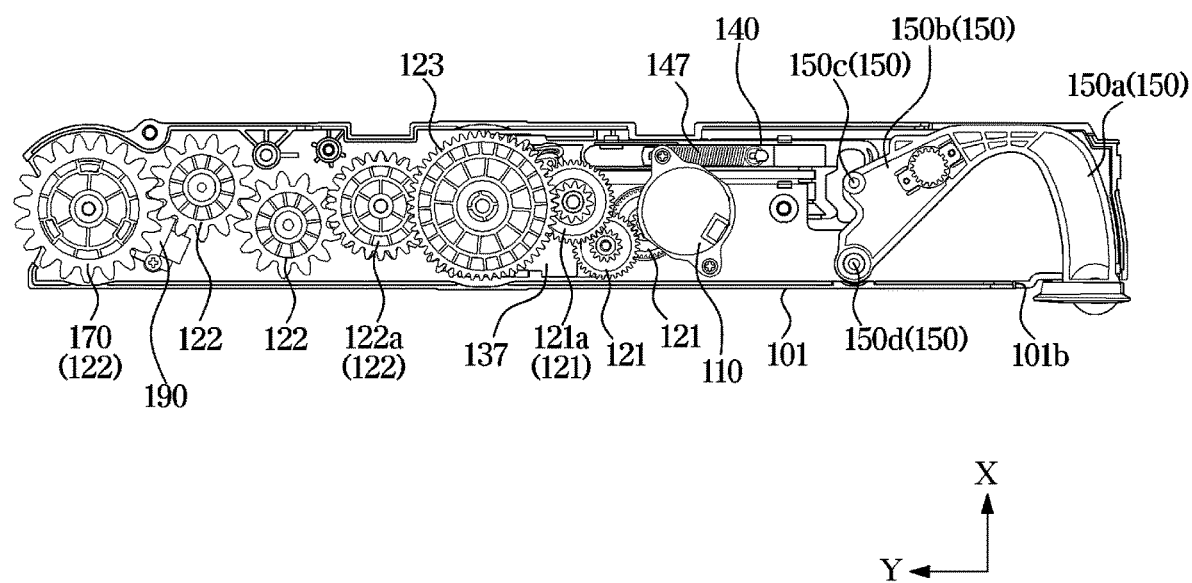
FIG. 3 is a top view of a door opening/closing device, according to an embodiment of the disclosure.
Figure 4:
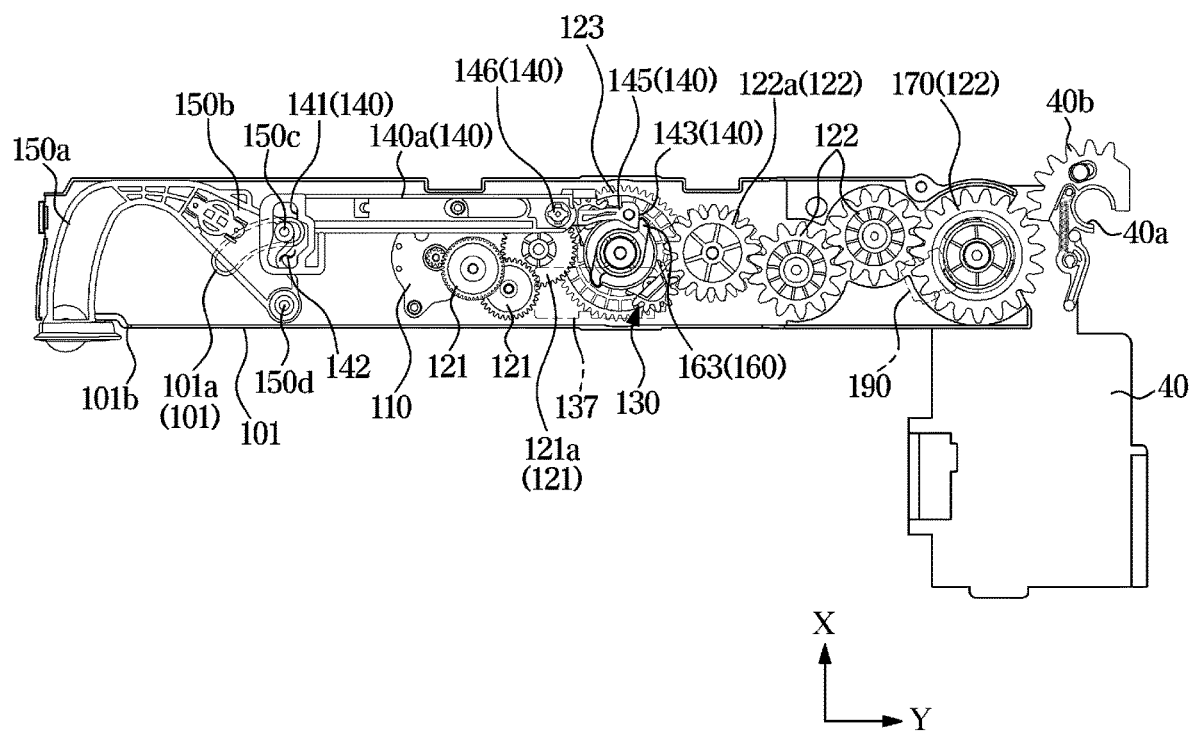
FIG. 4 is a bottom view of a door opening/closing device, according to an embodiment of the disclosure.
Figure 5:
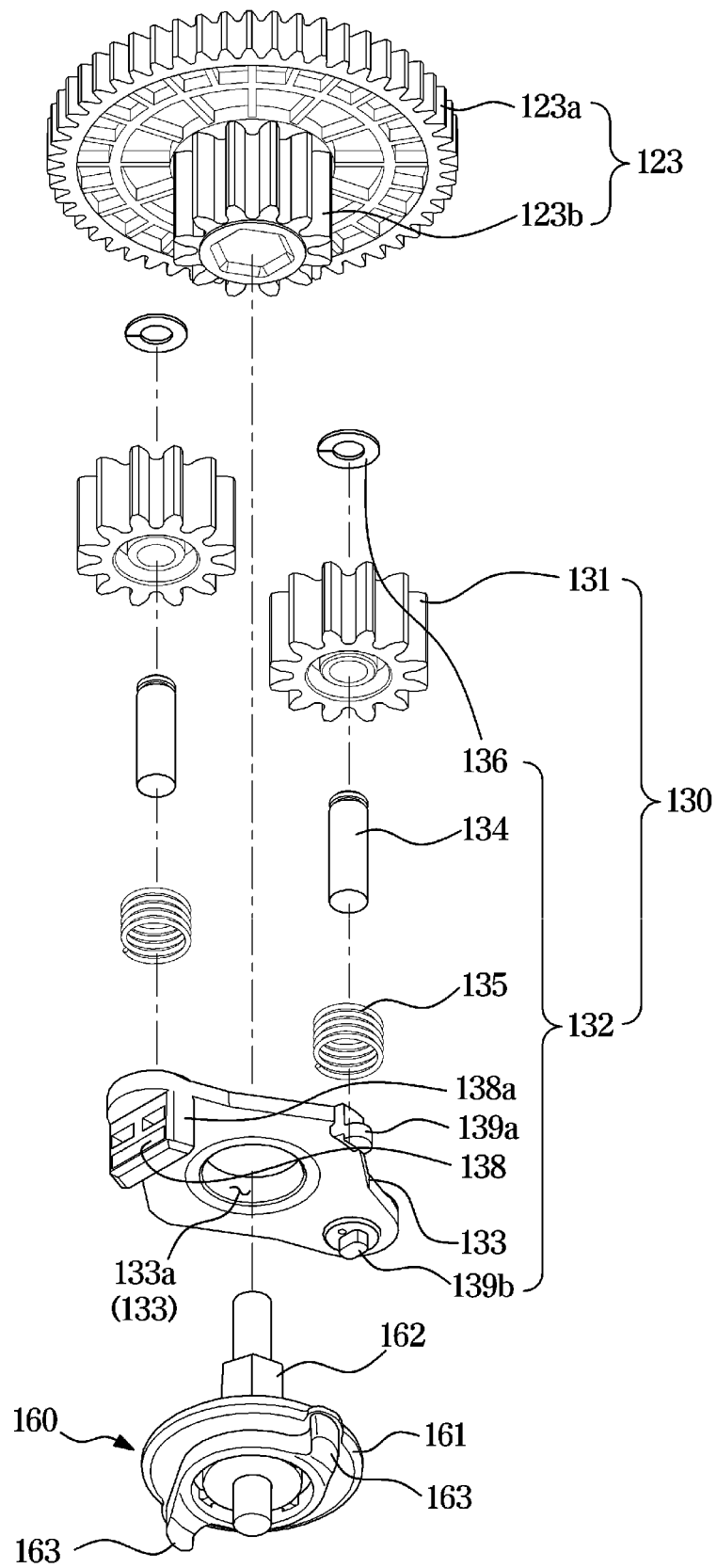
FIG. 5 is an exploded view of part of a door opening/closing device, according to an embodiment of the disclosure.

FIG. 2 illustrates a door opening/closing device, according to an embodiment of the disclosure. FIG. 3 is a top view of a door opening/closing device, according to an embodiment of the disclosure. FIG. 4 is a bottom view of a door opening/closing device, according to an embodiment of the disclosure. FIG. 5 is an exploded view of part of a door opening/closing device, according to an embodiment of the disclosure.

Referring to FIGS. 2 to 5, the door opening/closing device 100 may include a case 101 that defines the external appearance, the driving motor 110 arranged in the case 101 for outputting power to open or close the door 30, and a plurality of gears 121, 122, 123, and 131 arranged in the case 101 for delivering power of the driving motor 110 to a hinge shaft 40a.

An opening 101b may be formed on one side of the case 101, allowing a pusher 150a of a lever 150, which will be described later, to pass through and protrude outward from the case 101. The opening 101b may be formed on the rear side of the case 101 facing the front side of the housing 10. The driving motor 110 may be rotated in both directions, and may deliver power to a hinge gear 40b fixed to the hinge shaft 40a via the plurality of gears 121, 122, 123 and 131.

The hinge 40 may include the hinge shaft 40a and the hinge gear 40b. In this case, the hinge gear 40b may be securely fixed to the hinge shaft 40a, so that a gear 170 interlocked with the hinge gear 40b may be moved along teeth of the hinge gear 40b and rotated around the hinge shaft 40a when the gears 122 interlocked with the hinge gear 40b are rotated by the power of the driving motor 110. The door opening/closing device 100 and the door 30 may be rotated around the hinge shaft 40a as a rotation axis. The hinge-side gear 170 interlocked with the hinge gear 40b may be referred to as a terminal gear 170.

The door opening/closing device 100 may include a gear assembly 130 arranged between the driving motor 110 and the hinge 40 to intermittently deliver the power of the driving motor 110 to the hinge gear 40b. Furthermore, the door opening/closing device 100 may include the motor-side gears 121 that link the driving motor 110 and the gear assembly 130, and the hinge-side gears 122 that link the gear assembly 130 and the hinge gear 40b. In other words, the motor-side gears 121 and the hinge-side gears 122 may be linked via the gear assembly 130. Furthermore, the gear assembly 130 may control power delivered from the motor-side gears 121 to the hinge-side gears 122.

The gear assembly 130 may include a pair of clutch gears 131 coupled to and revolving around the center gear 123 linked to the driving motor 110 as one of the motor-side gears 121, and a support frame 132 for rotating the clutch gear 131 along the edges of the center gear 123 around a rotation axis of the center gear 123. The clutch gear 131 may correspond to a swing gear interlocked with and revolving around the center gear 123.

The center gear 123 may include a first gear part 123a in the form of a spur gear, and a second gear part 123b in the form of another spur gear with a smaller diameter than the first gear part 123a, and the first gear part 123a and the second gear part 123b may be integrally provided to have the same rotation axis. The center gear 123 may be rotated around the center axis as a rotation axis upon receiving the power of the driving motor 110 from the motor-side gear 121a interlocked with the first gear part 123a.

The rotation axis of the support frame 132 may be the same axis as the rotation axis of the center gear 123. The rotation axis of the support frame 132 may correspond to a revolution axis of the clutch gears 131 that revolve around the center gear 123.

One clutch gear 131 may be mounted at either end of the support frame 132. Specifically, the support frame 132 may include a plate 133 with a through hole 133a formed thereat, and a pair of clutch gear mounting shafts 134 arranged at both ends of the plate 133. The clutch gear mounting shaft 134 goes through the clutch gear 131 so that the clutch gear 131 may be rotationally coupled to the clutch gear mounting shaft 134.

The pair of clutch gear mounting shafts 134 may be arranged on the plate 133 and may have symmetry with respect to the rotation axis of the support frame 132. Accordingly, rotation axes of the pair of clutch gears 131 and the support frame 132 may be arranged on a straight line.

The support frame 132 may include a pair of pressure springs 135. The clutch gear mounting shaft 134 goes through the pressure spring 135 so that the pressure spring 135 may be coupled to the clutch gear mounting shaft 134, and may be placed between the plate 133 of the support frame 132 and the clutch gear 131. The pressure spring 135 may apply elastic force to the clutch gear 131 toward a direction in which the plate 133 and the clutch gear 131 grow distant from each other.

The support frame 132 may include a suppress member 136. The suppress member 136 may be arranged on an opposite side of the pressure spring 135 from the clutch gear 131 and coupled to the clutch gear mounting shaft 134, pressurizing the clutch gear 131. As shown in FIG. 5, the clutch gear 131 may be pressurized upward by the pressure spring 135 to closely contact the suppress member 136, thereby making a load in rotation of the clutch gear 131 around the clutch gear mounting shaft 134.

The clutch gears 131 may be interlocked with the center gear 123. Specifically, the clutch gears 131 may be interlocked with the second gear part 123b of the center gear 123. Accordingly, the clutch gear 131 may receive the power of the driving motor 110 from the center gear 123, and may be linked to the driving motor 110 via the center gear 123.

The clutch gear 131 may be intermittently interlocked with one gear 122a of the hinge-side gears 122. Accordingly, the clutch gear 131 may be linked to and engaged with the hinge gear 40b via the hinge-side gears 122.

The door opening/closing device 100 may include a clutch sensor 137 for detecting a position of the gear assembly 130 to determine whether the motor-side gears 121 and the hinge-side gears 122 are linked.

Specifically, the clutch sensor 137 may include a first clutch sensor and a second clutch sensor spaced apart from the first clutch sensor. The clutch sensor 137 may include various sensors capable of detecting a position of the gear assembly 130, such as a hall sensor, a light sensor, etc.

The clutch sensor 137 may detect a magnet 138 when aligned with the magnet 138 arranged on the gear assembly 130.

The support frame 132 may be arranged at one end of the plate 133 and may include the magnet 138 corresponding to the clutch sensor 137. The clutch sensor 137 may detect the position of the magnet 138 by detecting a magnetic field from the magnet 138. The magnet 138 may be formed with a magnetic material.

Specifically, the magnet 138 may be arranged on the opposite side of the plate 133 from the side of the plate 133 where the clutch gear 131 is arranged. That is, with respect to FIG. 5, the magnet 138 may be arranged under the clutch gear 131. More specifically, the support frame 132 may include a magnet receiver 138a that protrudes from the opposite side of the plate 133, and the magnet 138 may be mounted in the magnet receiver 138a.

Among the pair of clutch gears 131, the clutch gear 131 with the magnet 138 arranged thereunder may be called a first clutch gear 131a and the clutch gear 131 without the magnet 138 arranged thereunder may be called a second clutch gear 131b. The magnet 138 and the first clutch gear 131a may be arranged in the vertical direction. The magnet 138 and the first clutch gear 131a may be arranged along the rotation axis of the center gear 123 around which the first clutch gear 131a revolves. The magnet 138 and the first clutch gear 131a may be arranged along the rotation axis of the first clutch gear 131a. The magnet 138 may revolve around the center gear 123 along with the first clutch gear 131a as the support frame 132 is rotated.

The clutch sensor 137 is arranged under the gear assembly 130 so that the clutch sensor 137 may be positioned to face the magnet 138 in the vertical direction according to a rotated position of the support frame 132 and may detect a magnetic field from the magnet 138. Both the magnet 138 and the first clutch gear 131a revolve around the rotation axis of the center gear 123 while arranged side by side in the axial direction, so that the clutch sensor 137 may detect the magnet 138, thereby detecting the position of the first clutch gear 131a.

The door opening/closing device 100 may include the lever 150 coming into contact with the front 10a of the housing 10 to pressurize and push the housing 10 so as to move the door 30 in an opening direction, a slider 140 slidably provided to deliver the power of the driving motor 110 to the lever 150, and an operating frame 160 engaged and rotated with the center gear 123 to pressurize the slider 140 to slide. The lever 150, the slider 140, and the operating frame 160 may be arranged in the case 101.

The operating frame 160 may include a disc 161 to support the plate 133 of the support frame 132, an insert shaft 162 protruding from almost the center of a side of the disc 161 to form a rotation axis of the disc 161, and a pressurizing projection 163 protruding from the other side of the disc 161 at a position spaced apart from the rotation axis of the operating frame 160. The pressurizing projection 163 may be symmetrically arranged on the operating frame 160. That is, the pressurizing projection 163 may be provided in a pair.

As shown in FIG. 5, the insert shaft 162 of the operating frame 160 may protrude upward from the disc 161 to be inserted to the through hole 133a of the support frame 132, and the insert shaft 162 that has passed through the through hole 133a of the support frame 132 may then be inserted and fixed to the center gear 123. The insert shaft 162 and the center gear 123 may have the same rotation axis. Accordingly, the operating frame 160 may be coaxially rotated with the center gear 123. The operating frame 160 may be linked to the driving motor 110 via the center gear 123. The center gear 123, the operating frame 160, and the gear assembly 130 may be rotated in the same direction.

Figure 6:
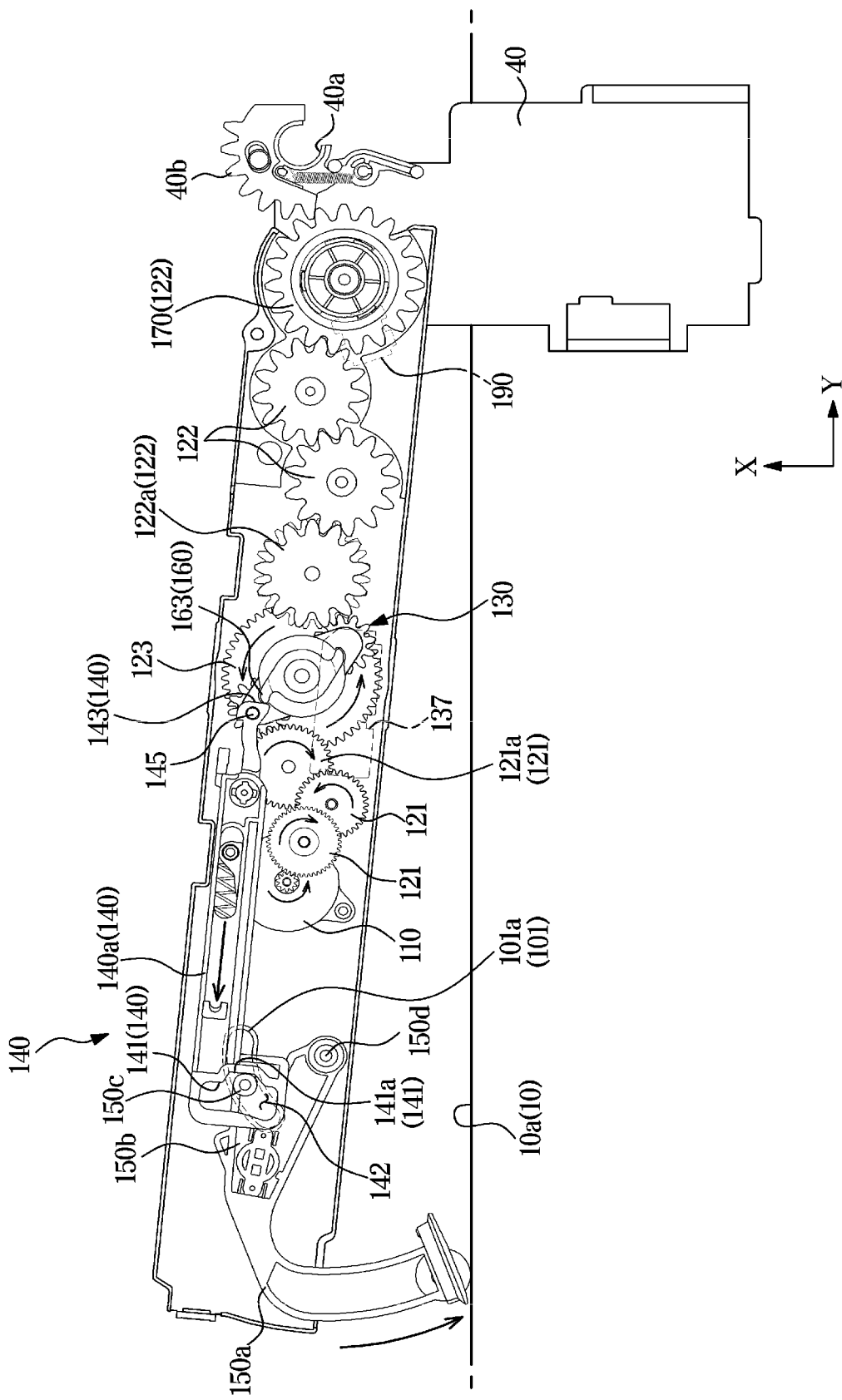
FIG. 6 illustrates an example of a door opening/closing device starting to open a door, according to an embodiment of the disclosure.

The slider 140 may include, as shown in FIGS. 3, 4 and 6, an extender 140a extending in the left-right direction, a pressurizer 143 arranged at an end of the extender 140a and pressed by the pressurizing projection 163, and a coupling groove 141 arranged at the other end of the extender 140a for part of the lever 150 to be inserted and coupled to the coupling groove 141.

Furthermore, the slider 140 may include a slider bar 144 having the extender 140a and the coupling groove 141, and an intermittence member 145 rotationally coupled to an end of the slider bar 144 and including the pressurizer 143. The intermittence member 145 may selectively deliver the power of the motor 110 transferred by rotation of the center gear 123 and the operating frame 160 to the slider 140. The intermittence member 145 may include a rotation shaft 146 arranged at one end to be rotationally coupled to the slider bar 144, and the pressurizer 143 arranged at the other end.

The support frame 132 may include a first support projection 139a formed on one side of the plate 133. The first support projection 139a may pressurize the intermittence member 145 by coming into contact with a side of the intermittence member 145. The intermittence member 145 may be rotated on the rotation axis 146 by being pressurized by the first support projection 139a.

The first support projection 139a may be arranged such that a straight line connecting a rotation center of the support frame 132 to the first support projection 139a is perpendicular to a straight line connecting the rotation center of the support frame 132 to the magnet receiver 138a. The bottom side of the first support projection 139a may be placed lower than the bottom side of the plate 133.

The support frame 132 may include a second support projection 139b formed on the bottom side of the plate 133. The second support projection 139b may stop rotation of the gear assembly 130 by coming into contact with a side of the intermittence member 130. In this case, the side of the intermittence member 145 coming into contact with the first support projection 139a may be different from the side of the intermittence member 145 coming into contact with the second support projection 139b.

The second support projection 139b may be arranged in a straight line connecting the rotation center of the support frame 132 to the magnet receiver 138a. The second support projection 139b may be placed under the second clutch gear 131b.

The lever 150 may include the pusher 150a contacting the housing 10 at one end, and protruding from the case 101 and pushing the housing 10 to separate the door 30 from the housing 10 when the door 30 is opened, and a body 150b bending and extending from the other end of the pusher 150a and having a rotation shaft 150d formed at one end to be rotationally coupled to the case 101. Specifically, the pusher 150a may contact and push the front 10a of the housing 10, without being limited thereto, and the pusher 150a may contact a different side of the housing 10 or contact a different member fixed to the housing 10.

The lever 150 may include a coupling projection 150c that protrudes from the body 150b to be inserted and coupled to the coupling groove 141 of the slider 140 at one end and inserted to a guide groove 101a formed at the case 101 at the other end, making a guided motion. Specifically, the coupling projection 150c may be formed to protrude upward and downward from the body 150b of the lever 150 at a distance from the rotation shaft 150d of the lever 150. The pusher 150a, the body 150b, and the coupling projection 150c may be integrally formed.

The slider 140 may slide as the pressurizer 143 is pressurized by the pressurizing projection 163 of the operating frame 160 rotated by receiving the power of the driving motor 110, and the sliding slider 140 may enable the lever 150 to push the housing 10 for the door 30 to be separated from the housing 10.

Figure 9:
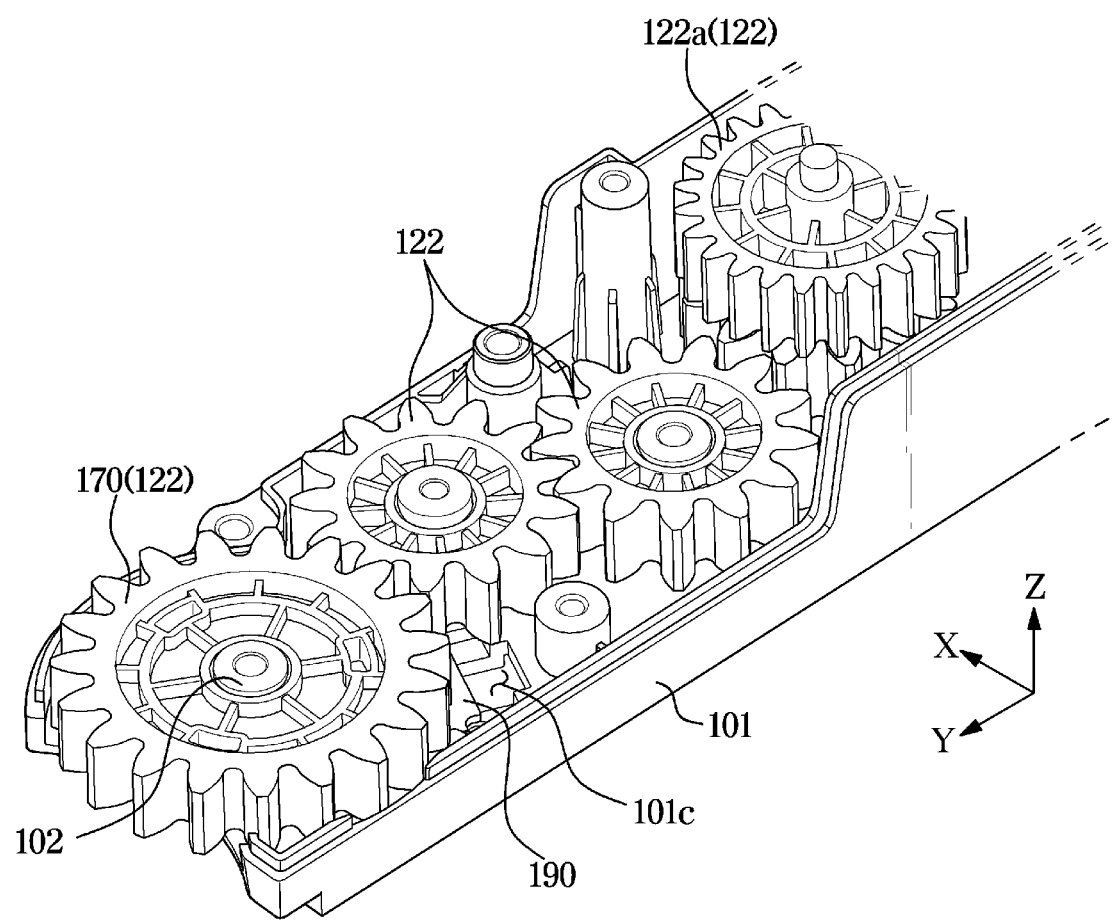
FIG. 9 illustrates part of a door opening/closing device, according to an embodiment of the disclosure.
Figure 10:
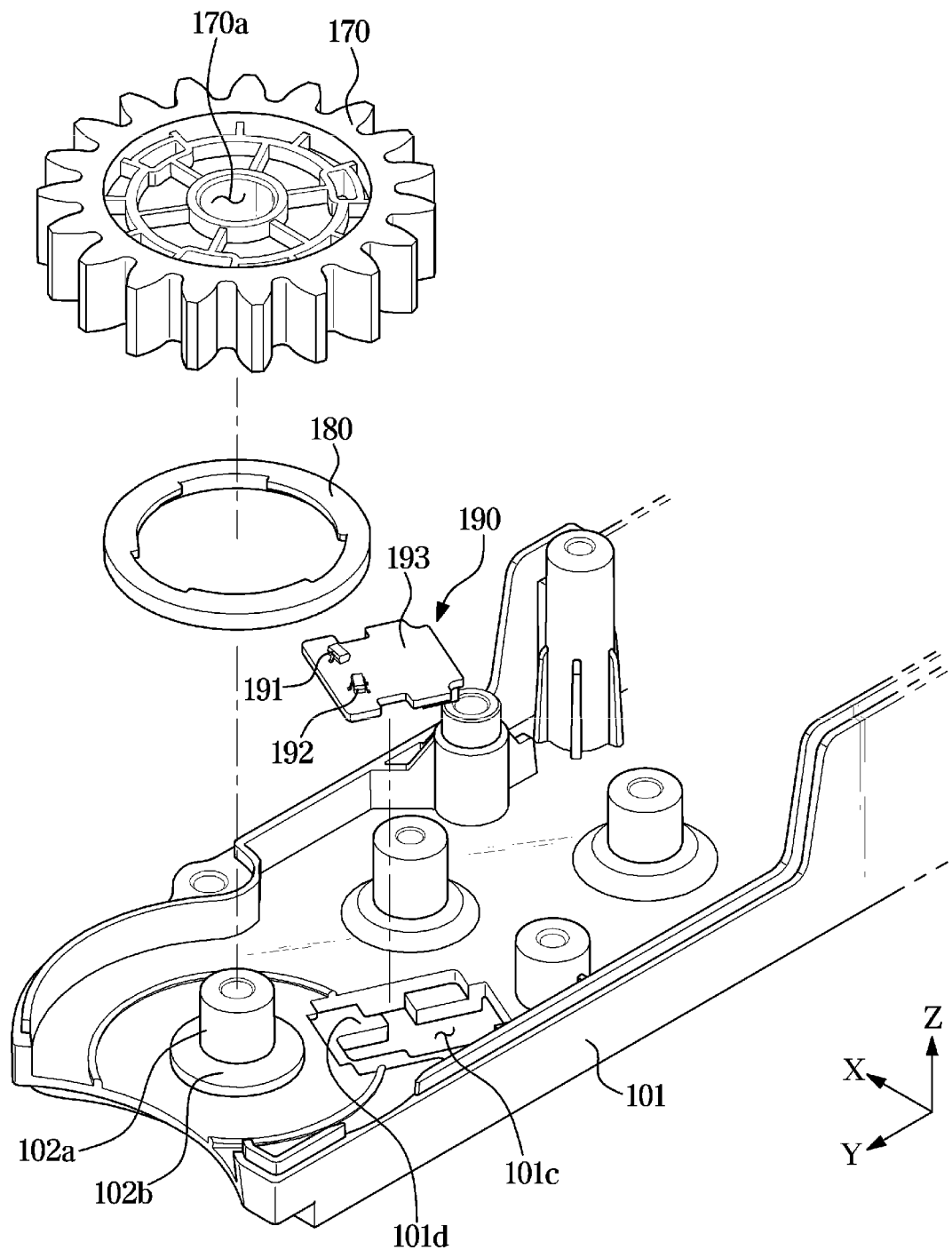
FIG. 10 is an exploded view of part of a door opening/closing device, according to an embodiment of the disclosure.

The door opening/closing device 100 may include a door position sensor 190 that is able to detect a rotation angle and/or position of the terminal gear 170 (see FIGS. 9 and 10). The door position sensor 190 may be electrically connected to a printed circuit board (PCB) 193. The door position sensor 190 may be mounted on the PCB 193 arranged under the terminal gear 170.

Figure 7:
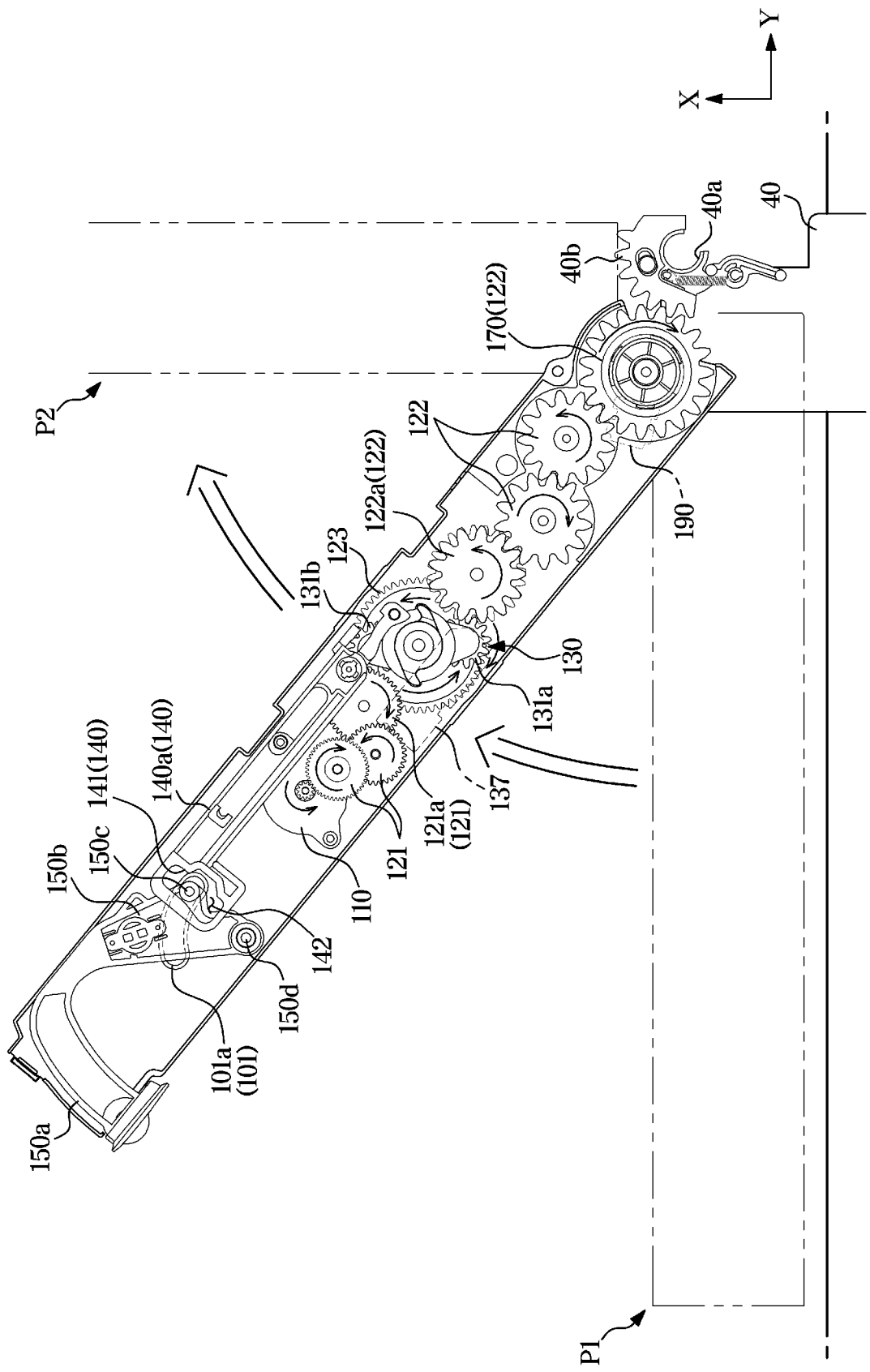
FIG. 7 illustrates an example of a door opening/closing device n the process of opening a door, according to an embodiment of the disclosure.
Figure 8:
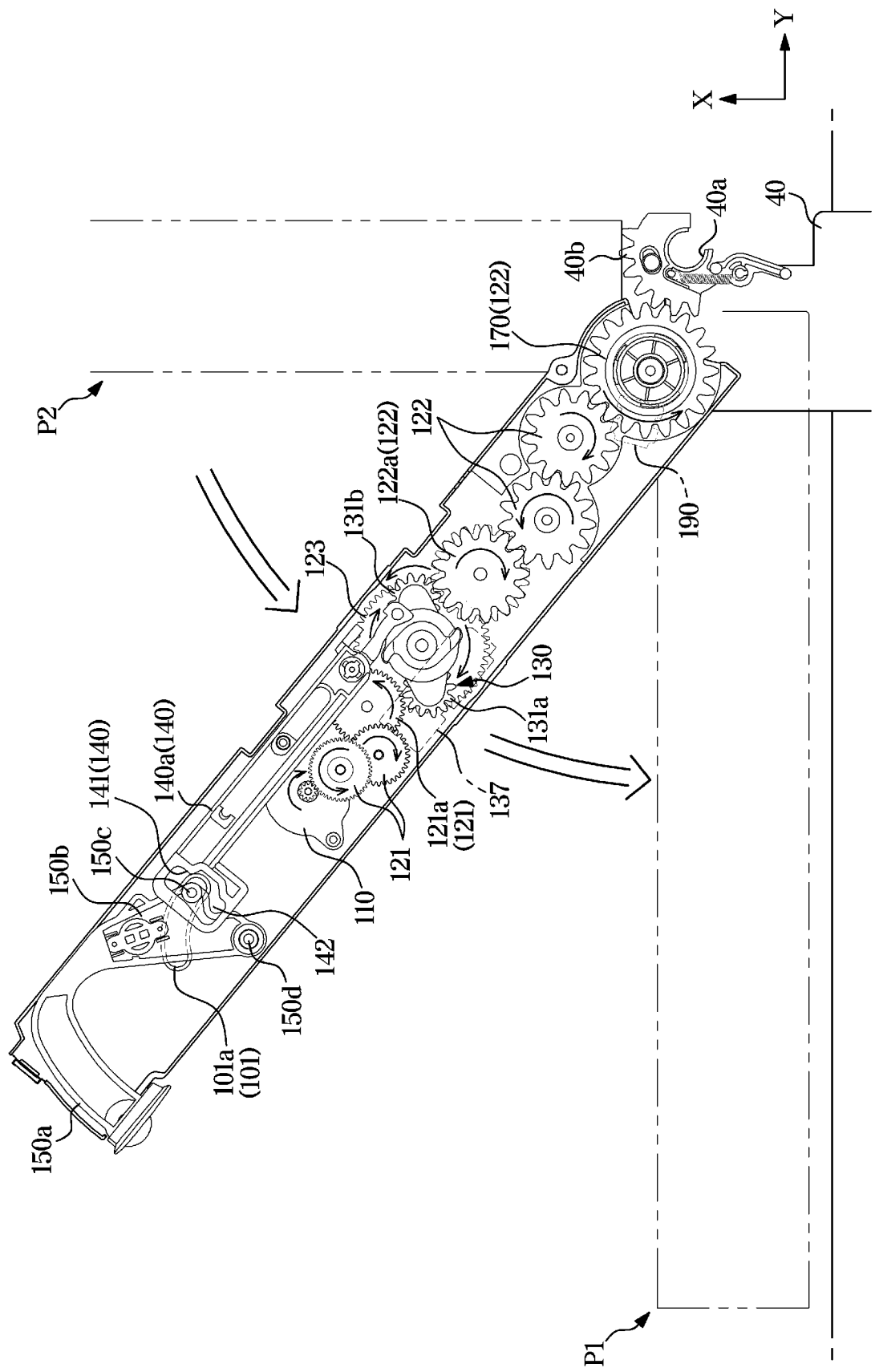
FIG. 8 illustrates an example of a door opening/closing device closing a door, according to an embodiment of the disclosure.

FIG. 6 illustrates an example of a door opening/closing device starting to open a door, according to an embodiment of the disclosure. FIG. 7 illustrates an example of a door opening/closing device opening a door, according to an embodiment of the disclosure. FIG. 8 illustrates an example of a door opening/closing device closing a door, according to an embodiment of the disclosure.

When the pressurizer 143 is not pressurized by the pressurizing projection 163, as shown in FIGS. 3 and 4, the lever 150 is in a state of being accommodated in the case 110 and does not push the housing 10. Referring to FIG. 6, when the pressurizer 143 is pressurized by the pressurizing projection 163, the slider 140 may slide toward the lever 150, the inner surface of the coupling groove 141 of the slider 140 may pressurize the coupling projection 150c, and the lever 150 may be guided by the guide groove 101a to be moved and rotated around the rotation axis 150d according to the force applied to the coupling projection 150c.

As such, when the slider 140 slid by the pressurizing projection 163 pushes the coupling projection 150c of the lever 150 to rotate the lever 150, the pusher 150a of the lever 150 may protrude outward from the case 101 through the opening 101b of the case 101, pushing the front 10a of the housing 10 to separate the door 30 from the housing 10.

An operation of the door opening/closing device 100 will now be described with reference to the drawings.

Referring to FIGS. 6 to 8, the door 30 may be rotated by the driving motor 110 of the door opening/closing device 100 coupled to the top end and/or bottom end of the door 30. The door 30 may be rotated in a first direction when the driving motor 110 is rotated in the first direction, and the door 30 may be rotated in a second direction when the driving motor 110 is rotated in the second direction. It is not, however, limited thereto, and according to the number of the hinge-side gears 122 and the number of the motor-side gears 121, the door 30 may be rotated in the second direction when the driving motor 110 is rotated in the first direction, and the door 30 may be rotated in the first direction when the driving motor 110 is rotated in the second direction.

In the following description, it is assumed that based on FIGS. 6 to 8 illustrating the door opening/closing device 100 viewed from below, the door 30 is rotated in the opening direction when the driving motor 110 is rotated in the first direction, e.g., counterclockwise when the door opening/closing device 100 is viewed from below and the door 30 is rotated in the closing direction when the driving motor 110 is rotated in the second direction, e.g., clockwise when the door opening/closing device 100 is viewed from below.

Figure 16:
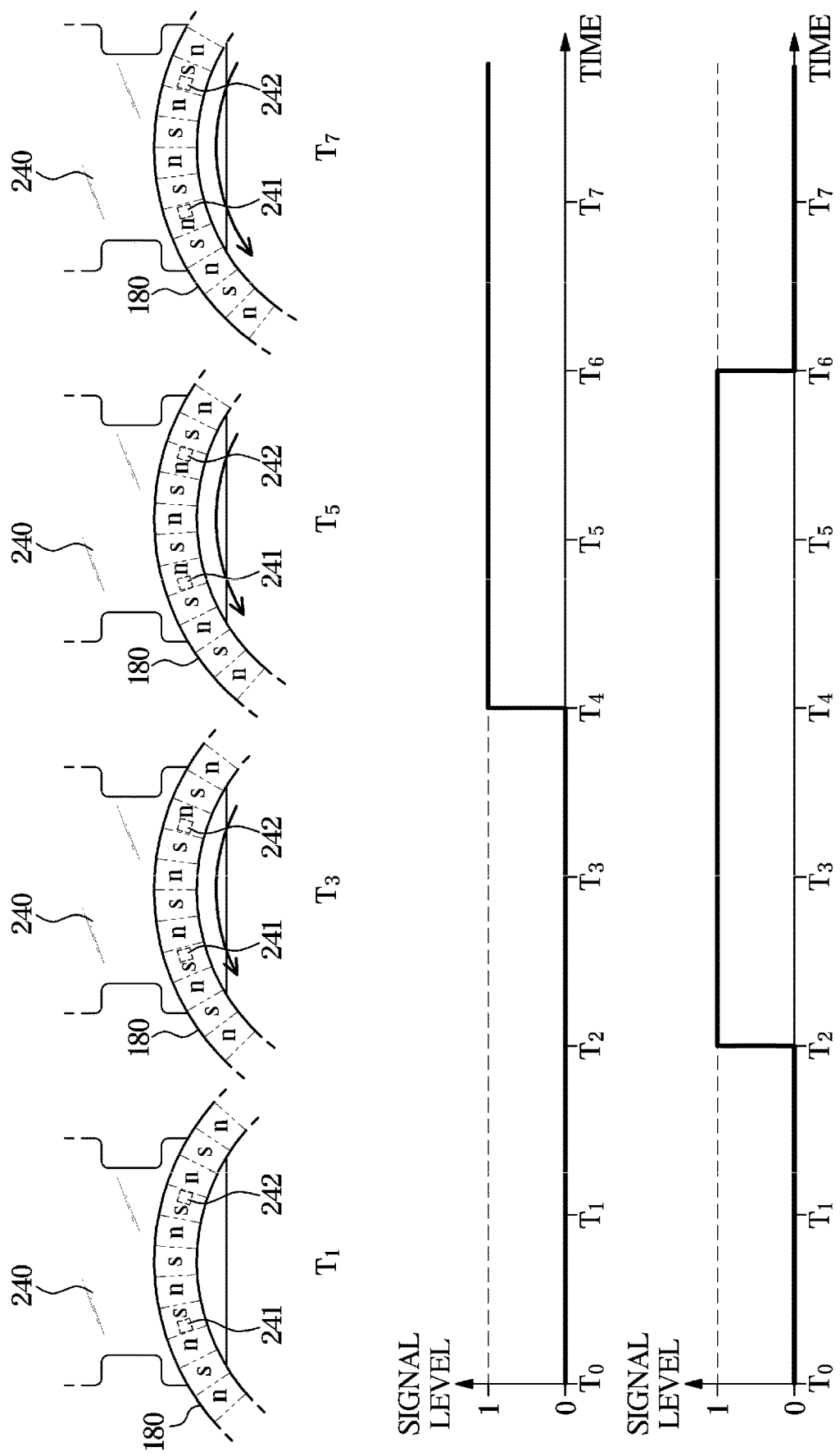

A rotation direction and speed of the driving motor 110 may be controlled by a processor 290 (see FIG. 16). The door opening/closing device 100 may directly or indirectly receive a control signal sent from the processor 290. Furthermore, the processor 290 may receive a detection signal transmitted by the clutch sensor 137 when the clutch sensor 137 detects the magnet 138, and control rotation of the driving motor 110 based on the detection signal. The processor 290 may wirelessly receive the control signal from an extra input device or a mobile terminal. Arrangement of the processor 290 is not, however, limited thereto.

The door 30 may be moved by the door opening/closing device 100 into an open position P2 at which to automatically open the storeroom 20. The open position P2 may correspond to a position where the door 30 is positioned when the door 30 is rotated by a preset angle to a direction in which the storeroom 20 is opened from a close position P1 at which the storeroom 20 is closed. In other words, the door 30 may be switched into a state of opening the storeroom 20 by moving to the open position P2 from a closed state of the storeroom 20. The open position P2 is not limited to what are illustrated in FIGS. 6 to 8.

When the door 30 is in the close position P1, the gear assembly 130 may be in a neutral position. The neutral position may correspond to a position where the first and second clutch gears 131a and 131b of the gear assembly 130 are interlocked with the center gear 121a but not interlocked with the hinge-side gear 122b.

When the gear assembly 130 is in the neutral position, the magnet 138 may be positioned between the first and second clutch sensors of the clutch sensor 137 and may not be detected by the clutch sensor 137. That is, the magnet 138 may not be detected by any clutch sensor, so the clutch sensor 137 may not transmit any detection signal. In this case, an area between the first clutch sensor and the second clutch sensor may correspond to a neutral area.

The door opening/closing device 100 may receive a control signal from the processor 290 to rotate the door 30 from the close position P1 into the open position P2. Specifically, the control signal from the processor 290 may include an open signal to rotate the door 30 from the close position P1 into the open position P2 and a close signal to rotate the door 30 from the open position P2 into the close position P1. The door opening/closing device 100 may receive the open signal from the processor 290 to rotate the door 30 from the close position P1 into the open position P2.

Upon receiving the open signal from the processor 290, the door opening/closing device 100 may rotate the driving motor 110 in the first direction. The power of the driving motor 110 may be delivered to the motor-side gears 121, and the motor-side gear 121a interlocked with the center gear 123 may deliver the power of the driving motor 110 to the center gear 123. Accordingly, the center gear 123 may be rotated by receiving the driving power of the driving motor 110.

As the center gear 123 is rotated, the operating frame 160 may also be rotated along with the center gear 123. With the rotation of the operating frame 160, the pressurizing projection 163 of the operating frame 160 may pressurize the pressurizer 143 of the slider 140. The slider 140 pressurized by the pressurizing projection 163 may slide toward the lever 150, which may in turn protrude from the case 101 to separate the door 30 from the housing 10. At the same time, one 170 of the hinge-side gears may be interlocked with the hinge gear 40b. Specifically, the first clutch gear 131a may be interlocked with one 122a of the hinge-side gears. It is not, however, limited thereto, and the hinge-side gear 170 may be arranged to be constantly coupled to the hinge gear 40b wherever the door 30 is positioned. Among the hinge-side gears, the hinge-side gear 170 interlocked with the hinge gear 40b may be referred to as the terminal gear 170.

After the door 30 is separated from the housing 10 by the lever 150, the driving motor 110 may be constantly rotated in the first direction. With the rotation of the driving motor 110, the gear assembly 130 may be moved from the neutral position to an interlocking position.

Specifically, with the rotation of the center gear 123, the pair of clutch gears 131 revolves around the center gear 123, in which case one of the pair of clutch gears 131 may be interlocked and engaged with one 122a of the hinge-side gears. At this time, the pressure spring 135 and the suppress member 136 may apply a load in rotation of the clutch gears 131a and 131b to make it hard for each clutch gear 131a or 131b to rotate around the clutch gear mounting shaft 134. Torque may be produced to cause the pair of clutch gears 131 to revolve around the rotation axis of the center gear 123.

The interlocking position may include a first interlocking position where the first clutch gear 131a of the gear assembly 130 is interlocked with the center gear 123 and the hinge-side gears 122, and a second interlocking position where the second clutch gear 131b of the gear assembly 130 is interlocked with the center gear 123 and the hinge-side gears 122.

In the meantime, while the gear assembly 130 is moved to the interlocking position, the slider 140 may be returned to the position before pressurized by the pressurizing projection 163 by a motor or an elastic member. Furthermore, the lever 150 may be rotated by a motor, an elastic member, or the like so that the pusher 150a of the lever 150 may be accommodated in the case 101. In other words, the lever 150 and the slider 140 may be restored to a state in which the door 30 is in the close position P1.

Referring to FIG. 7, when the driving motor 110 is rotated in the first direction according to the open signal from the processor 290, the first clutch gear 131a may be interlocked with the center gear 123 and the hinge-side gear 122a, and the second clutch gear 131b may be interlocked with the center gear 123 and not with the other gears. Specifically, while the door 30 is being opened, the first clutch gear 131a may deliver the power to the hinge-side gear 122a.

The gear assembly 130 in the first interlocking position may deliver the power of the driving motor 110 rotated in the first direction to the hinge-side gears 122. The hinge-side gears 122 may deliver the power of the driving motor 110 to the hinge gear 40b. Specifically, the first clutch gear 131a may be engaged with the rotation of the center gear 123 and rotated around the clutch gear mounting shaft 134 when interlocked with the hinge-side gear 122a. The hinge-side gear 122a interlocked with the first clutch gear 131a may be rotated by being engaged with the rotation of the first clutch gear 131a. Furthermore, the hinge-side gear 170 interlocked with the hinge gear 40b may be turned around the hinge gear 40b fixed to the hinge shaft 40a. Accordingly, the door 30 may be rotated around the hinge shaft 40a toward the open position P2. The driving motor 110 may be rotated in the first direction until the door 30 is in the open position P2.

When the door 30 reaches the open position P2, the processor 290 may control the driving motor 110 to place the gear assembly 130 into the neutral position. Specifically, the processor 290 may recognize based on the number of revolutions of the driving motor 110 that the door 30 reaches the open position P2 when the door 30 is completely opened. The processor 290 may rotate the driving motor 110 in the second direction to prevent the first clutch sensor from transmitting a detection signal.

After completion of rotation of the door 30 into the open position P2, the first clutch gear 131a may be disengaged from the hinge-side gear 170. This may prevent the driving motor 110 from being linked to the hinger gear 40b and serving as a resistor when the door 30 is manually closed by the user, so the user may smoothly rotate the door 30 from the open position P2 into the close position P1.

Referring to FIG. 8, the door opening/closing device 100 may receive a control signal from the processor 290 to rotate the door 30 from the open position P1 into the close position P2. Specifically, the door opening/closing device 100 may receive a close signal from the processor 290 to rotate the door 30 from the open position P1 into the close position P2.

Upon receiving the close signal from the processor 290, the door opening/closing device 100 may rotate the driving motor 110 in the second direction. The power of the driving motor 110 may be delivered to the motor-side gears 121, and the motor-side gear 121a interlocked with the center gear 123 may deliver the power of the driving motor 110 to the center gear 123.

The driving motor 110 may be constantly rotated in the second direction. With the rotation of the driving motor 110, the gear assembly 130 may be moved from the neutral position to an interlocking position.

When the driving motor 110 is rotated in the second direction according to the close signal from the processor 290, the second clutch gear 131b may be interlocked with the center gear 123 and the hinge-side gear 122a, and the first clutch gear 131a may be interlocked with the center gear 123 and not with the other gears. Specifically, while the door 30 is being closed, the second clutch gear 131b may deliver the power to the hinge-side gear 122a.

The processor 290 may receive a detection signal transmitted from the second clutch sensor, and determine that the gear assembly 130 is in the second interlocking position. The processor 290 may determine that the door 30 is being rotated from the open position P2 to the close position P1 while receiving the detection signal from the second clutch sensor.

The gear assembly 130 in the second interlocking position may deliver the power of the driving motor 110 rotated in the second direction to the hinge-side gears 122. The hinge-side gears 122 may deliver the power of the driving motor 110 to the hinge gear 40b. Specifically, the second clutch gear 131b may be engaged with the rotation of the center gear 123 and rotated around the clutch gear mounting shaft 134 when interlocked with the hinge-side gear 122a. The hinge-side gear 122a interlocked with the second clutch gear 131b may be rotated by being engaged with the rotation of the second clutch gear 131b. The hinge-side gear 170 interlocked with the hinge gear 40b may be turned around the hinge gear 40b fixed to the hinge shaft 40a. Accordingly, the door 30 may be rotated around the hinge shaft 40a toward the close position P1. The driving motor 110 may be rotated in the second direction until the door 30 is in the close position P1.

When the door 30 reaches the close position P1, the processor 290 may control the driving motor 110 to place the gear assembly 130 into the neutral position. Specifically, the processor 290 may recognize based on the number of revolutions of the driving motor 110, a door close sensor 250 (see FIG. 16) for detecting that the door is in the close position, etc., that the door 30 reaches the close position P1 when the door 30 is completely closed. The processor 290 may rotate the driving motor 110 in the first direction to prevent the second clutch sensor from transmitting a detection signal.

The gear assembly 130 has thus far been described as being in the first interlocking position to open the door 30 and in the second interlocking position to close the door 30 in connection with FIGS. 7 and 8.

It is not, however, limited thereto, and the gear assembly 130 may be in the second interlocking position to open the door 30 and in the first interlocking position to close the door 30.

The door position sensor 190 may detect a rotation angle or a position of the door 30 and/or the terminal gear 170.

FIG. 9 illustrates part of a door opening/closing device, according to an embodiment of the disclosure. FIG. 10 is an exploded view of part of a door opening/closing device, according to an embodiment of the disclosure.

Referring to FIGS. 9 and 10, the door opening/closing device 100 may include the hinge-side gears 122 having the terminal gear 170, a magnet 180, the door position sensor 190, and a boss 102.

The terminal gear 170 may receive power from the driving motor 110. The terminal gear 170 may deliver the received power to the hinge-gear 40b. For example, the terminal gear 170 may be arranged at an end of the case 101 and interlocked with the hinge gear 40b. Where the terminal gear 170 is arranged may be opposite to the other end of the case 101 where the opening 101b is formed. Accordingly, the hinge gear 40b fixed to the hinge shaft 40a may receive rotation power, so the door 30 may be opened or closed by driving the driving motor 110. Specifically, power generated by the driving motor 110 may be delivered to the terminal gear 170 through the motor-side gears 121, the clutch gear 131, and the hinge-side gear 122a interlocked with the clutch gear 131 in sequence. The terminal gear 170 may be interlocked with the hinge gear 40b to open or close the door 30 with the power delivered.

The magnet 180 may be received inside the terminal gear 170. The magnet 180 may interact with the door position sensor 190 so that an angle by which the terminal gear 170 is rotated may be detected. The magnet 180 may be shaped like a ring. The magnet 180 may be arranged opposite the door position sensor 190. Although the position of the terminal gear 170 is described as being detected by interaction between the magnet 180 and the door position sensor 190, it is not limited thereto. For example, the door position sensor 190 may detect the position of the terminal gear 170 for itself without the magnet 180.

The door position sensor 190 may be arranged near the magnet 180. The door position sensor 190 may be arranged on a side to the magnet 180. For example, the door position sensor 190 may be arranged under the magnet 180. The door position sensor 190 may be settled in a settling hole 101c of the case 101. The door position sensor 190 may be arranged in the case 101. The door position sensor 190 may be supported by a supporter 102b of the case 101. The supporter 102b may support the bottom side of the door position sensor 190.

The door position sensor 190 may detect a change in position and/or angle of the terminal gear 170 and the door by detecting a polarity change of the magnet 180.

The door position sensor 190 may include a first position sensor 191, a second position sensor 192, and the PCB 193. The first and second position sensors 191 and 192 may include various sensors such as hall sensors, light sensors, etc., for detecting a position and/or angle of the terminal gear 170.

The boss 102 may protrude inward from the case 101. The boss 102 may be coupled with each of the plurality of gears 121, 122, 123 and 131 of the door opening/closing device 100. The boss 102 may be provided in the plural. In the following description, only the boss 102 to be coupled with the terminal gear 170 will be described. The terminal gear 170 may be axially coupled with the boss 102. For example, an imaginary rotation shaft of the terminal gear 170 may correspond to the boss 102. The terminal gear 170 may be rotated around the boss 102 clockwise or counterclockwise. The boss 102 may include a coupler 102a and the supporter 102b. The coupler 102a may be coupled with a shaft hole 170a of the terminal gear 170. For example, the coupler 102a and the shaft hole 170a of the terminal gear 170 may be axially coupled to each other based on the rotation axis of the terminal gear 170. The supporter 102b may be arranged on the bottom of the boss 102. The supporter 102b may be arranged underneath the coupler 102a. The supporter 102b may support the terminal gear 170. For example, the supporter 102b may contact and support the bottom side of the terminal gear 170. The supporter 102b may keep a distance between the door position sensor 190 and the magnet 180. Height of the supporter 102b may be changed depending on the distance required between the door position sensor 190 and the magnet 180.

Figure 11:
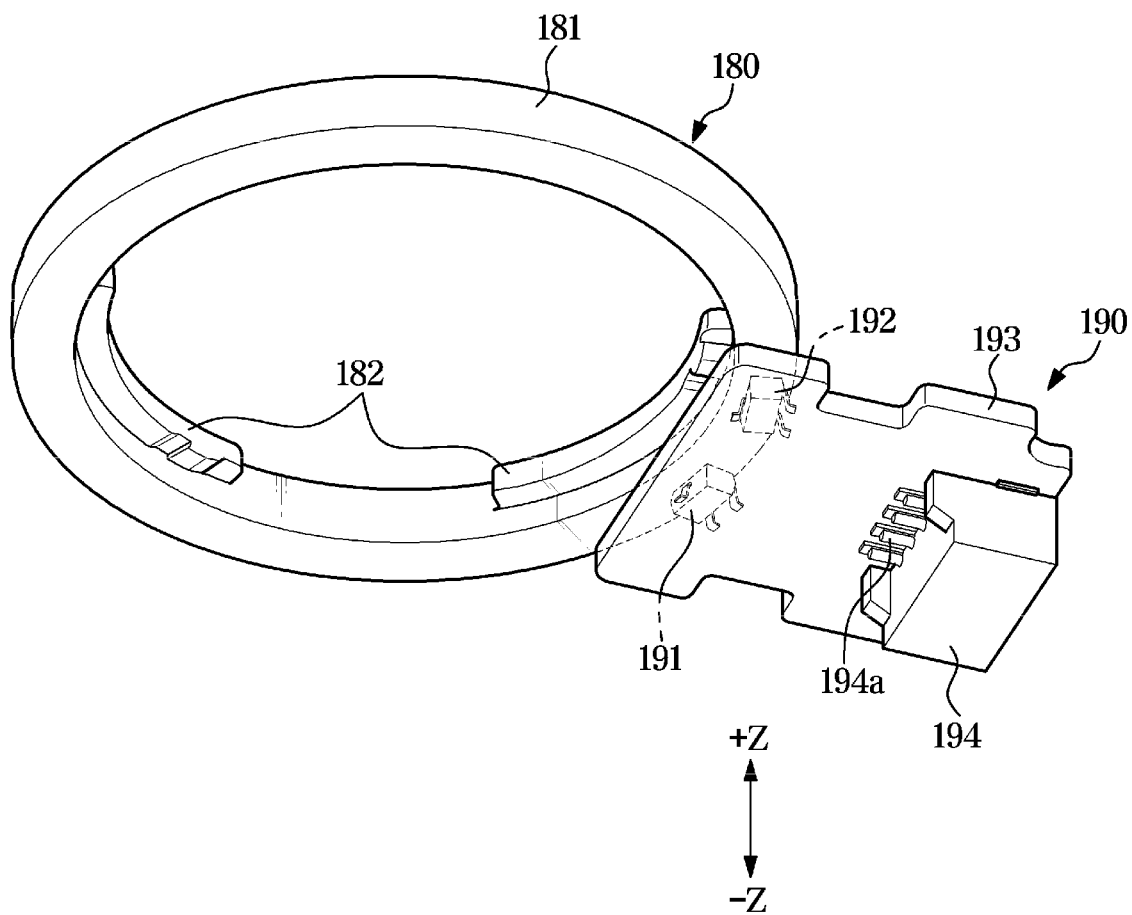
FIG. 11 is an enlarged view of part of a door opening/closing device, according to an embodiment of the disclosure.
Figure 12:
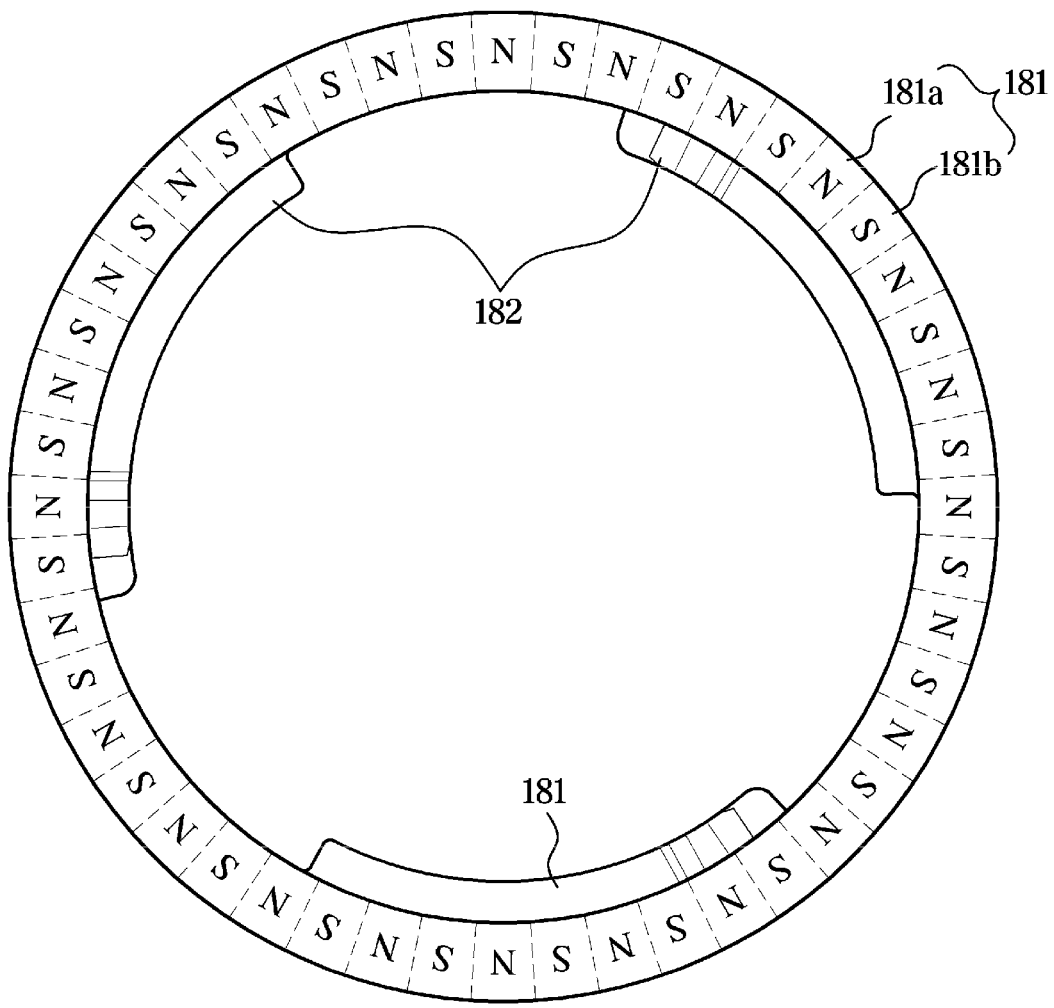
FIG. 12 illustrates a magnet of a door opening/closing device, according to an embodiment of the disclosure.

FIG. 11 is an enlarged view of part of a door opening/closing device, according to an embodiment of the disclosure. FIG. 12 illustrates a magnet of a door opening/closing device, according to an embodiment of the disclosure.

Referring to FIGS. 11 and 12, the magnet 180 may include a magnet part 181 and inner projections 182. The magnet part 181 may include N poles 181a and S poles 181b. The N poles 181a and the S poles 181b may be alternately arranged in the magnet part 181. The inner projections 182 may protrude inwards from the magnet part 181 of the magnet 180 for the magnet 180 to be accommodated in the terminal gear 170. The inner projections 182 may interfere with preventing projections 174 of the terminal gear 170, which will be described later. Accordingly, the magnet 180 may be received in the terminal gear 170 without coming out of the terminal gear 170.

The door position sensor 190 may be arranged near the magnet 180. For example, the door position sensor 190 may be arranged near the magnet part 181.

As the magnet 180 is received in the terminal gear 170, the magnet 180 may also be rotated when the terminal gear 170 is rotated by receiving power. In this case, the door position sensor 190 may detect a change in the N poles 181a and the S poles 181b of the magnet part 181, and based on the detected change, may detect a rotated angle of the terminal gear 170 and/or the magnet 180.

The door position sensor 190 may further include a connector 194. The connector 194 may be coupled to the PCB 193 on the bottom side of the PCB 193. The connector 194 may be electrically connected to the PCB 193. For example, the connector 194 may be electrically connected to the PCB 193 through terminals 194a. The terminals 194a may be connected to a main board (not shown) provided in the housing 10 through wires (not shown).

Figure 13:
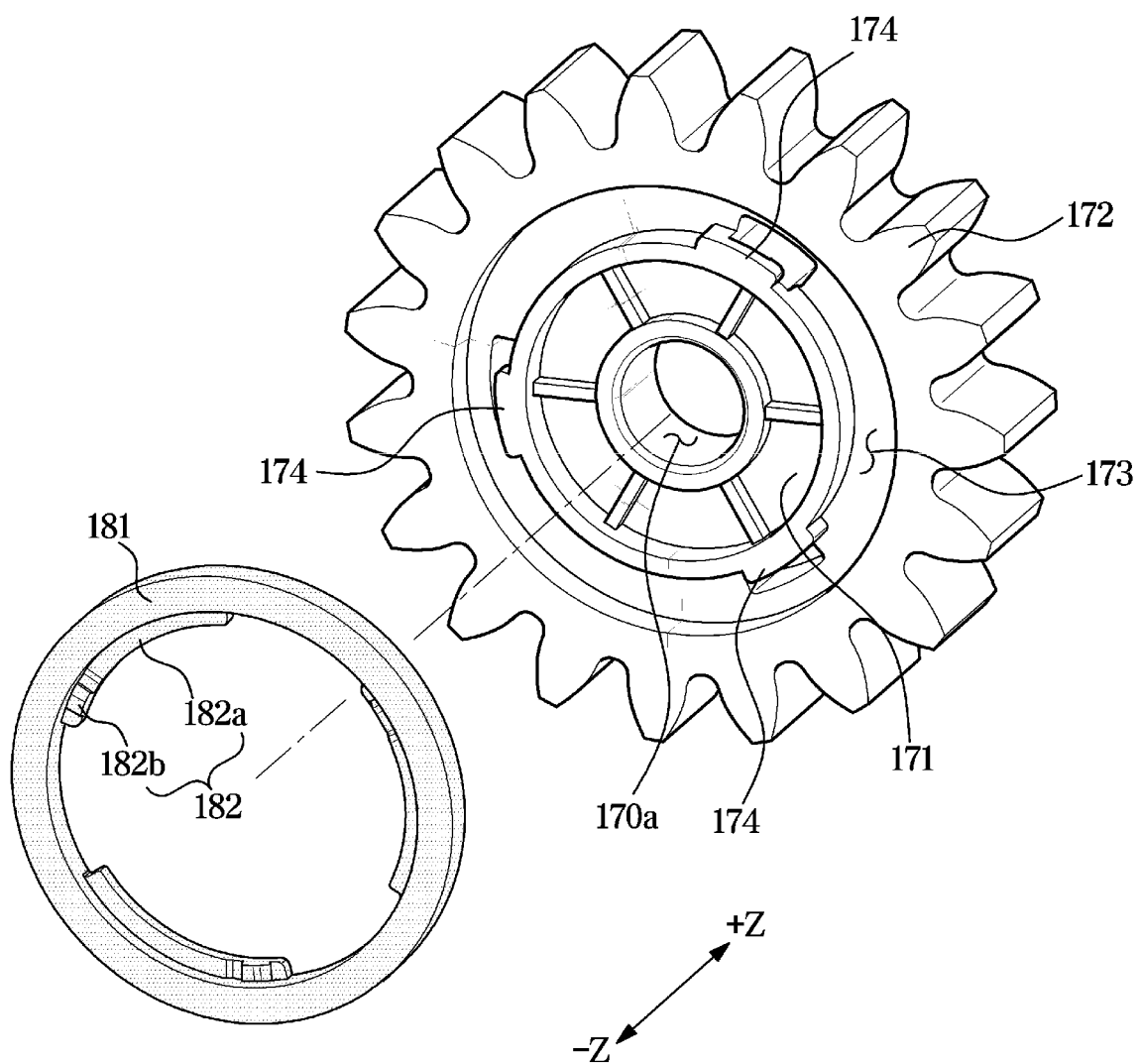
FIG. 13 illustrates an example of a magnet of a door opening/closing device being coupled to a gear, according to an embodiment of the disclosure.

FIG. 13 illustrates an example of a magnet of a door opening/closing device being coupled to a gear, according to an embodiment of the disclosure.

Referring to FIG. 13, the magnet 180 may include the magnet part 181 and the inner projections 182. The inner projection 182 may include a base 182a and an interferer 182b. The interferer 182b may be interfered with by the preventing projections 174 of the terminal gear 170. Accordingly, the magnet 180 accommodated in the terminal gear 170 may be prevented from coming out of the terminal gear 170.

The terminal gear 170 may include a center part 171, a teeth part 172, a recess 173, and the preventing projections 174. A coupling hole 170a may be formed in the center part 171 of the terminal gear 170.

The teeth part 172 may be formed on an outer side of the terminal gear 170. For example, the teeth part 172 may radially protrude from the outer circumference of the terminal gear 170. The teeth part 172 may be teeth of the gear. The teeth part 172 may include multiple teeth. The recess 173 may be formed between the center part 171 and the teeth part 172. The recess 173 may be sunken to receive the magnet 180 in the terminal gear 170. The magnet 180 may be received in the terminal gear 170.

The preventing projections 174 may protrude outward from the center part 171. For example, the preventing projections 174 may radially extend from the outer circumference of the center part 171. The preventing projections 174 may be interfered with the inner projections 182 to prevent the magnet 180 from coming out of the terminal gear 170 after the magnet 180 is received in the terminal gear 170. For example, the preventing projections 174 may be interfered with the interferer 182b. When the magnet 180 is received in the terminal gear 170, the inner projections 182 may be placed above the preventing projections 174. Specifically, the preventing projections 174 may be placed underneath the inner projections 182 to support the inner projections 182 when the magnet 180 is received in the terminal gear 170. The preventing projections 174 and the inner projections 182 may make partial contact with each other. The preventing projections 174 and the interferer 182b may come into contact with each other.

A procedure for the magnet 180 to be inserted to and received in the terminal gear 170 will now be described.

Referring to FIG. 13, the magnet 180 may be arranged in the z direction to be coupled with the terminal gear 170. For example, the magnet 180 and the terminal gear 170 may be arranged in the vertical direction. The magnet 180 may be inserted from below the terminal gear 170 toward the top of the terminal gear 170. The magnet 180 may be inserted from below the recess 173 toward the recess 173.

When the magnet is inserted to the recess 173, the inner projections 182 of the magnet 180 may not interfere with the preventing projections 174 of the terminal gear 170. After being inserted to the recess 173, the magnet 180 may be rotated to be received in the terminal gear 170.

When viewed from below the terminal gear 170 and the magnet 180, the magnet 180 may be rotated counterclockwise in the recess 173. When the magnet 180 is rotated, the preventing projections 174 and the inner projections 182 may interfere with each other. For example, the preventing projections 174 may interfere with the interferer 182b. The preventing projections 174 and the interferer 182b may come into contact with each other. Accordingly, the magnet 180 may be received in the terminal gear 170. The preventing projections 174 may be placed underneath the inner projections 182 to support the inner projections 182 when the magnet 174 is received in the terminal gear 182. The preventing projections 174 may prevent the magnet 180 from coming out of the terminal gear 170. Although the magnet 180 is shown as being rotated counterclockwise, it is not limited thereto and the magnet 180 may be rotated clockwise to be received in the recess 173 of the terminal gear 170.

Figure 14:
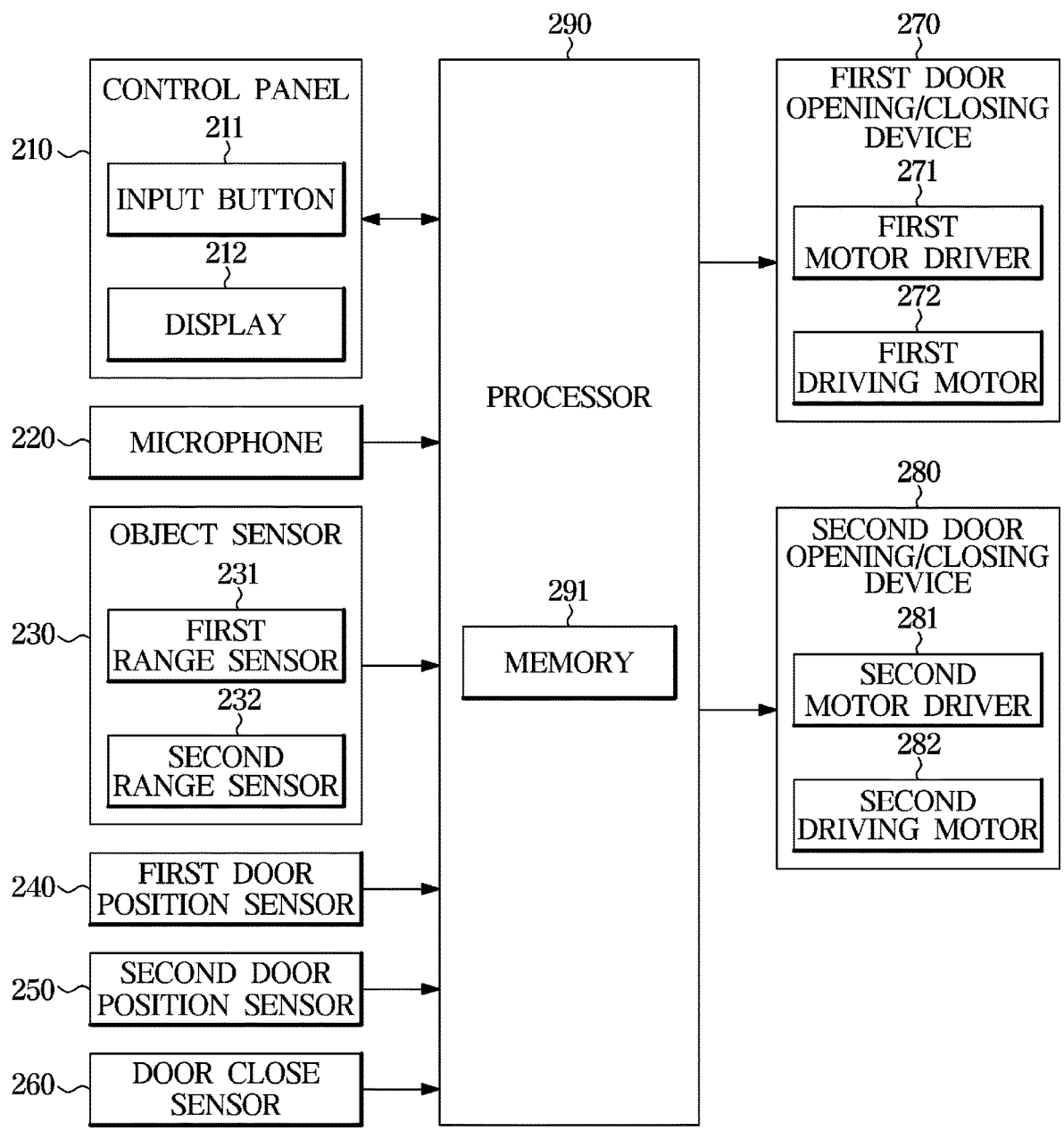
FIG. 14 is a block diagram of refrigerator, according to an embodiment of the disclosure.

FIG. 14 is a block diagram of refrigerator, according to an embodiment of the disclosure.

Referring to FIG. 14, the refrigerator 1 may include a control panel 210, a microphone 220, an object sensor 230, a first door position sensor 240, a second door position sensor 250, a door close sensor 260, a first door opening/closing device 270, a second door opening/closing device 280, and/or the processor 290.

The control panel 210 may provide the user with a user interface to interact with the user. The control panel 210 may be arranged on the housing 10 or on the door 30.

The control panel 210 may include an input button 211 and/or a display 212.

The input button 211 may obtain a user input related to an operation of the refrigerator 1. For example, the input button 211 may obtain a user input (or user command) to open the door 30. For example, the input button 211 may obtain a target refrigeration temperature to control the temperature of the first storeroom 21 or obtain a target freezing temperature to control the temperature of the second storeroom 22.

The input button 211 may provide an electric signal or a user input signal (e.g., a voltage signal or a current signal) corresponding to the user input to the processor 290. The processor 290 may identify the user input based on a result of processing the user input signal.

The input button 211 may include a tact switch, a push switch, a slide switch, a toggle switch, a micro switch, or a touch switch.

The display 212 may obtain information about an operation of the refrigerator 1 from the processor 290 and display the information about the operation of the refrigerator 1. For example, the display 212 may display opening or closing of the door 30. The display 212 may also display a temperature measured in the first storeroom 21 or the second storeroom 22.

Furthermore, the display 212 may display the user input obtained in association with the operation of the refrigerator 1. For example, the display 212 may display a user input to open the door 30. The display 212 may also display the target refrigeration temperature for the first storeroom 21 or the target freezing temperature for the second storeroom 22 obtained by the input button 111.

The display 212 may include, for example, a liquid crystal display (LCD) panel, a light emitting diode (LED) panel, or the like.

The microphone 220 may obtain a sound wave (e.g., voice or sound) and convert the sound wave into an electric signal or a voice signal (e.g., a current signal or a voltage signal). For example, the microphone 220 may obtain voice of the user and convert the voice into an electric signal.

The microphone 220 may provide the converted electric signal (voice signal) to the processor 290. The processor 290 may identify a user input by voice based on a result of processing the voice signal.

The object sensor 230 may identify whether there is an object (e.g., a user) located around the refrigerator 1 and identify a distance to the object. For example, the object sensor 230 may identify whether there is a user located in front of the refrigerator 1 (e.g., in front of the door 30) and identify a distance to the user. Using the object sensor 230, the user may open the door 30 through a motion without the need for applying force to the door 30 to open the door 30.

The object sensor 230 may include e.g., a first range sensor 231 and a second range sensor 232.

The first range sensor 231 may be installed on one side of the door 30. The first range sensor 231 may transmit at least one of infrared rays, ultrasonic waves or radio waves forward from the refrigerator 1, or receive at least one of infrared rays, ultrasonic waves or radio waves reflected from an object (e.g., a user) located in front of the refrigerator 1.

For example, the first range sensor 231 may identify a distance between the first range sensor 231 and the object based on intensity of at least one of the received infrared rays, ultrasonic waves or radio waves. In another example, the first range sensor 231 may identify a distance between the first range sensor 231 and the object based on a difference (or difference in phase) between transmission time of at least one of the received infrared rays, ultrasonic waves or radio waves and reception time of at least one of the received infrared rays, ultrasonic waves or radio waves.

The first range sensor 231 may provide first distance data corresponding to the distance between the first range sensor 231 and the object to the processor 290.

The second range sensor 232 may be installed on e.g., the other side of the door 30. The first range sensor 232 may transmit at least one of infrared rays, ultrasonic waves or radio waves forward from the refrigerator 2, or receive at least one of infrared rays, ultrasonic waves or radio waves reflected from an object (e.g., a user) located in front of the refrigerator 1.

For example, the second range sensor 232 may be substantially the same as the first range sensor 231 and may provide second distance data corresponding to a distance between the second range sensor 231 and the object to the processor 290.

The processor 290 may identify whether there is an object (e.g., a user) located in front of the refrigerator 1 and/or a distance to the object based on the first distance data and/or the second distance data.

The first range sensor 231 and the second range sensor 232 may be installed at lower ends of the left and right doors 30, respectively. For example, the first distance sensor 231 may be arranged at the lower end of the left door and the second distance sensor 232 may be arranged at the lower end of the right door. However, the number and positions of the range sensors 231 and 232 are not limited to what are described above.

The first range sensor 231 and the second range sensor 232 may include at least one of e.g., an infrared sensor, a light detection and ranging (LIDAR) sensor, an ultrasonic sensor, or a radar sensor.

Each of the first door position sensor 240 and the second door position sensor 250 may be identical to the aforementioned door position sensor 190 in FIGS. 10 to 13. For example, the first door position sensor 240 may include a first position sensor 241 (see FIGS. 15 and 16) and a second position sensor 242 (see FIGS. 15 and 16), and the second door position sensor 250 may include a third position sensor and a fourth position sensor.

The processor 290 may identify rotation of the magnet 180 and the rotation direction (i.e., opening or closing of the door 30) based on an output signal from the first position sensor 241 and an output signal from the second position sensor 242.

An operation of the first door position sensor 240 will now be described, and it may be equally applied to the second door position sensor 250.

The door close sensor 260 may detect a closed state of the door 30, and provide an electric signal (a door close signal) corresponding to the closed state of the door 30 to the processor 290. For example, the door close sensor 260 may include a micro switch or a reed switch.

Each of the first door opening/closing device 270 and the second door opening/closing device 280 may be identical to the door opening/closing device 100 of FIGS. 2 to 9.

The first door opening/closing device 270 may automatically open or close the first door 31 of FIG. 1 under the control of the processor 290. Furthermore, the second door opening/closing device 280 may automatically open or close the second door 32 of FIG. 1 under the control of the processor 290.

The first door opening/closing device 270 may include a first motor driver 271 and a first driving motor 272. The first door opening/closing device 270 may further include a plurality of gears that deliver the rotation of the first driving motor 272 to the hinge of the refrigerator 1.

The first motor driver 271 may receive a target speed command or torque command from the processor 290, and provide a driving current corresponding to the target speed command or the target torque command to the first driving motor 272. For example, the first motor driver 271 may apply a pulse-width-modulated (PWMed) driving voltage to the first driving motor 272 to provide a driving current to the first driving motor 272.

For example, the first motor driver 271 may control the driving current to be provided to the first driving motor 272 based on a difference between the target speed and a measured speed of the first driving motor 272. The first motor driver 271 may increase a duty ratio of the PWMed driving voltage to increase the driving current in response to the measured speed of the first driving motor 272 being lower than the target speed. Furthermore, the first motor driver 271 may reduce the duty ratio of the PWMed driving voltage to reduce the driving current in response to the measured speed of the first driving motor 272 being higher than the target speed.

The first motor driver 271 may control the duty ratio of the PWMed driving voltage based on target torque. For example, the first motor driver 271 may apply a driving voltage of 100% duty ratio to the driving motor 110 upon reception of a maximum torque command from the processor 290.

Furthermore, the first motor driver 271 may provide information about rotation of the first driving motor 272 in response to a target speed command or torque command from the processor 290. For example, the first motor driver 271 may provide information about a driving current applied to the first driving motor 272 or information about rotation speed of the first driving motor 272 to the processor 290.

The first driving motor 272 may be identical to the aforementioned driving motor 110 in FIGS. 2 to 9.

The first driving motor 272 may produce torque to open or close the first door 31.

The first driving motor 272 may include a stator fixed to the first door 31 and a rotor arranged to be rotated against the stator. The rotor may be connected to a rotation shaft of the first driving motor 272. The rotor may be rotated through magnetic interaction with the stator, and the rotation of the rotor may be delivered to the plurality of gears through the rotation shaft.

The first driving motor 272 may include e.g., a brush-less direct current (BLDC) motor or a permanent synchronous motor (PMSM) capable of easily controlling the rotation speed.

The second door opening/closing device 280 may include a second motor driver 281 and a second driving motor 282. The second motor driver 281 and the second driving motor 282 may correspond to the first motor driver 271 and the first driving motor 272, respectively.

The processor 290 may be mounted on a PCB arranged in the door 30 or a PCB arranged in the housing 10.

The processor 290 may be operationally or electrically connected to the control panel 210, the microphone 220, the object sensor 230, the first door position sensor 240, the second door position sensor 250, the door close sensor 260, the first door opening/closing device 270, and/or the second door opening/closing device 280.

The processor 290 may process an output signal from the control panel 210, the microphone 220, the object sensor 230, the first door position sensor 240, the second door position sensor 250 or the door close sensor 260, and output a control signal for controlling the first door opening/closing device 270 and/or the second door opening/closing device 280.

The processor 290 may include a memory 291 for storing a program (or a plurality of instructions) or data for processing signals and providing control signals. For example, the memory 191 may include a volatile memory, such as a static random access memory (S-RAM), a dynamic RAM (D-RAM), or the like, and a non-volatile memory, such as a read only memory (ROM), an erasable programmable ROM (EPROM) or the like. The memory 291 may be integrated with the processor 290 or provided as a semiconductor device separated from the processor 290.

The processor 290 may process a signal based on the program or data stored in the memory 291, and may further include a processing core (e.g., an operation circuit, a storage circuit, and a control circuit) that outputs a control signal.

The processor 290 may process a user input signal from the control panel 210 and identify a user input. For example, the processor 290 may identify a user input to open the door 30 or a user input to close the door 30. The processor 290 may control the door opening/closing device 100 to open or close the door 30 based on the user input signal from the control panel 210.

The processor 290 may control the first door opening/closing device 270 and/or the second door opening/closing device 280 to open or close the first door 31 and the second door 32 separately based on the user input signal from the control panel 210. For example, the processor 290 may control the first door opening/closing device 270 to selectively open the first door 31 based on the user input signal to open the first door 31. Furthermore, the processor 290 may control the second door opening/closing device 280 to selectively open the second door 32 based on the user input signal to open the second door 32.

The processor 290 may process a voice signal from the microphone 220 to identify a user input by voice. For example, the processor 290 may identify voice to open the door 30 or voice to close the door 30. The processor 290 may control the first door opening/closing device 270 and/or the second door opening/closing device 280 to open or close the door 30 based on a voice signal from the microphone 220.

The processor 290 may control the first door opening/closing device 270 and/or the second door opening/closing device 280 to open or close the first door 31 and the second door 32 separately based on the user voice signal from the microphone 220. For example, the processor 290 may control the first door opening/closing device 270 to selectively open the first door 31 based on the user voice signal to open the first door 31. Furthermore, the processor 290 may control the second door opening/closing device 280 to selectively open the second door 32 based on the user voice signal to open the second door 32.

The processor 290 may process first distance data and second distance data from the object sensor 230, and identify whether there is a user in front of the refrigerator 1 and/or a distance to the user.

For example, the processor 290 may identify a relative position of the user by using trilateration. The processor 290 may identify the relative position of the user based on a set distance between the first range sensor 231 and the second range sensor 232, a first distance based on the first distance data and a second distance based on the second distance data. For example, the processor 290 may identify whether the user is located on the front left or front right of the refrigerator 1. Further, the processor 290 may identify a shortest distance between the front side of the refrigerator 1 and the user and/or a shortest distance between a center line passing through the center of the refrigerator 1 and perpendicular to the front of the refrigerator 1 and the user.

The processor 290 may control the first door opening/closing device 270 and/or the second door opening/closing device 280 to open or close the first door 31 and the second door 32 based on whether there is a user located in front of the refrigerator 1 and/or a position of the user.

For example, when determining that opening or closing of the door 30 is interfered with by the user, the processor 290 may not open or close the door 30. Furthermore, the processor 290 may output a sound message indicating that it is possible to open or close the door 30.

In another example, when determining that opening or closing of the door 30 is interfered with by the user, the processor 290 may open or close the door 30 to such an extent that the opening or closing of the door 30 is not interfered with by the user. In other words, the processor 290 may partially open or close the door 30. When determining that opening or closing of the door 30 is not interfered with by the user, the processor 290 may fully open or close the door 30 that has been partially opened or closed.

The processor 290 may process an output signal from the door position sensor 240 or 250, and identify an angle of the door 31 or 32 (e.g., an angle between a direction pointed by the closed door and a direction pointed by the open door). Furthermore, the processor 290 may identify a direction in which the door 31 or 32 is rotated (i.e., whether the door is opened or closed).

How the angle of the door 31 or 32 is identified based on the output signal from the door position sensor 240 or 250 will now be described in detail.

The processor 290 may control the motor driver 271 or 281 to control the speed to open the door 31 or 32 (i.e., a first directional rotation speed) based on the angle of the door 31 or 32. For example, the processor 290 may control the rotation speed of the door 31 or 32 so that the door 31 or 32 may be naturally opened to a target angle.

The processor 290 may control the motor driver 271 or 281 to control the speed to close the door 31 or 32 (i.e., a second directional rotation speed) based on the angle of the door 31 or 32. For example, the processor 290 may control the rotation speed of the door 31 or 32 to naturally close the door 31 or 32.

Accordingly, the refrigerator 1 may not only automatically open or close the door 31 or 32 but also naturally open or close the door 31 or 32 based on the position (rotation angle) of the identified door 31 or 32.

The processor 290 may control the motor drivers 271 and 281 to close the first and second doors 31 and 32 at different times. For example, the processor 290 may control the motor drivers 271 and 281 to close the second door 32 after the first door 31 is closed. For this, the processor 290 may control the motor drivers 271 and 281 to start closing the first door 31 first and then start closing the second door 32. The processor 290 may control the motor drivers 271 and 281 to make the closing speed of the first door 31 higher than the closing speed of the second door 32. The processor 290 may control the motor drivers 271 and 281 to temporarily stop closing the second door 32 while the first door 31 is being closed.

Hence, the refrigerator 1 may close the first and second doors 31 and 32 without failing to close the first and second doors 31 and 32 due to interference with each other.

The processor 290 may identify obstruction of the door 31 or 32 based on a change in angle of the door 31 or 32. The processor 290 may control the motor driver 271 or 281 to stop rotating the door 31 or 32 in response to the obstruction of the door 31 or 32. When the obstruction of one of the doors 31 and 32 is identified, the processor 290 may open the other door 32 or 31 and then close the door 31 or 32.

This may prevent or suppress the motor driver 271 or 281 or the driving motor 272 or 282 from being overheated in driving the door 31 or 32. Furthermore, in a case that it is not possible to close one of the doors 31 and 32 due to interference with the other door 32 or 31, the refrigerator 1 may close the door 31 or 32 by avoiding the interference with the other door 32 or 31.

Figure 15:
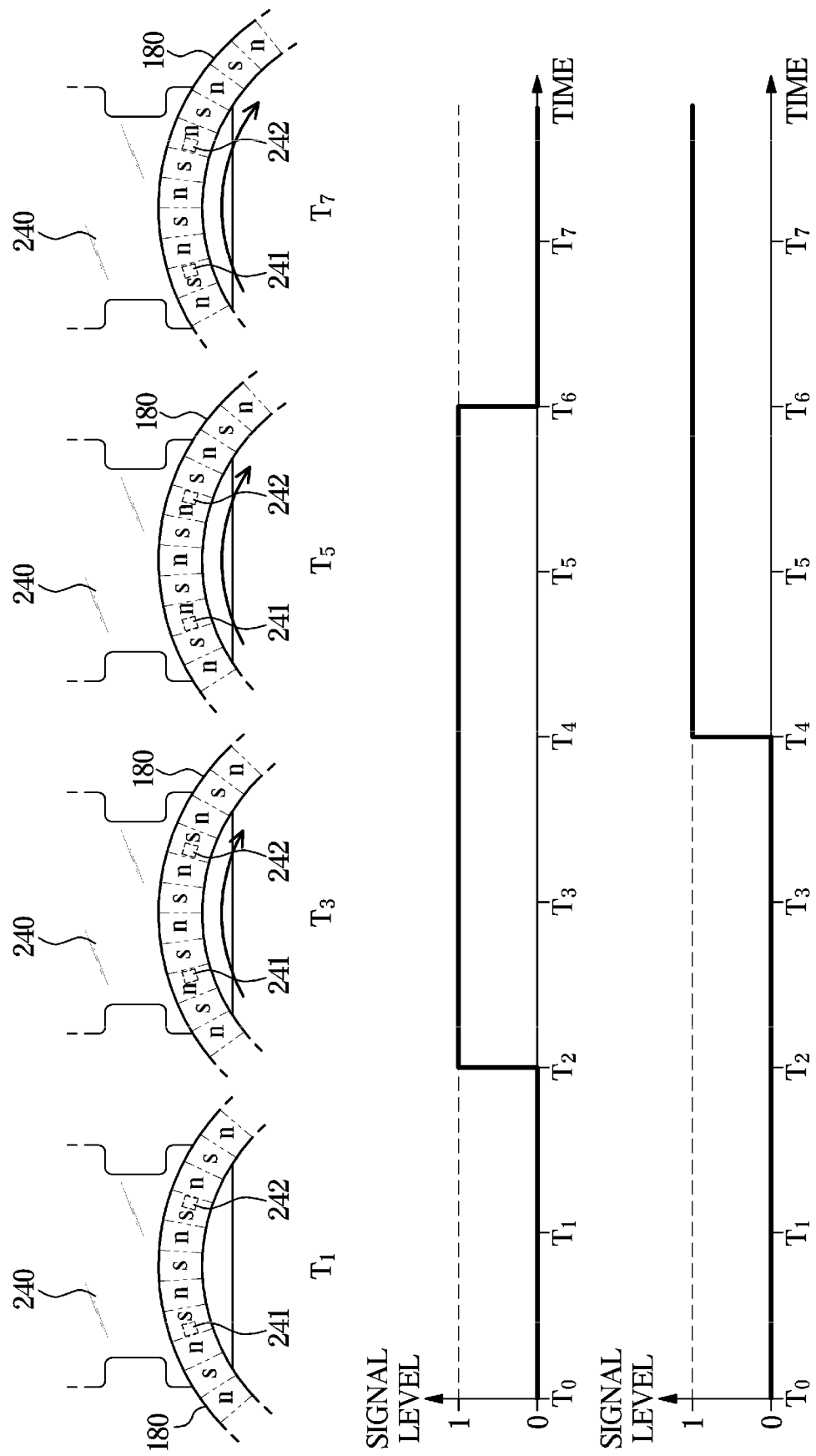
FIGS. 15 and 16 illustrate an example of how a refrigerator identifies a position of a door, according to an embodiment of the disclosure.

FIGS. 15 and 16 illustrate an example of how a refrigerator identifies a position of a door, according to an embodiment of the disclosure.

How the first door position sensor 240 identifies rotation and/or rotational displacement of the first door 31 will now be described, and it may be equally applied to how the second door position sensor 250 identifies rotation and/or rotational displacement of the second door 32.

The first door position sensor 240 may be installed at the door 30 of the refrigerator 1 for detecting rotation of the door 30. For example, the first door position sensor 240 may identify rotational displacement and/or rotational direction of the door 30.

The first door position sensor 240 may include the first position sensor 241 and/or the second position sensor 242.

For example, each of the first and second position sensors 241 and 242 may include a hall sensor that is able to detect a magnetic field produced from the magnet 180 and/or polarity of the magnetic field. As described above, the magnet 180 may be rotated against the main body of the door 30 when the door 30 is opened or closed. In this case, the magnet 180 may be shaped almost like a ring, and N poles and S poles may be alternately arranged along the circumference of the ring. The first and second sensors 241 and 242 fixed to the main body of the door 30 may detect a change in magnetic field (e.g., a change in polarity of the magnetic field) caused by rotation of the magnet 180.

The first and second position sensors 241 and 242 may be arranged on substantially the same plane. The first and second position sensors 241 and 242 may be arranged near the magnet 180 so as to detect a magnetic field from the magnet 180.

Each of the first and second position sensors 241 and 242 may provide an electric signal, i.e., a rotation detection signal (e.g., a current signal or a voltage signal) corresponding to the detected polarity of the magnet 180.

For example, each of the first and second position sensors 241 and 242 may provide a signal "0" to the processor 290 based on detection of the S pole of the magnet 180. Furthermore, each of the first and second position sensors 241 and 242 may provide a signal "1" to the processor 290 based on detection of the N pole of the magnet 180.

With the rotation of the magnet on which N poles and S poles are alternately arranged along the circumference, each of the first and second position sensors 241 and 242 may alternately output the signal "0" (a low level signal) and the signal "1" (a high level signal).

As shown in FIG. 15, when the magnet 180 is rotated clockwise with the rotation of the first door 31, both the first and second position sensors 241 and 242 may detect a magnetic field from the S pole of the magnet 180 at time T1. At time T1, both the first and second position sensors 241 and 242 may provide the signal "0" to the processor 290.

The magnet 180 may be rotated clockwise. At time T3, the first position sensor 241 may detect a magnetic field from the N pole of the magnet 180 and the second position sensor 242 may detect a magnetic field from the S pole of the magnet 180. At the time T3, the first position sensor 241 may provide the signal "1" to the processor 290, and the second position sensor 242 may provide the signal "0" to the processor 290.

As such, with the rotation of the magnet 180, the output signal of the first position sensor 241 may be changed from the signal "0" to the signal "1". For example, at around time T2, the first position sensor 241 may pass around a border between the S and N poles of the magnet 180, and the output signal of the first position sensor 241 may be changed from the signal "0" to the signal "1".

The magnet 180 may further be rotated clockwise. At time T5, both the first and second position sensors 241 and 242 may detect a magnetic field from the N pole of the magnet 180. At the time T5, both the first and second position sensors 241 and 242 may provide the signal "1" to the processor 290.

As such, with the rotation of the magnet 180, the output signal of the second position sensor 242 may be changed from the signal "0" to the signal "2". For example, at around time T4, the second position sensor 242 may pass around a border between the S and N poles of the magnet 180, and the output signal of the second position sensor 242 may be changed from the signal "0" to the signal "1".

The magnet 180 may further be rotated clockwise. At time T7, the first position sensor 241 may detect a magnetic field from the S pole of the magnet 180 and the second position sensor 242 may detect a magnetic field from the N pole of the magnet 180. At the time T7, the first position sensor 241 may provide the signal "0" to the processor 290, and the second position sensor 242 may provide the high level signal to the processor 290.

As such, with the rotation of the magnet 180, the output signal of the first position sensor 241 may be changed from the signal "1" to the signal "0". For example, at around time T6, the first position sensor 241 may pass around a border between the N and S poles of the magnet 180, and the output signal of the first position sensor 241 may be changed from the signal "1" to the signal "0".

While the magnet 180 is rotated clockwise, a pair of output signals of the first and second position sensors 241 and 242 may be changed in the following sequence: (0, 0), (1, 0), (1, 1), and (0, 1).

The processor 290 may detect rotation of the magnet 180 based on a change in at least one of the output signals of the first and second position sensors 241 and 242. Furthermore, the processor 290 may identify a rotated angle (angular displacement) of the magnet 180 based on the change in at least one of the output signals of the first and second position sensors 241 and 242. In other words, the processor 290 may detect rotation of the first door 31 based on a change in at least one of the output signals of the first and second position sensors 241 and 242.

For example, 24 N poles and 24 S poles may be alternately arranged along the circumference of the magnet 180. In other words, 48 poles (N or S poles) may be alternately arranged along the circumference of the magnet 180. One pole may occupy an angle of about 7.5 degrees.

While the output signals of the first and second position sensors 241 and 242 are being changed in the sequence of (0, 0), (1, 0), (1, 1), and (0, 1) in one cycle, the first and second position sensors 241 and 242 may pass one N pole and one S pole, respectively. For example, while the magnet 180 is rotated about 15 degrees, the first and second position sensors 241 and 242 may provide 4 pairs of output signals to the processor 290. In other words, while the first door 31 is rotated about 15 degrees, the first and second position sensors 241 and 242 may provide 4 pairs of output signals to the processor 290.

The processor 290 may identify that the first door 31 is rotated about 3.75 degrees based on a change in at least one of the output signal of the first position sensor 241 or the output signal of the second position sensor 242.

Furthermore, the processor 290 may identify a rotated angle of the first door 31 based on the number of changes in at least one of the output signal of the first position sensor 241 or the output signal of the second position sensor 242.

As shown in FIG. 16, when the magnet 180 is rotated counterclockwise with the rotation of the first door 31, both the first and second position sensors 241 and 242 may detect a magnetic field from the S pole of the magnet 180 at time T1, and provide the signal "0" to the processor 290.

At time T3 when the magnet 180 is rotated counterclockwise, the first position sensor 241 may detect a magnetic field from the S pole of the magnet 180 and provide the signal "0" to the processor 290. Furthermore, the second position sensor 242 may detect a magnetic field from the N pole of the magnet 180 and provide a signal "1" to the processor 290.

At time T5 when the magnet 180 is further rotated counterclockwise, both the first and second position sensors 241 and 242 may detect a magnetic field from the N pole of the magnet 180 and provide the signal "1" to the processor 290.

At time T7 when the magnet 180 is rotated counterclockwise, the first position sensor 241 may detect a magnetic field from the N pole of the magnet 180 and provide the signal "1" to the processor 290. Furthermore, the second position sensor 242 may detect a magnetic field from the S pole of the magnet 180 and provide a signal "0" to the processor 290.

While the magnet 180 is rotated counterclockwise, a pair of output signals of the first and second position sensors 241 and 242 may be changed in the following sequence: (0, 0), (0, 1), (1, 1), and (1, 0). As described above, while the magnet 180 is rotated clockwise, a pair of output signals of the first and second position sensors 241 and 242 may be changed in the following sequence: (0, 0), (1, 0), (1, 1), and (0, 1).

As such, while the magnet 180 is rotated clockwise, the output signal of the first position sensor 241 may be changed first and then the output signal of the second position sensor 242 may be changed. On the other hand, while the magnet 180 is rotated counterclockwise, the output signal of the second position sensor 242 may be changed first and then the output signal of the first position sensor 241 may be changed.

In other words, while the magnet 180 is rotated clockwise, the phase of the output signal of the first position sensor 241 may precede the phase of the output signal of the second position sensor 242. Furthermore, while the magnet 180 is rotated counterclockwise, the phase of the output signal of the second position sensor 242 may precede the phase of the output signal of the first position sensor 241.

The processor 290 may identify whether the magnet 180 is rotated clockwise or counterclockwise, based on a change in output signal from the first position sensor 241 and a change in output signal from the second position sensor 242. For example, the processor 290 may identify whether the magnet 180 is rotated clockwise or counterclockwise, based on comparison between the phase of the output signal from the first position sensor 241 and the phase of the output signal from the second position sensor 242.

The processor 290 may identify whether the door 31 is opened or closed based on comparison between the phase of the output signal from the first position sensor 241 and the phase of the output signal from the second position sensor 242.

The processor 290 may identify an angle of the first door 31 by accumulating the number of changes in at least one of the output signal from the first position sensor 241 or the output signal of the second position sensor 242 while the first door 31 is being opened. Furthermore, the processor 290 may identify an angle of the first door 31 by subtracting the number of changes in at least one of the output signal from the first position sensor 241 or the output signal of the second position sensor 242 while the first door 31 is being closed.

The processor 290 may process an output of the door close sensor 260 and identify that the first door 31 is closed. Furthermore, the processor 290 may initialize the angle of the first door 31 to 0 degree based on the identifying of the closed state of the first door 31. The angle of the first door 31 may be defined to be an angle between a direction of the first door 31 in the closed state to a direction of the first door 31 in the open state. Accordingly, the angle of the first door 31 in the closed state may be 0 degree.

As described above, the refrigerator 1 may identify a rotated angle (or open angle) of the first door 31 and a rotated angle (or open angle) of the second door 32 by detecting rotation of the magnet 180 on which the N and S poles are alternately arranged along the circumference.

In this case, the first and second doors 31 and 32 may be outswing double doors.

The first door 31 may be any of the doors installed on the left and right of the refrigerator 1. The first door 31 may include the rotating bar 31a for sealing the gap between the first door 31 and the second door 32, which are closed.

The second door 32 may be any of the doors installed on the left and right of the refrigerator 2. The second door 32 may be rotated around the hinge located opposite the first door 31, and may be rotated in an opposite direction from the first door 31 into the closed state.

For example, when the first door 31 is the left-hand outswing door installed on the left of the refrigerator 1, the second door 32 may be a right-hand outswing door installed on the right of the refrigerator 1. Furthermore, when the first door 31 is the right-hand outswing door installed on the right of the refrigerator 1, the second door 32 may be a left-hand outswing door installed on the left of the refrigerator 1.

As such, in the case that the first and second doors 31 and 32 that are rotated in opposite directions to be closed, neither of the first and second doors 31 and 32 might be completely closed due to interference between the first and second doors 31 and 32. For example, the rotating bar 31a arranged at the first door 31 may collide with the second door 32, causing hindrance to closing the first door 31 and closing the second door 32.

For such reasons, the processor 290 may control the first and second driving motors 272 and 282 (or the first and second motor drivers 271 and 281) to prevent the first and second doors 31 and 32 from being closed simultaneously. Further, the processor 290 may control the first and second driving motors 272 and 282 to close the second door 32 after closing the first door 31 in order to prevent interference from the rotating bar 31a installed at the first door 31.

How to control the first and second driving motors 272 and 282 (or the first and second motor drivers 271 and 281) to prevent the first and second doors 31 and 32 from being closed simultaneously will now be described.

Figure 17:
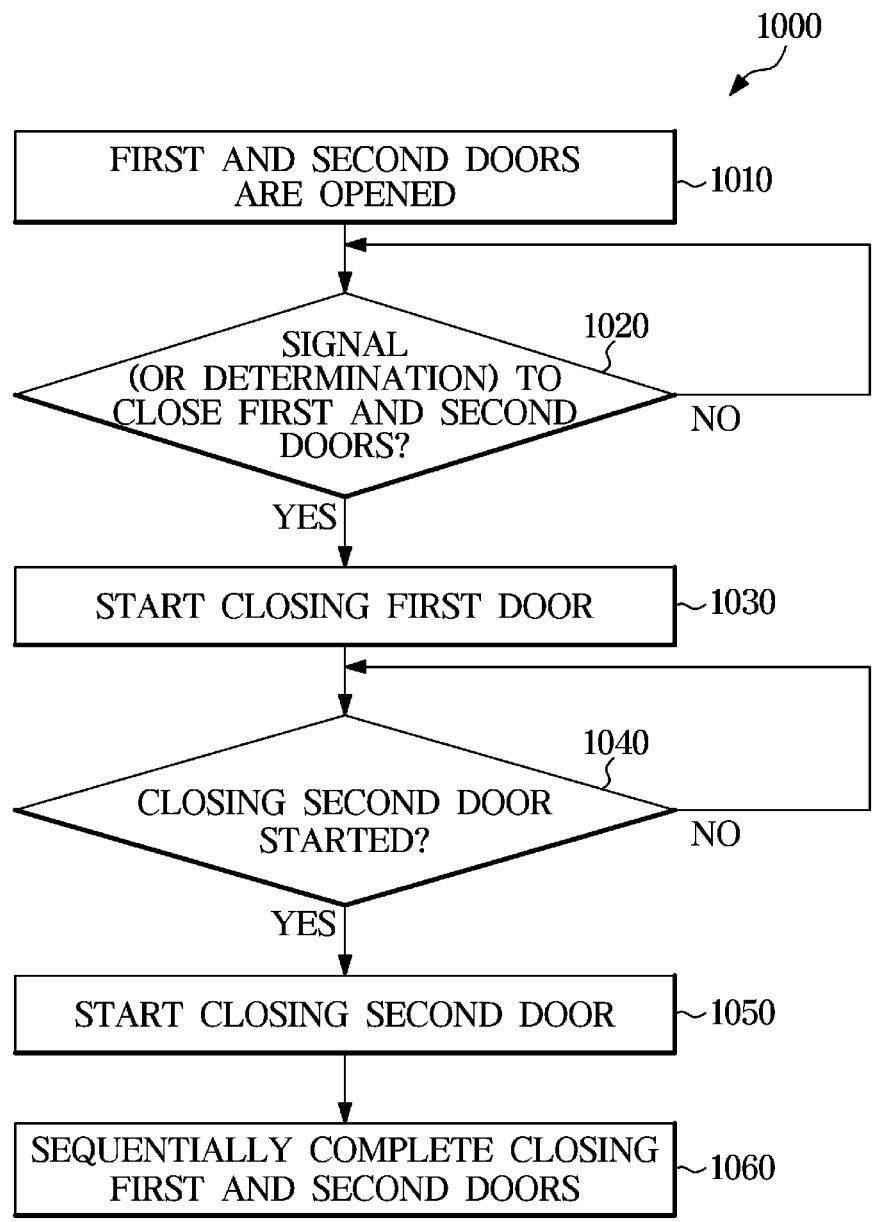
FIG. 17 is a flowchart illustrating how a refrigerator closes first and second doors, according to an embodiment of the disclosure.
Figure 18:
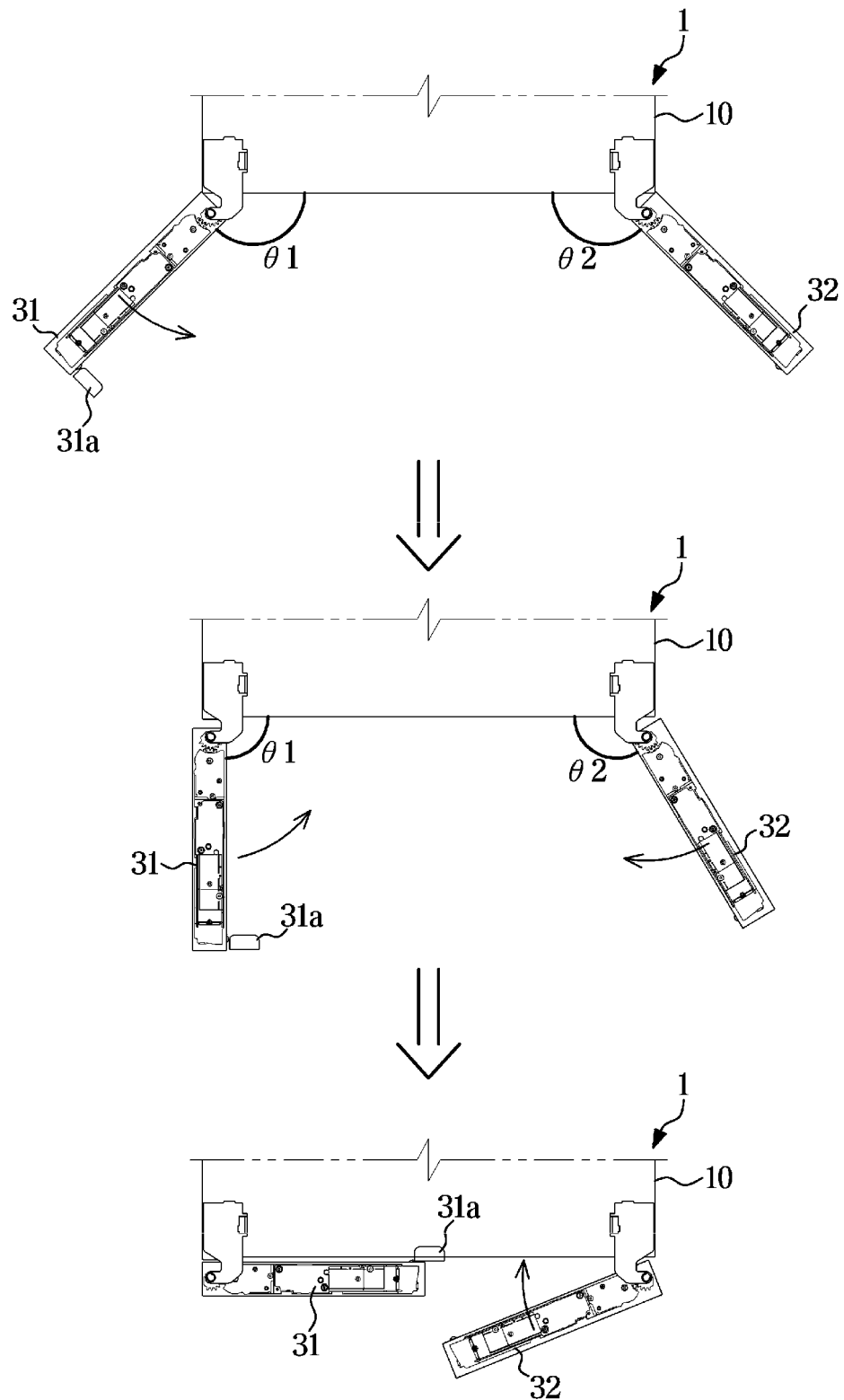
FIG. 18 illustrates an example of a refrigerator closing first and second doors opened at the same angle, according to an embodiment of the disclosure.
Figure 19:
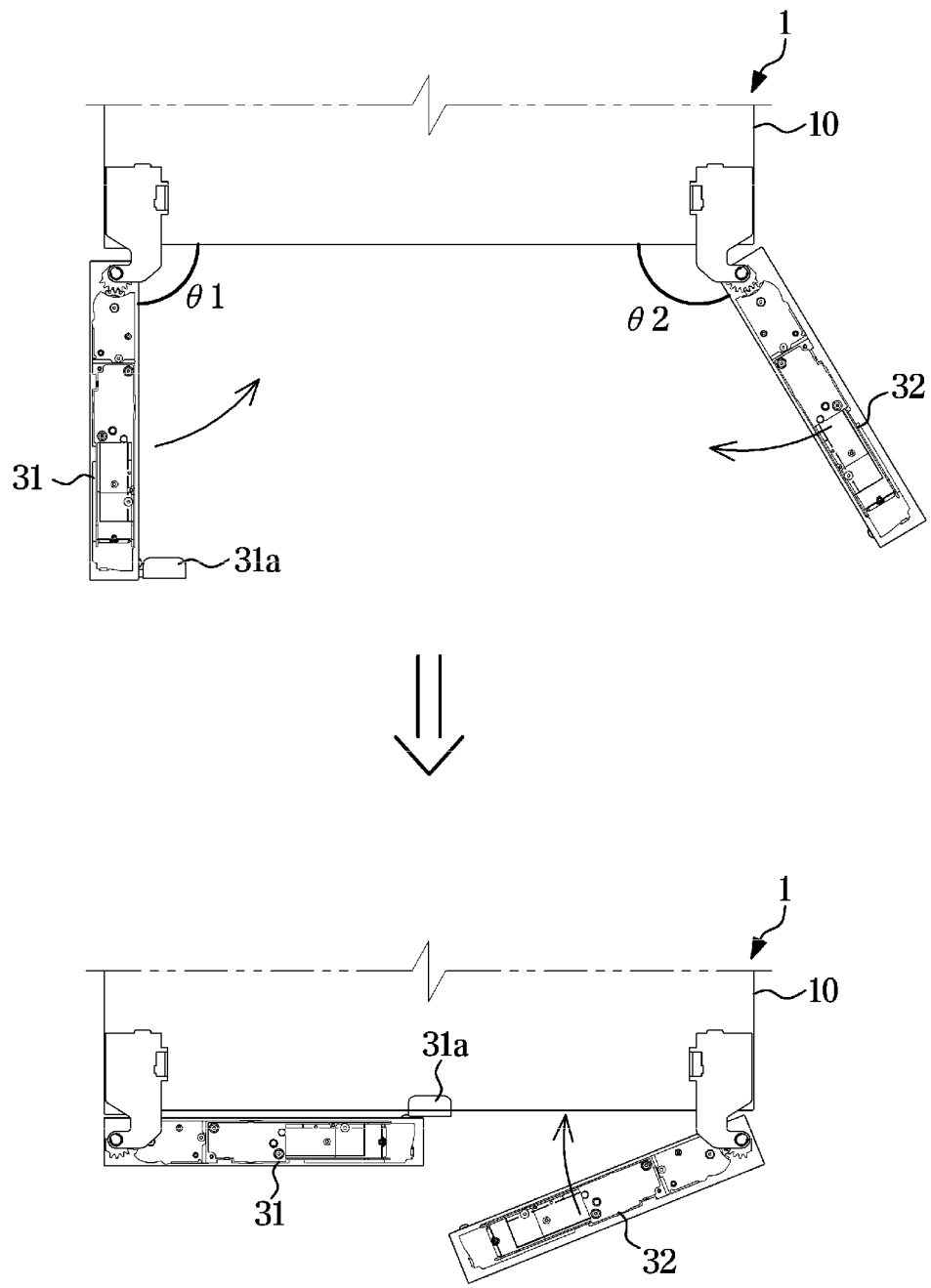
FIG. 19 illustrates an example of a refrigerator closing first and second doors opened at different angles, according to an embodiment of the disclosure.
Figure 20:
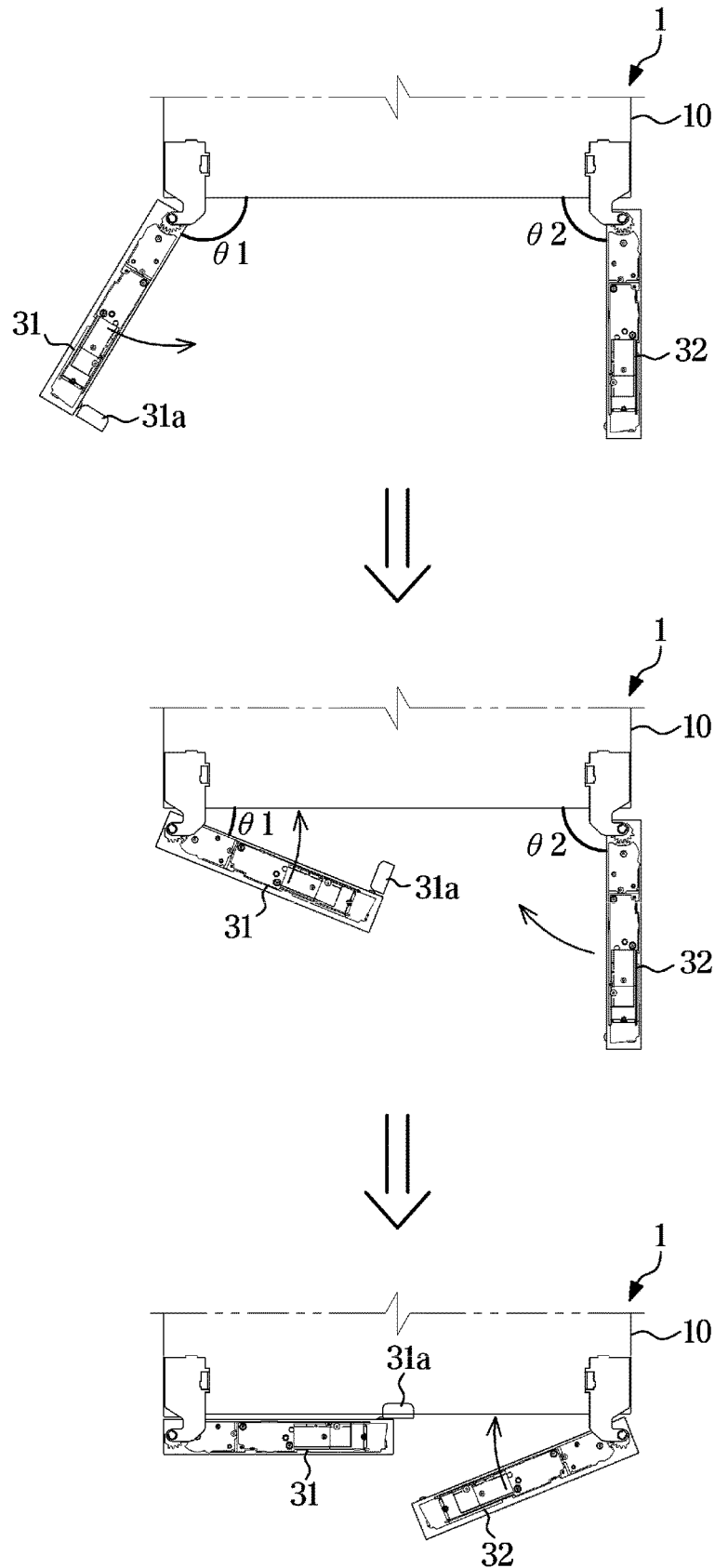
FIG. 20 illustrates an example of a refrigerator closing first and second doors opened at different angles, according to an embodiment of the disclosure.

FIG. 17 is a flowchart illustrating how a refrigerator closes first and second doors, according to an embodiment of the disclosure. FIG. 18 illustrates an example of a refrigerator closing first and second doors opened at the same angle, according to an embodiment of the disclosure. FIG. 19 illustrates an example of a refrigerator closing first and second doors opened at different angles, according to an embodiment of the disclosure. FIG. 20 illustrates an example of a refrigerator closing first and second doors opened at different angles, according to an embodiment of the disclosure.

In conjunction with FIGS. 17, 18, 19 and 20, a method 1000 of the refrigerator 1 closing the first and second doors 31 and 32 will be described.

The first and second doors 31 and 32 of the refrigerator 1 may be in the opened state, in 1010.

The first and second doors 31 and 32 may be manually opened by the user, or may be automatically opened by the first and second door opening/closing devices 270 and 280.

The processor 290 may identify an angle $\Theta 1$ (referred to as an angle by which the first door is opened or an angle of the first door) between a position at which the first door 31 is closed and a position at which the first door 31 is opened with respect to the hinge axis, based on the output of the first door position sensor 240 while the first door 31 is being opened. Furthermore, the processor 290 may identify an angle $\Theta 2$ by which the second door 32 is opened based on the output of the second door position sensor 250 while the second door 32 is being opened.

The refrigerator 1 may identify whether a signal to close both the first and second doors 31 and 32 is obtained or whether to close both the first and second doors 31 and 32, in 1020.

The user may enter a user input to close both the first and second doors 31 and 32 through the control panel 210. The processor 290 may receive the signal to close both the first and second doors 31 and 32 from the control panel 210 and process the received signal. Furthermore, the user may utter a voice to close both the first and second doors 31 and 32. The processor 290 may receive a voice signal to close both the first and second doors 31 and 32 from the microphone 220, and process the received voice signal.

The processor 290 may count a time elapsed after the first and second doors 31 and 32 are opened. The processor 290 may determine to close both the first and second doors 31 and 32 when the time counted reaches or exceeds a set reference time.

When the signal to close both the first and second doors 31 and 32 is not identified in 1020, the refrigerator 1 may be on standby with both the first and second doors 31 and 32 opened.

When the signal (or determination) to close both the first and second doors 31 and 32 is identified in 1020, the refrigerator 1 may start closing the first door 31, in 1030.

The processor 290 may control the first driving motor 272 to close the first door 31 based on the signal (or determination) to close both the first and second doors 31 and 32. Specifically, the processor 290 may control the first motor driver 271 for the first driving motor 272 to generate torque to close the first door 31.

After starting to close the first door 31, the refrigerator 1 may determine whether to start closing the second door 32, in 1040.

When the speed at which the first door 31 is closed depending on the angle $\Theta 1$ of the first door 31 is equal to the speed at which the second door 32 is closed depending on the angle $\Theta 2$ of the second door 32, the processor 290 may determine a time to start closing the second door 32 at a different time from the first door 31 or closing the second door 32 later than the first door 31.

When it is not determined to start closing the second door 32 in 1040, the refrigerator 1 may be on standby without starting to close the second door 32.

When it is determined to start closing the second door 32 in 1040, the refrigerator 1 may start closing the second door 32 in 1050.

The processor 290 may continue to identify the angle Θ1 of the first door 31 and the angle Θ2 of the second door 32 while closing the first door 31.

The processor 290 may control the second driving motor 282 to close the second door 32 based on the angle Θ1 of the first door 31 and the angle Θ2 of the second door 32 or based on a time elapsed after starting to close the first door 31. Specifically, the processor 290 may control the second motor driver 281 for the second driving motor 282 to generate torque to close the second door 32.

For example, as shown in FIG. 18, when the closing of the first and second doors 31 and 32 is started, the angle Θ1 by which the first door 31 is opened may be equal to the angle Θ2 by which the second door 32 is opened. Furthermore, as described above, the processor 290 may start closing the first door 31 first. Accordingly, the difference between the angle Θ1 of the first door 31 and the angle Θ2 of the second door 32 may increase.

The processor 290 may start closing the second door 32 when the angle Θ1 of the first door 31 being closed is smaller than the angle Θ2 of the second door 32 and the difference between the angle Θ1 of the first door 31 and the angle Θ2 of the second door 2 is equal to or greater than a set first reference angle, as shown in FIG. 18.

The first reference angle may be set experimentally or empirically. For example, the first reference angle may be set to a minimum value of the difference between the angle Θ1 of the first door 31 and the angle Θ2 of the second door 32, at which the first door 31 may be completely closed without interference with the second door 32. The first reference angle may be set depending on e.g., thickness of the first and second doors 31 and 32 and/or the size of the rotating bar 31a.

Furthermore, the processor 290 may start closing the second door 32 when the time elapsed after starting to close the first door 31 is equal to or greater than a first time. In this case, the first time may be set based on a time at which the difference between the angle Θ1 of the first door 31 and the angle Θ2 of the second door 32 becomes the first reference angle or more after the closing of the first door 31 is started.

Accordingly, as shown in FIG. 18, the first door 31 may be closed first and then the second door 32 may be closed.

In another example, as shown in FIG. 19, when the closing of the first and second doors 31 and 32 is started, the angle Θ1 by which the first door 31 is opened may be smaller than the angle Θ2 by which the second door 32 is opened.

The processor 290 may start closing the second door 32 when the angle Θ1 of the first door 31 is smaller than the angle Θ2 of the second door 32 and the difference between the angle Θ1 of the first door 31 and the angle Θ2 of the second door 2 is equal to or greater than the first reference angle.

When the closing of the first and second doors 31 and 32 is started, the difference between the angle Θ1 of the first door 31 and the angle Θ2 of the second door 32 may already be equal to or more than the first reference angle or may be approximately the first reference angle. In this case, the processor 290 may start closing the second door 32 immediately after starting to close the first door 31.

Accordingly, as shown in FIG. 19, the first door 31 may be closed first and then the second door 32 may be closed.

In another example, as shown in FIG. 20, when the closing of the first and second doors 31 and 32 is started, the angle Θ1 by which the first door 31 is opened may be larger than the angle Θ2 by which the second door 32 is opened.

The processor 290 may start closing the second door 32 when the angle Θ1 of the first door 31 being closed is smaller than the angle Θ2 of the second door 32 and the difference between the angle Θ1 of the first door 31 and the angle Θ2 of the second door 2 is equal to or greater than a set first reference angle, as shown in FIG. 20.

Furthermore, the processor 290 may start closing the second door 32 when a second time elapses after starting to close the first door 31. In this case, the second time may be greater than the first time at which the angle Θ1 by which the first door 31 is opened is equal to the angle Θ2 by which the second door 32 is opened.

Accordingly, as shown in FIG. 20, the first door 31 may be closed first and then the second door 32 may be closed.

The refrigerator 1 may complete closing the first and second doors 31 and 32 sequentially, in 1060.

The processor 290 may start closing the second door 32 depending on the angle Θ1 by which the first door 31 is opened and the angle Θ2 by which the second door 32 is opened after starting to close the first door 31. Accordingly, the first door 31 may be closed first and then the second door 32 may be closed.

As such, the refrigerator 1 may complete closing the second door 32 after completely closing the first door 31 first, by starting to close the second door 32 after starting to close the first door 31 based on the angle Θ1 of the first door 31 and the angle Θ2 of the second door 31. Hence, the refrigerator 1 may completely close both the first and second doors 31 and 32 without interference between the first and second doors 31 and 32.

Figure 21:
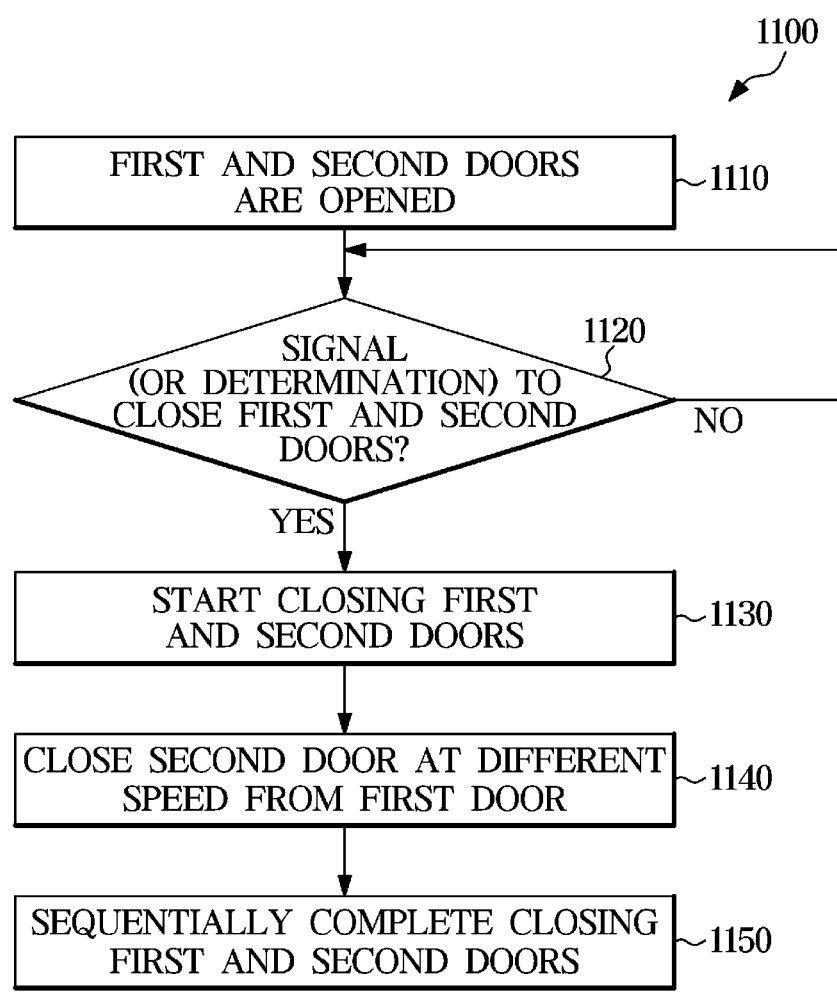
FIG. 21 is a flowchart illustrating how a refrigerator closes first and second doors, according to an embodiment of the disclosure.
Figure 22:
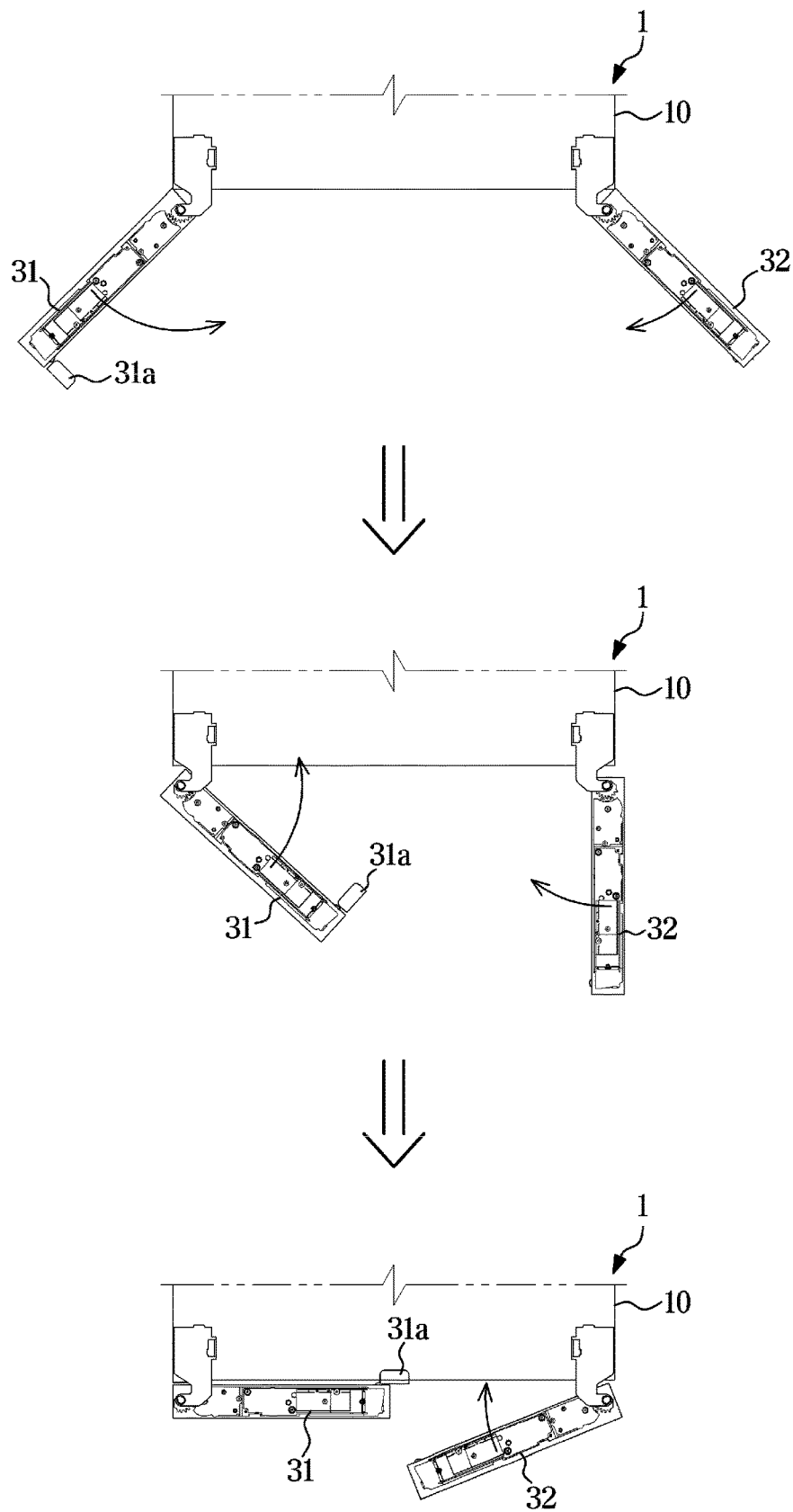
FIG. 22 illustrates an example of a refrigerator closing first and second doors at different speeds, according to an embodiment of the disclosure.

FIG. 21 is a flowchart illustrating how a refrigerator closes first and second doors, according to an embodiment of the disclosure. FIG. 22 illustrates an example of a refrigerator closing first and second doors at different speeds, according to an embodiment of the disclosure.

In conjunction with FIGS. 21 and 22, a method 1100 of the refrigerator 1 closing the first and second doors 31 and 32 will be described.

The first and second doors 31 and 32 of the refrigerator 1 may be in the opened state, in 1110. The refrigerator 1 may identify whether a signal to close both the first and second doors 31 and 32 is obtained or whether to close both the first and second doors 31 and 32, in 1120.

The operations 1110 and 1120 may be the same as the operations 1010 and 1020 shown in FIG. 17, respectively.

When the signal (or determination) to close both the first and second doors 31 and 32 is identified in 1120, the refrigerator 1 may start closing the first and second doors 31 and 32, in 1130. Furthermore, the refrigerator 1 may close the second door 32 at a different speed than the first door 31, in 1140.

The processor 290 may control the first and second driving motors 272 and 282 to close the first and second doors 31 and 32 as shown in FIG. 22, based on the signal (or determination) to close both the first and second doors 31 and 32. For example, the processor 290 may control the first motor driver 271 for the first driving motor 272 to generate first torque to close the first door 31 and control the second motor driver 281 for the second motor 282 to generate second torque to close the second door 32.

In this case, the first torque of the first driving motor 272 may be different from the second torque of the second driving motor 282. For example, the first torque of the first driving motor 272 may be larger than the second torque of the second driving motor 282.

Accordingly, as shown in FIG. 22, the speed at which the first door 31 is closed may be different from the speed at which the second door 32 is closed. For example, the speed at which the first door 31 is closed may be higher than the speed at which the second door 32 is closed.

As a result, as shown in FIG. 22, the first door 31 may be closed first and then the second door 32 may be closed.

The refrigerator 1 may complete closing the first and second doors 31 and 32 sequentially, in 1150.

The processor 290 may control the first and second driving motors 272 and 282 to simultaneously start closing the first and second doors 31 and 32 while making the speed at which the first door 31 is closed faster than the speed at which the second door 32 is closed. Accordingly, the first door 31 may be closed first and then the second door 32 may be closed.

As such, the refrigerator 1 may complete closing the second door 32 after completely closing the first door 31 first, by controlling the speed at which to close the first door 31 and the speed at which to close the second door 32. Hence, the refrigerator 1 may completely close both the first and second doors 31 and 32 without interference between the first and second doors 31 and 32.

Figure 23:
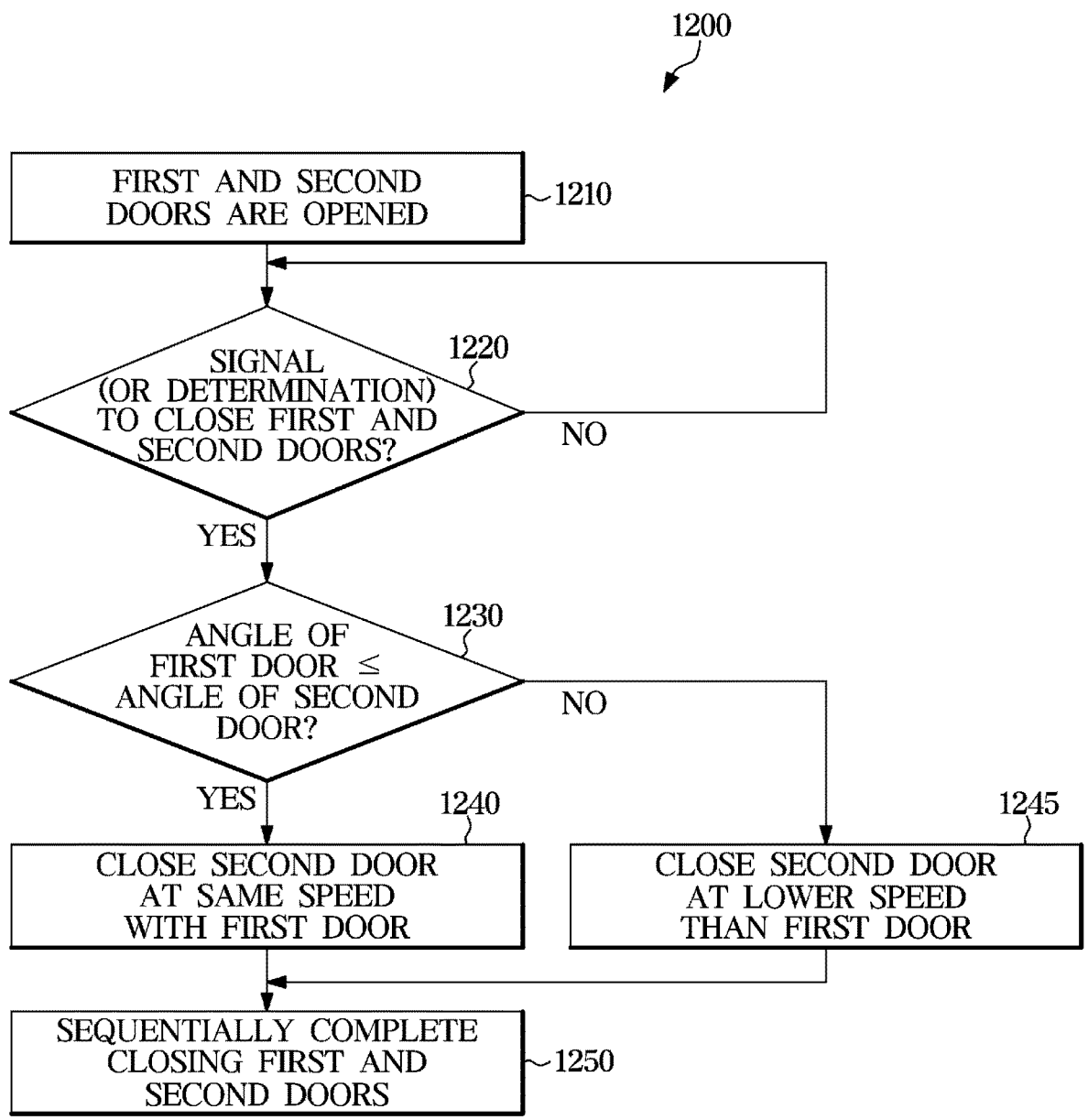
FIG. 23 is a flowchart illustrating how a refrigerator closes first and second doors, according to an embodiment of the disclosure.

FIG. 23 is a flowchart illustrating how a refrigerator closes first and second doors, according to an embodiment of the disclosure. FIG. 24 illustrates an example of a refrigerator closing first and second doors opened at different angles, according to an embodiment of the disclosure.

In conjunction with FIGS. 23 and 24, a method 1200 of the refrigerator 1 closing the first and second doors 31 and 32 will be described.

The first and second doors 31 and 32 of the refrigerator 1 may be in the opened state, in 1210. The refrigerator 1 may identify whether a signal to close both the first and second doors 31 and 32 is obtained or whether to close both the first and second doors 31 and 32, in 1220.

The operations 1210 and 1220 may be the same as the operations 1010 and 1020 shown in FIG. 17, respectively.

When the signal (or determination) to close both the first and second doors 31 and 32 is identified in 1220, the refrigerator 1 may identify whether the angle Θ1 of the first door 31 is equal to or smaller than the angle Θ2 of the second door 32, in 1230.

The processor 290 may identify the angle Θ1 of the first door 31 and the angle Θ2 of the second door 32 based on the signal (or determination) to close both the first and second doors 31 and 32. Furthermore, the processor 290 may compare the angle Θ1 of the first door 31 with the angle Θ2 of the second door 32, and identify whether the angle Θ1 of the first door 31 is equal to or smaller than the angle Θ2 of the second door 32.

When the angle Θ1 of the first door 31 is equal to or smaller than the angle Θ2 of the second door 32 in 1230, the refrigerator 1 may close the second door 32 at the same speed as the first door 31, in 1240.

For example, as shown in FIG. 24, when the angle Θ1 by which the first door 31 is opened is equal to or smaller than the angle Θ2 by which the second door 32 is opened, the processor 290 may close the second door 32 at the same speed as the first door 31 so that the first door 31 is closed earlier than the second door 32. The processor 290 may control the first and second driving motors 272 and 282 to close the first and second doors 31 and 32 at the same speed. Specifically, the processor 290 may control the first and second motor drivers 271 and 281 for the first and second driving motors 271 and 281 to generate the same torque.

Accordingly, as shown in FIG. 24, the first door 31 may be closed first and then the second door 32 may be closed.

When the angle Θ1 of the first door 31 is not equal to nor smaller than the angle Θ2 of the second door 32 in 1230, the refrigerator 1 may close the second door 32 at lower speed than the first door 31, in 1245.

When the angle Θ1 of the first door 31 is larger than the angle Θ2 of the second door 32, the processor 290 may close the first door 31 at higher speed than the second door 32 so that the first door 32 is closed earlier than the second door 32. The processor 290 may control the first and second driving motors 272 and 282 to close the first door faster than the second door 32. Specifically, the processor 290 may control the first and second motor drivers 271 and 281 for the first driving motor 271 to generate larger torque than the second driving motor 282.

The refrigerator 1 may complete closing the first and second doors 31 and 32 sequentially, in 1250.

The processor 290 may control the first and second driving motors 272 and 282 to simultaneously start closing the first and second doors 31 and 32 while making the speed at which the first door 31 is closed faster than the speed at which the second door 32 is closed. Accordingly, the first door 31 may be closed first and then the second door 32 may be closed.

As such, the refrigerator 1 may complete closing the second door 32 after completely closing the first door 31 first, by controlling the speed at which to close the first door 31 and the speed at which to close the second door 32. Hence, the refrigerator 1 may completely close both the first and second doors 31 and 32 without interference between the first and second doors 31 and 32.

Figure 25:
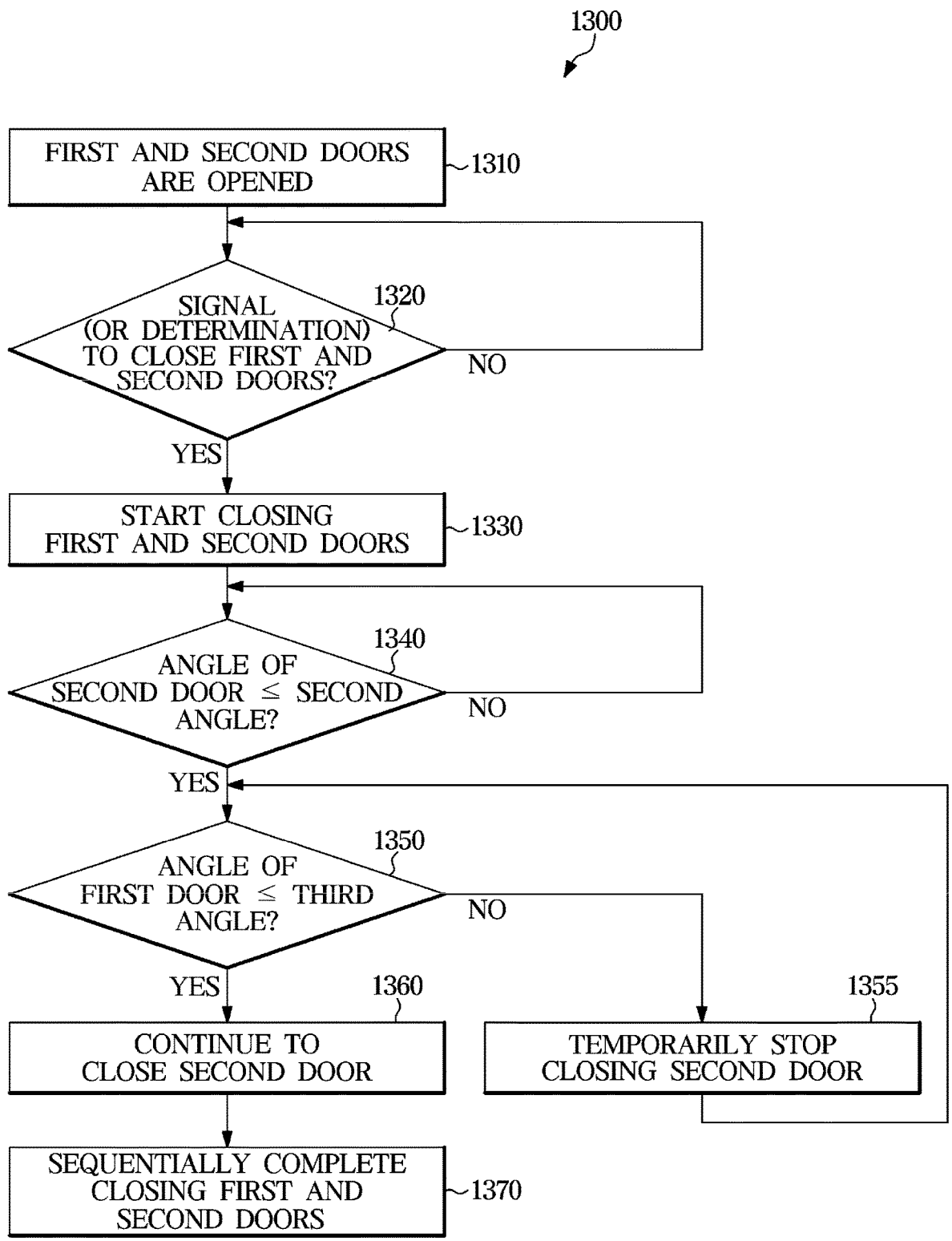
FIG. 25 is a flowchart illustrating how a refrigerator closes first and second doors, according to an embodiment of the disclosure.
Figure 26:
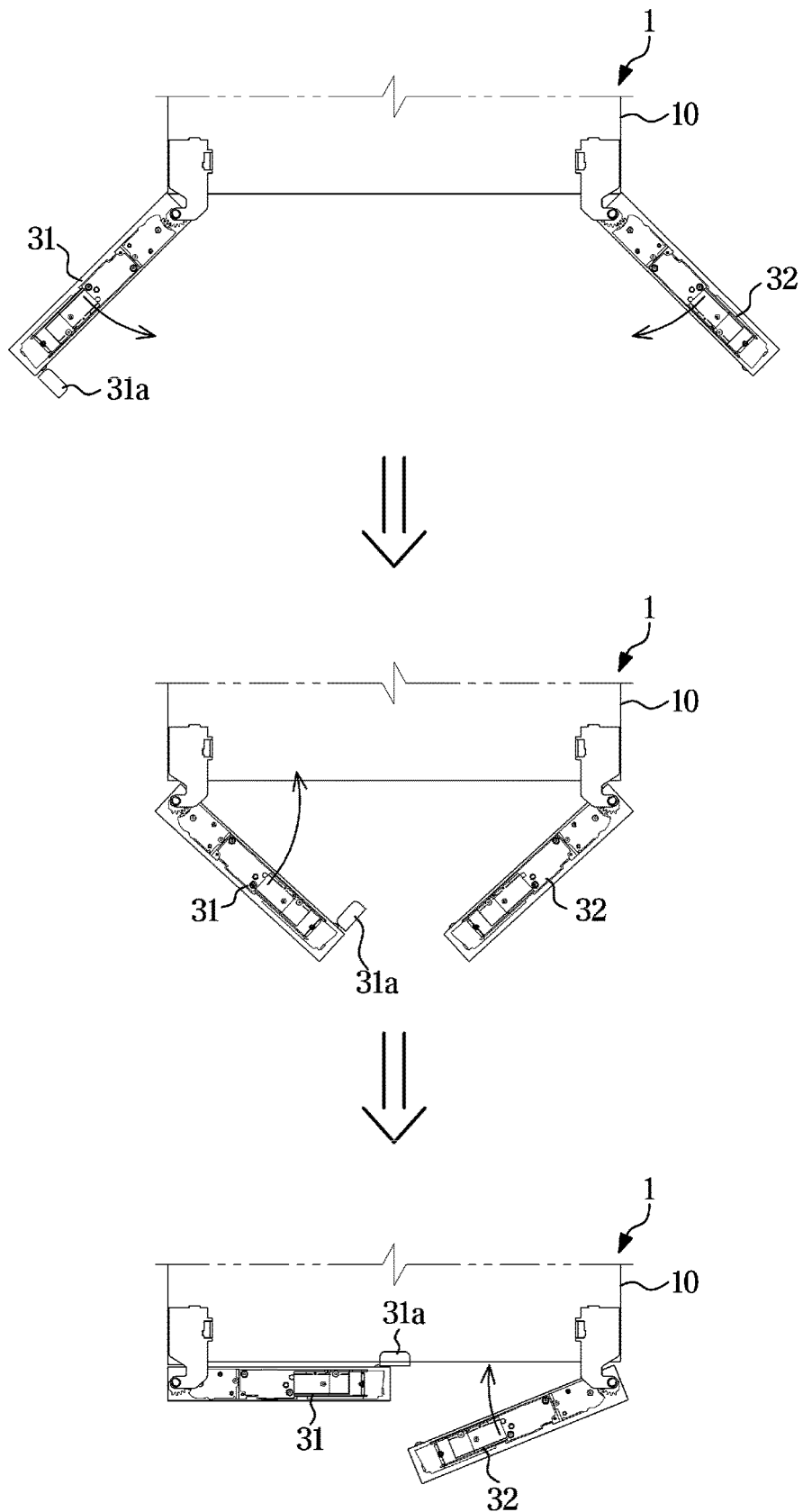
FIG. 26 illustrates an example of a refrigerator holding a second door while closing a first door, according to an embodiment of the disclosure.

FIG. 25 is a flowchart illustrating how a refrigerator closes first and second doors, according to an embodiment of the disclosure. FIG. 26 illustrates an example of a refrigerator holding a second door while closing a first door, according to an embodiment of the disclosure.

In conjunction with FIGS. 25 and 26, a method 1300 of the refrigerator 1 closing the first and second doors 31 and 32 will be described.

The first and second doors 31 and 32 of the refrigerator 1 may be in the opened state, in 1310. The refrigerator 1 may identify whether a signal to close both the first and second doors 31 and 32 is obtained or whether to close both the first and second doors 31 and 32, in 1320.

The operations 1310 and 1320 may be the same as the operations 1010 and 1020 shown in FIG. 17, respectively.

When the signal (or determination) to close both the first and second doors 31 and 32 is identified in 1320, the refrigerator 1 may start closing the first and second doors 31 and 32, in 1330.

The processor 290 may control the first and second driving motors 272 and 282 to close the first and second doors 31 and 32 as shown in FIG. 26, based on the signal (or determination) to close both the first and second doors 31 and 32.

The refrigerator 1 may identify whether the angle Θ2 of the second door 32 is equal to or smaller than a second reference angle, in 1340.

The processor 290 may identify the angle Θ1 of the first door 31 and the angle Θ2 of the second door 32 while closing both the first and second doors 31 and 32.

The processor 290 may compare the angle Θ2 of the second door 32 with the second reference angle, and identify whether the angle Θ2 of the second door 32 is equal to or smaller than the second reference angle.

The second reference angle may be set experimentally or empirically. For example, the second reference angle may be set to a minimum angle of the second door 32 at which the first door 31 may be completely closed without interference with the second door 32. The second reference angle may be set depending on e.g., thickness of the first and second doors 31 and 32 and/or the size of the rotating bar 31a.

When the angle $\Theta 2$ of the second door 32 is not equal to or smaller than the second reference angle in 1340, the refrigerator 1 may continue to close the first and second doors 31 and 32.

When the angle $\Theta 2$ of the second door 32 is equal to or smaller than the second reference angle in 1340, the refrigerator 2 may identify whether the angle $\Theta 1$ of the first door 31 is equal to or smaller than a third reference angle, in 1350.

When the angle $\Theta 2$ of the second door 32 is equal to or smaller than the second reference angle, the processor 290 may compare the angle $\Theta 1$ of the first door 31 with the third reference angle and identify whether the angle $\Theta 1$ of the first door 31 is equal to or smaller than the third reference angle.

The third reference angle may be set experimentally or empirically. For example, the third reference angle may be set to a difference between the first reference angle and the second reference angle. The third reference angle may represent a minimum value of the difference between the angle $\Theta 1$ of the first door 31 and the angle $\Theta 2$ of the second door 32, at which the first door 31 may be completely closed without interference with the second door 32. For example, once the second reference angle is set to a minimum angle of the second door 32 at which the first door 31 may be completely closed without interference with the second door 32, the third reference angle may be 0 degree. In other words, the processor 290 may identify whether the first door 31 has been closed when the angle $\Theta 2$ of the second door 32 is equal to or smaller than the second reference angle.

When the angle $\Theta 1$ of the first door 31 is not equal to nor smaller than the third reference angle in 1350, may the refrigerator 1 stop closing the second door 32, in 1355.

The processor 290 may control the second driving motor 282 to stop closing the second door 32 based on the angle $\Theta 1$ of the first door 31 larger than the third reference angle, as shown in FIG. 26. In other words, the processor 290 may control the second driving motor 282 to hold the second door 32 at around the second reference angle. Specifically, the processor 290 may control the second motor driver 281 to stop the second driving motor 282 at around the second reference angle.

After stopping closing the second door 32, the refrigerator 1 may identify whether the angle $\Theta 1$ of the first door 31 is equal to or smaller than the third reference angle, in 1350.

When the angle $\Theta 1$ of the first door 31 is equal to or smaller than the third reference angle in 1350, the refrigerator 1 may continue or resume closing the second door 32, in 1360.

When the angle $\Theta 2$ of the second door 32 is about the second reference angle and the angle $\Theta 1$ of the first door 31 is equal to or smaller than the third reference angle, the processor 290 may control the second driving motor 282 to continue to close the second door 32.

Furthermore, the processor 290 may hold the second door 32 at the second reference angle until the angle $\Theta 1$ of the first door 31 reaches the third reference angle when the angle $\Theta 2$ of the second door 32 is about the second reference angle and the angle $\Theta 1$ of the first door 31 is larger than the third reference angle, and control the second driving motor 282 to resume closing the second door 32 when the angle $\Theta 1$ of the first door 31 reaches the third reference angle, as shown in FIG. 26.

The refrigerator 1 may complete closing the first and second doors 31 and 32 sequentially, in 1350.

The processor 290 may temporarily stop closing the second door 32 based on the angle $\Theta 1$ of the first door 31 and the angle $\Theta 2$ of the second door 32 after starting to simultaneously close both first and second doors 31 and 32. Accordingly, the first door 31 may be closed first and then the second door 32 may be closed.

As such, the refrigerator 1 may complete closing the second door 32 after completely closing the first door 31 first, by temporarily stopping closing the second door 32 based on the angle $\Theta 1$ of the first door 31 and the angle $\Theta 2$ of the second door 31. Hence, the refrigerator 1 may completely close both the first and second doors 31 and 32 without interference between the first and second doors 31 and 32.

Figure 27:
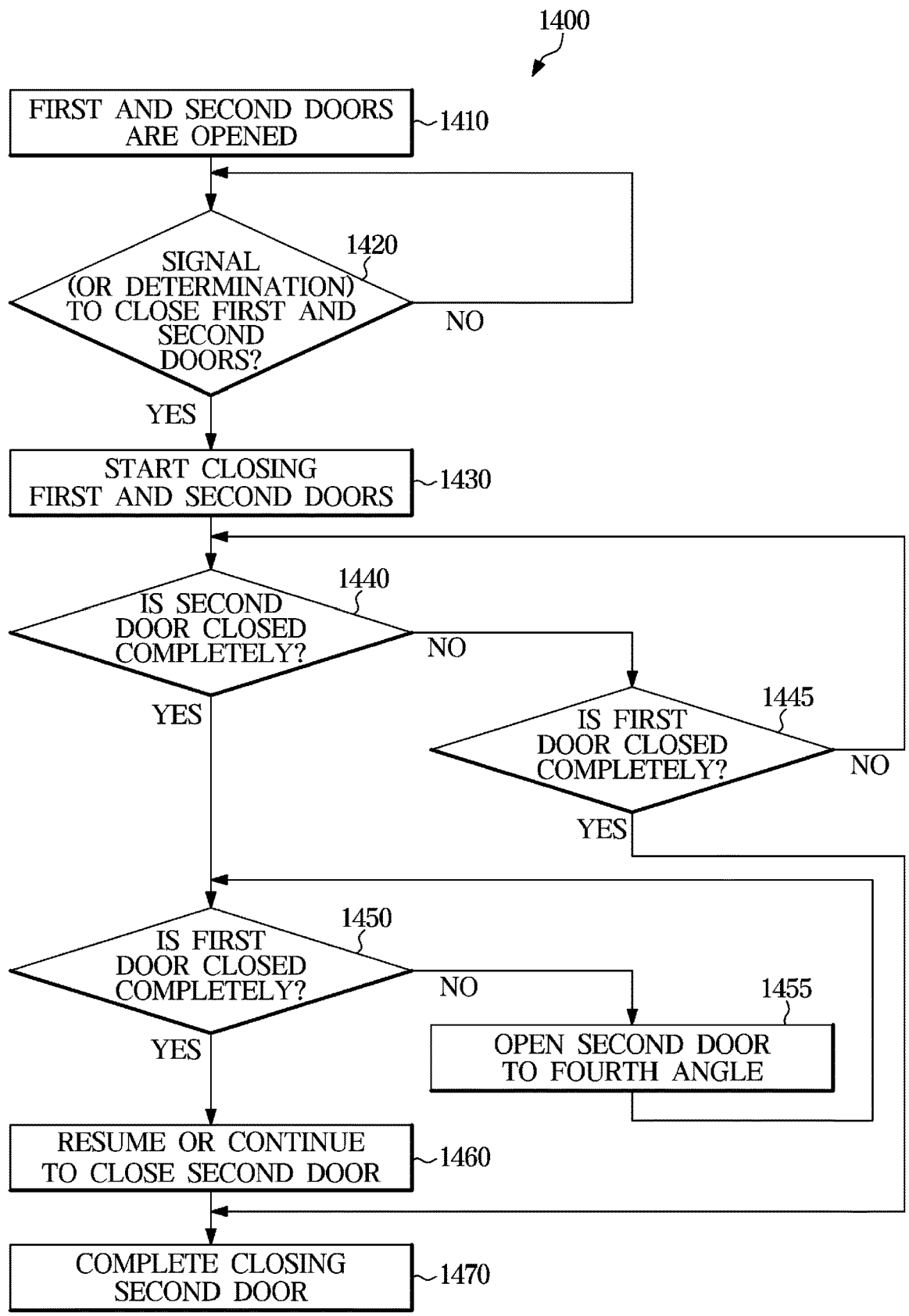
FIG. 27 is a flowchart illustrating how a refrigerator closes first and second doors, according to an embodiment of the disclosure.
Figure 28:
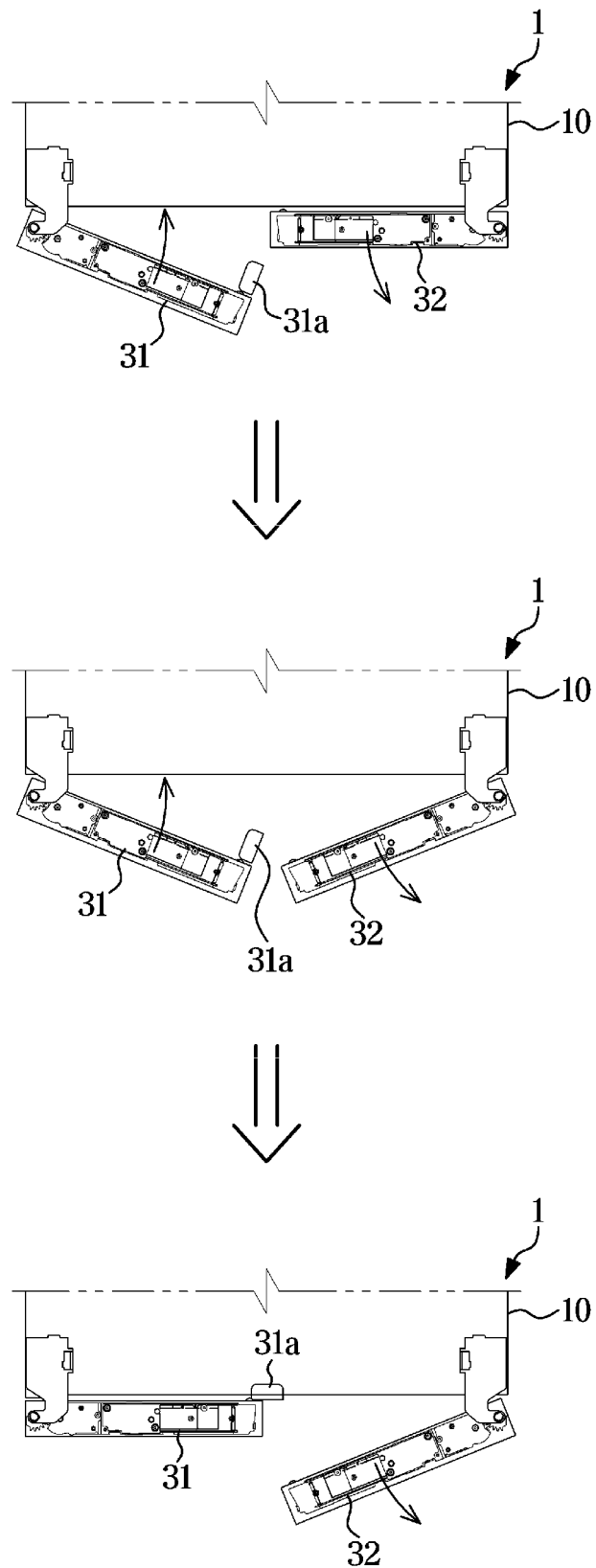
FIG. 28 illustrates an example of a refrigerator opening a second door that has been closed and then closing the second door again while closing a first door, according to an embodiment of the disclosure.

FIG. 27 is a flowchart illustrating how a refrigerator closes first and second doors, according to an embodiment of the disclosure. FIG. 28 illustrates an example of a refrigerator opening a second door that has been closed and then closing the second door again while closing a first door, according to an embodiment of the disclosure.

In conjunction with FIGS. 27 and 28, a method 1400 of the refrigerator 1 closing the first and second doors 31 and 32 will be described.

The first and second doors 31 and 32 of the refrigerator 1 may be in the opened state, in 1410. The refrigerator 1 may identify whether a signal to close both the first and second doors 31 and 32 is obtained or whether to close both the first and second doors 31 and 32, in 1420.

The operations 1410 and 1420 may be the same as the operations 1010 and 1020 shown in FIG. 17, respectively.

When the signal (or determination) to close both the first and second doors 31 and 32 is identified in 1420, the refrigerator 1 may start closing the first and second doors 31 and 32, in 1430.

The processor 290 may control the first and second driving motors 272 and 282 to close the first and second doors 31 and 32 based on the signal (or determination) to close both the first and second doors 31 and 32.

The refrigerator 1 may identify whether the second door 32 is completely closed, in 1440.

The processor 290 may identify that the second door 32 is completely closed based on an output signal of the second door position sensor 250, or identify that the second door 32 is completely closed based on an output signal of the door close sensor 260.

The processor 290 may identify that the second door 32 is completely closed based on the angle $\Theta 2$ of the second door 32 being '0' based on an output signal of the second door position sensor 250. Furthermore, the processor 290 may identify that the second door 32 is completely closed based on reception of a second close signal from the door close sensor 260.

When the second door 32 is identified as not being completely closed in 1440, the refrigerator 1 may identify whether the first door 31 is completely closed, in 1445.

The processor 290 may identify that the first door 31 is completely closed based on an output signal of the first door position sensor 240, or identify that the first door 31 is completely closed based on an output signal of the door close sensor 260.

The processor 290 may identify that the first door 31 is completely closed based on the angle $\Theta 1$ of the first door 31 being '0' based on an output signal of the second door position sensor 240. Furthermore, the processor 290 may identify that the first door 31 is completely closed based on reception of a first close signal from the door close sensor 260.

When the first and second doors 31 and 32 are identified as not being completely closed in 1445, the refrigerator 1 may continue to close the first and second doors 31 and 32 and identify whether the second door 32 is completely closed, in 1440. When the second door 32 is identified as not being completely closed but the first door 31 is identified as being completely closed in 1445, the refrigerator 1 may continue to close the second door 32 in 1460.

When the second door 32 is identified as being completely closed in 1440, the refrigerator 1 may identify whether the first door 31 is completely closed, in 1450.

The operation 1450 may be the same as the aforementioned operation 1445.

When the first door 31 is identified as not being completely closed in 1450, the refrigerator 1 may open the second door 32 to an extent of a fourth reference angle in 1455.

The processor 290 may control the second driving motor 282 to open the second door 32 to an extent of the fourth reference angle or more when the second door 32 is completely closed before the first door 31 is completely closed, as shown in FIG. 28.

The fourth reference angle may be set experimentally or empirically. For example, the fourth reference angle may be set to a minimum angle of the second door 32 at which the first door 31 may be completely closed without interference with the second door 32. The fourth reference angle may be set depending on e.g., thickness of the first and second doors 31 and 32 and/or the size of the rotating bar 31*a*.

Subsequently, the refrigerator 1 may identify again whether the first door 31 is completely closed, in 1450.

When the first door 31 is identified as being completely closed in 1450, the refrigerator 1 may resume closing the second door 32 in 1460.

The processor 290 may control the second driving motor 282 to resume closing the second door 32 after the first door 31 is completely closed, as shown in FIG. 28.

The refrigerator 1 may complete closing the first and second doors 31 and 32 sequentially, in 1470.

The processor 290 may open the second door 32 based on the closed state of the second door 32 before closing the first door 31, and close the second door 32 after closing the first door 31. Accordingly, the first door 31 may be closed first and then the second door 32 may be closed.

As such, the refrigerator 1 may open the second door 32 again when the second door 32 has been completely closed before the first door 31 is completely closed, thereby closing the second door 32 completely after complete closing of the first door 31. Hence, the refrigerator 1 may completely close both the first and second doors 31 and 32 without interference between the first and second doors 31 and 32.

Figure 29:
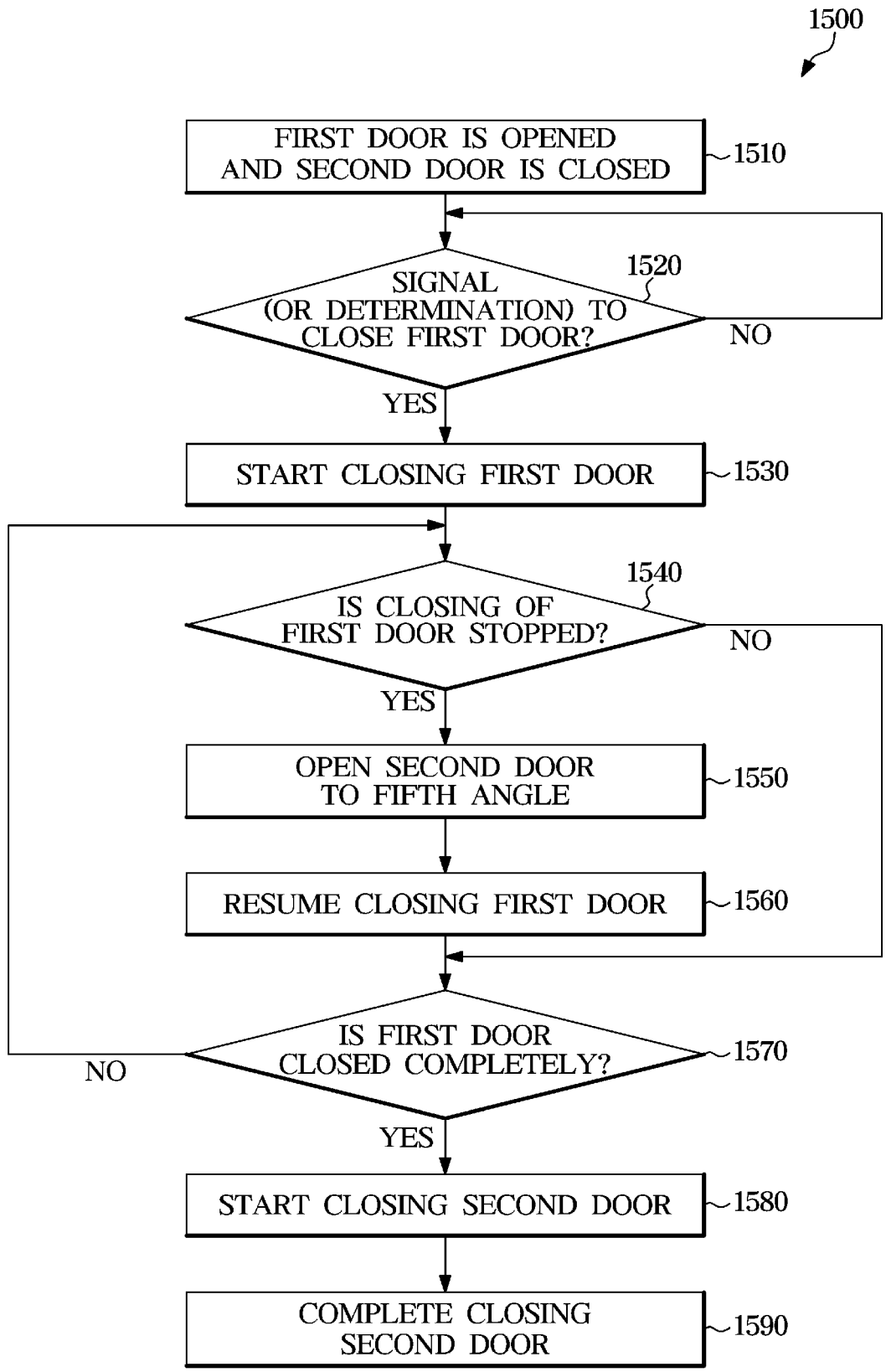
FIG. 29 is a flowchart illustrating how a refrigerator closes first and second doors, according to an embodiment of the disclosure.
Figure 30:
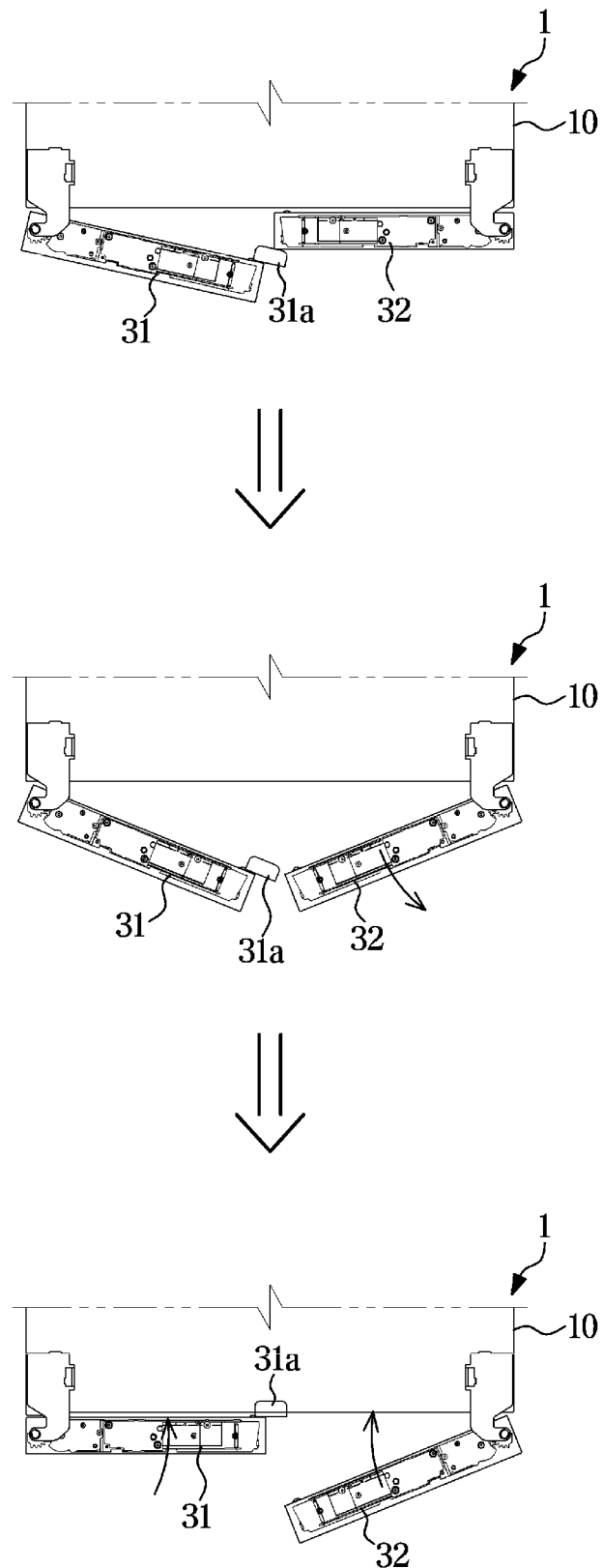
FIG. 30 illustrates an example of a refrigerator closing a first door after opening a second door that has been closed, according to an embodiment of the disclosure.

FIG. 29 is a flowchart illustrating how a refrigerator closes first and second doors, according to an embodiment of the disclosure. FIG. 30 illustrates an example of a refrigerator opening a second door that has been closed and then closing the second door again while closing a first door, according to an embodiment of the disclosure.

In conjunction with FIGS. 29 and 30, a method 1500 of the refrigerator 1 closing the first and second doors 31 and 32 will be described.

In the refrigerator 1, the first door 31 may be in the opened state and the second door 32 may be in the closed state, in 1510.

The door 31 may be manually opened by the user, or may be automatically opened by the first door opening/closing device 270. The processor 290 may identify the angle Θ1 of the first door 31 with respect to the hinge shaft based on the output of the first door position sensor 240 while the first door 31 is being opened.

The refrigerator 1 may obtain a signal to close the first door 31, or identify determination to close the first door 31, in 1520.

The user may enter a user input to close the first door 31 through the control panel 210 or by voice. The processor 290 may receive the signal to close the first door 31 from the control panel 210 or the microphone 220 and process the received signal.

The processor 290 may count a time elapsed after the first door 31 is opened. The processor 290 may determine to close the first door 31 when the time counted reaches or exceeds a set reference time.

When the signal (or determination) to close the first door 31 is not identified in 1520, the refrigerator 1 may be on standby with the first door 31 opened.

When the signal (or determination) to close the first door 31 is identified in 1520, the refrigerator 1 may start closing the first door 31, in 1530.

The processor 290 may control the first driving motor 272 to close the first door 31 based on the signal (or determination) to close the first door 31. Specifically, the processor 290 may control the first motor driver 271 for the first driving motor 272 to generate torque to close the first door 31.

The refrigerator 1 may identify whether the closing of the first door 31 is stopped, in 1540.

The processor 290 may identify whether the closing of the first door 31 is stopped based on an output signal of the first motor driver 271 and/or an output signal of the first door position sensor 240.

The processor 290 may identify that the first driving motor 272 provides torque to close the first door 31 based on an output signal of the first motor driver 271 (e.g., a driving current of the first driving motor or an output signal about rotation speed of the first driving motor).

The processor 290 may identify whether the first door 31 is rotated (i.e., whether the first door is closed) based on the output signal of the first door position sensor 240 (e.g., output signals of the first and second position sensors). For example, the processor 290 may identify that the first door 31 is closed based on alternate outputs of the signal '0' (low level signal) and the signal '1' (high level signal) from the first door position sensor 240. On the other hand, the processor 290 may identify that the first door 31 is stopped based on continuous output of the signal '0' (low level signal) or the signal '1' (high level signal) from the first door position sensor 240 without a change in signal.

When identifying that the closing of the first door 31 is stopped in 1540, the refrigerator 1 may stop closing the first door 31 and open the second door 32 to an extent of a fifth reference angle in 1550.

The processor 290 may identify obstruction of the first door 31 based on when the first door 31 is stopped while the first driving motor 272 is providing torque to close the first door 31. Furthermore, the processor 290 may identify that the rotating bar 31*a* of the first door 31 interferes with the second door 32 as shown in FIG. 30, based on when obstruction of the first door 31 is identified and when no object in front of the refrigerator 1 is detected by the object sensor 230.

As such, the processor 290 may control the first driving motor 272 to stop closing the first door 31 based on when the rotating bar 31a of the first door 31 is identified as interfering with the second door 32.

Furthermore, the processor 290 may control the second driving motor 282 to open the second door 32 to an extent of the fifth reference angle to avoid interference between the rotating bar 31a of the first door 32 and the second door 32. The fifth reference angle may be set experimentally or empirically. For example, the fifth reference angle may be set to a minimum angle of the second door 32 at which the first door 31 may be completely closed without interference with the second door 32. The fifth reference angle may be set depending on e.g., thickness of the first and second doors 31 and 32 and/or the size of the rotating bar 31a.

The refrigerator 1 may resume closing the first door 31, in 1560.

The processor 290 may control the first driving motor 272 to resume closing the first door 31 based on the angle Θ2 of the second door 32 larger than the fifth reference angle, as shown in FIG. 30.

The refrigerator 1 may identify whether the closing of the first door 31 is completed, in 1570.

The operation 1570 may be the same as the operation 1445 as shown in FIG. 27.

When the refrigerator 1 identifies that the closing of the first door 31 is not stopped in 1540, the refrigerator 1 may identify whether the first door 31 is completely closed, in 1570.

When the refrigerator 1 identifies that the closing of the first door 31 is not completed in 1570, the refrigerator 1 may identify whether the closing of the first door 31 is stopped, in 1540.

When the first door 31 is identified as being completely closed in 1570, the refrigerator 1 may start closing the second door 32 in 1580.

The processor 290 may control the second driving motor 282 to resume closing the second door 32 after the first door 31 is completely closed, as shown in FIG. 30.

The refrigerator 1 may complete closing the first and second doors 31 and 32 sequentially, in 1590.

The processor 290 may open the second door 32 based on when the first door 31 interferes with the second door 32 that has already been closed, and close the second door 32 after closing the first door 31. Accordingly, the first door 31 may be closed first and then the second door 32 may be closed.

As such, the refrigerator 1 may open the second door 32 again that has already been closed when the rotating bar 31a of the first door 31 interferes with the second door 32, thereby closing the second door 32 completely after complete closing of the first door 31. Hence, the refrigerator 1 may completely close both the first and second doors 31 and 32 without interference between the first and second doors 31 and 32.

Figure 31:
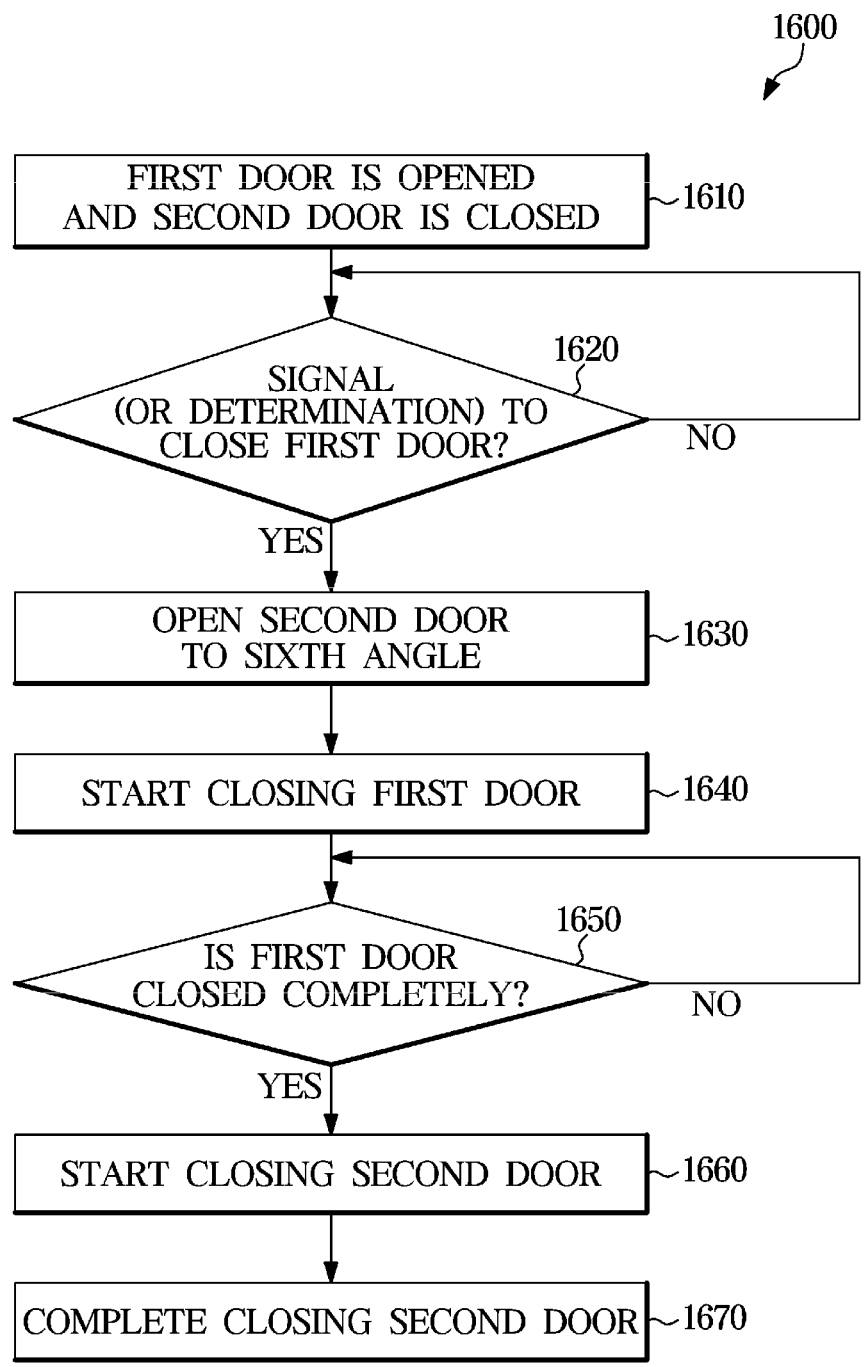
FIG. 31 is a flowchart illustrating how a refrigerator closes first and second doors, according to an embodiment of the disclosure.
Figure 32:
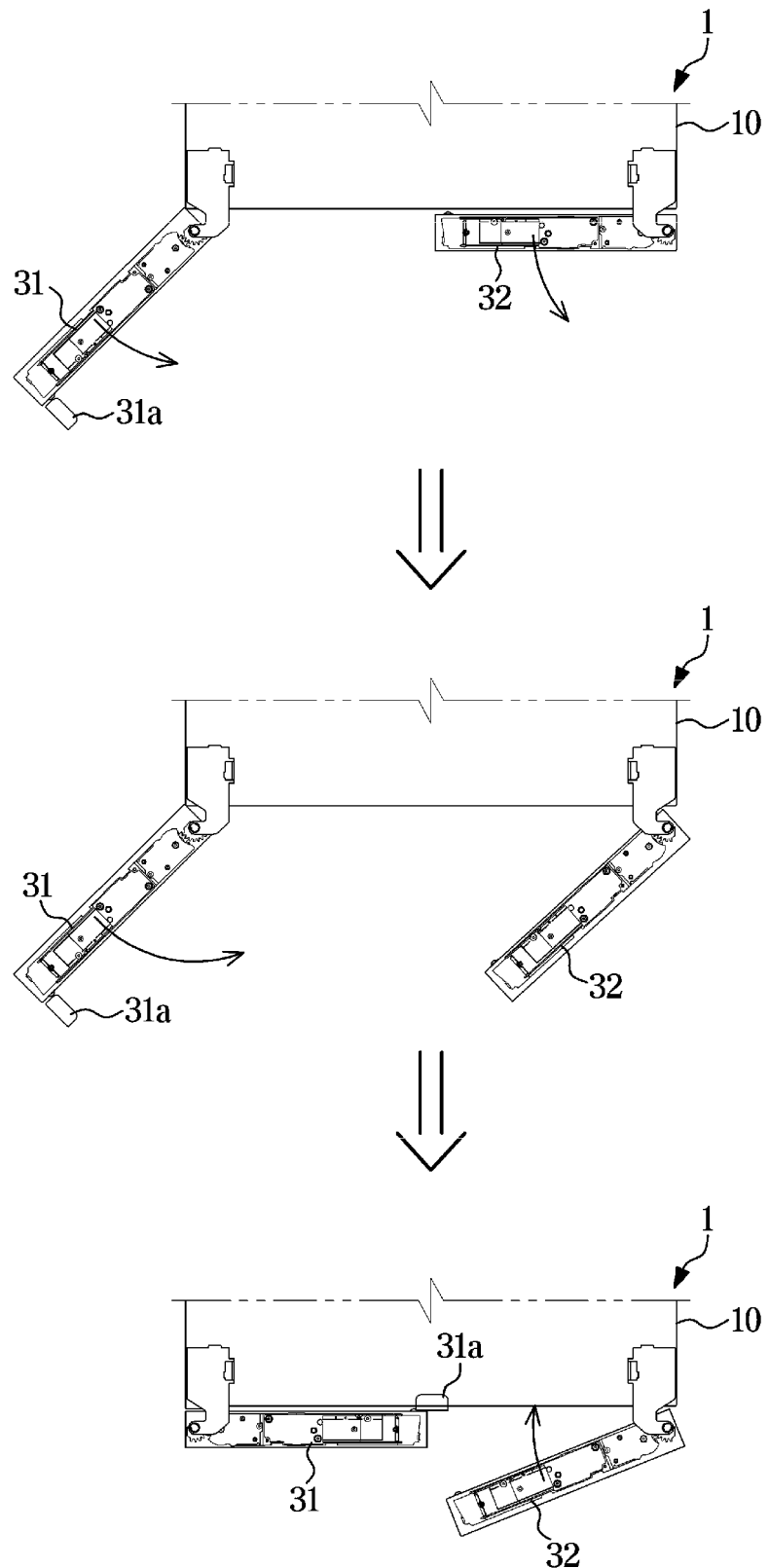
FIG. 32 illustrates an example of a refrigerator closing a first door after opening a second door that has been closed, according to an embodiment of the disclosure.

FIG. 31 is a flowchart illustrating how a refrigerator closes first and second doors, according to an embodiment of the disclosure. FIG. 32 illustrates an example of a refrigerator closing a first door after opening a second door that has been closed, according to an embodiment of the disclosure.

In conjunction with FIGS. 31 and 32, a method 1600 of the refrigerator 1 closing the first and second doors 31 and 32 will be described.

In the refrigerator 1, the first door 31 may be in the opened state and the second door 32 may be in the closed state, in 1610. The refrigerator 1 may obtain a signal to close the first door 31, or identify determination to close the first door 31, in 1620.

The operations 1610 and 1620 may be the same as the operations 1510 and 1520 shown in FIG. 29, respectively.

When the signal (or determination) to close the first door 31 is identified in 1620, the refrigerator 1 may open the second door 32 to an extent of a sixth reference angle, in 1630.

The processor 290 may control the second driving motor 282 to open the second door 32 to an extent of the sixth reference angle to avoid interference between the rotating bar 31a of the first door 32 and the second door 32, as shown in FIG. 32. The sixth reference angle may be set experimentally or empirically. For example, the sixth reference angle may be set to a minimum angle of the second door 32 at which the first door 31 may be completely closed without interference with the second door 32. The sixth reference angle may be set depending on e.g., thickness of the first and second doors 31 and 32 and/or the size of the rotating bar 31a.

The refrigerator 1 may start closing the first door 31, in 1640.

The processor 290 may control the first driving motor 272 to start closing the first door 31 based on the angle Θ2 of the second door 32 larger than the sixth reference angle, as shown in FIG. 32.

The refrigerator 1 may identify whether the closing of the first door 31 is completed, in 1650.

The operation 1650 may be the same as the operation 1445 as shown in FIG. 27.

When the first door 31 is identified as being completely closed in 1650, the refrigerator 1 may start closing the second door 32 in 1660.

The operation 1660 may be the same as the operation 1580 of FIG. 29.

The refrigerator 1 may complete closing the first and second doors 31 and 32 sequentially, in 1670.

The processor 290 may open the second door 32 based on when the second door 32 is closed, and close the second door 32 after closing the first door 31. Accordingly, the first door 31 may be closed first and then the second door 32 may be closed.

As such, the refrigerator 1 may open the second door 32 that has already been closed to avoid interference between the rotating bar 31a of the first door 31 and the second door 32, thereby closing the second door 32 completely after complete closing of the first door 31. Hence, the refrigerator 1 may completely close both the first and second doors 31 and 32 without interference between the first and second doors 31 and 32.

Figure 33:
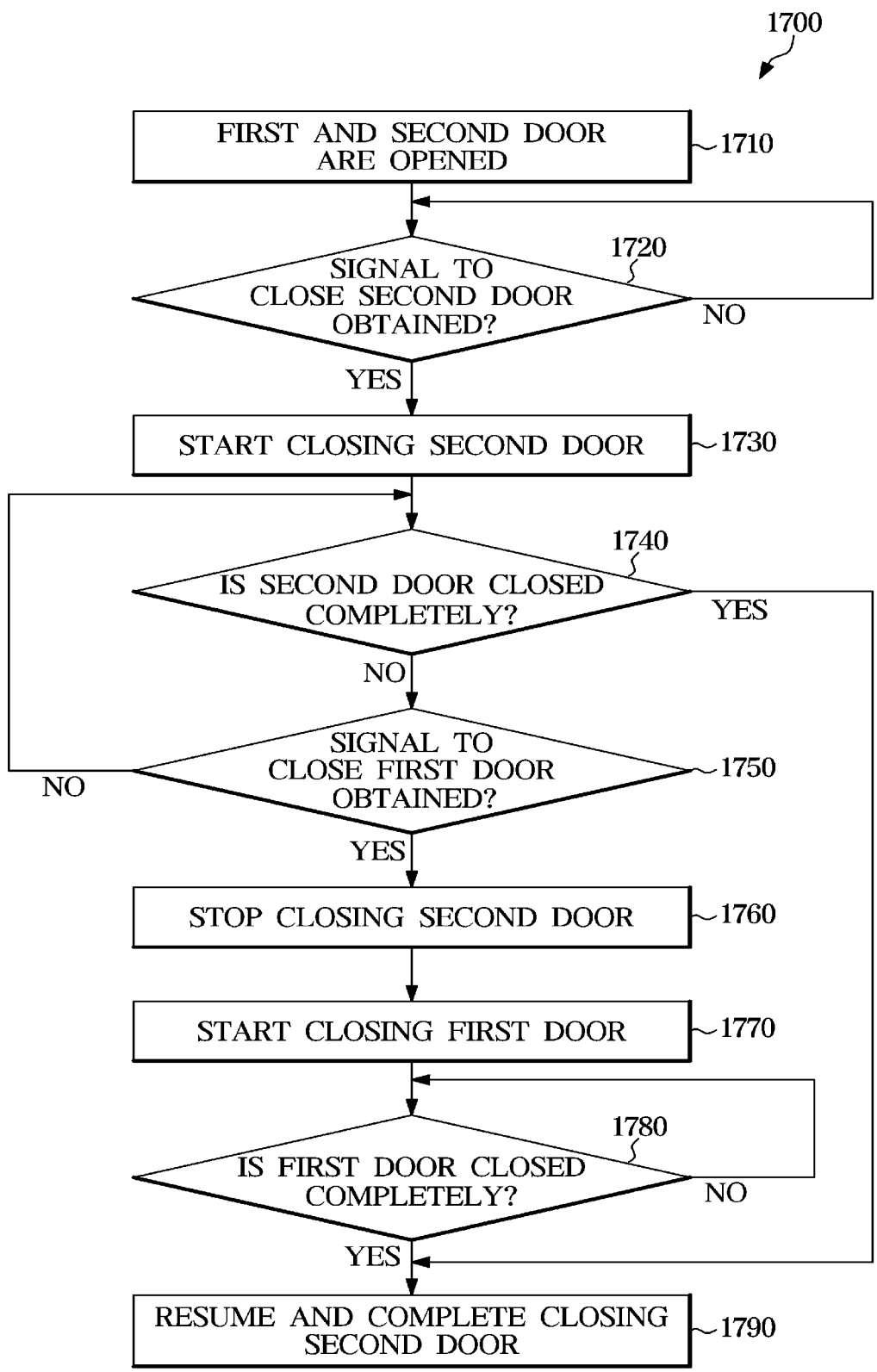
FIG. 33 is a flowchart illustrating how a refrigerator sequentially closes first and second doors, according to an embodiment of the disclosure.

FIG. 33 is a flowchart illustrating how a refrigerator sequentially closes first and second doors, according to an embodiment of the disclosure.

In conjunction with FIG. 33, a method 1700 of the refrigerator 1 sequentially closing the first and second doors 32 and 32 will be described.

The first and second doors 31 and 32 of the refrigerator 1 may be in the opened state, in 1710.

The operation 1710 may be the same as the operation 1010 of FIG. 17.

The refrigerator 1 may identify whether a signal to selectively close the second door 32 is obtained, in 1720.

The user may enter a user input to close the second door 32 through the control panel 210 or by voice. The processor 290 may receive a signal to close only the second door 32 from the control panel 210 or the microphone 220 and process the received signal.

When the signal (or determination) to close the second door 32 is not identified in 1720, the refrigerator 1 may be on standby with the first and second doors 31 and 32 opened.

When the signal (or determination) to close the second door 32 is identified in 1720, the refrigerator 1 may start closing the second door 32, in 1730.

The processor 290 may control the second driving motor 282 to close the second door 32 based on the signal (or determination) to close the second door 32. Specifically, the processor 290 may control the second motor driver 281 for the second driving motor 282 to generate torque to close the second door 32.

The refrigerator 1 may identify whether the second door 32 is completely closed, in 1740.

The operation 1740 may be the same as the operation 1440 of FIG. 27.

When the second door 32 is identified as not being completely closed in 1740, the refrigerator 1 may identify whether a signal to selectively close the first door 31 is obtained, in 1750.

The user may enter a user input to close only the first door 31 through the control panel 210 or by voice. The processor 290 may receive the signal to close only the first door 31 from the control panel 210 or the microphone 220 and process the received signal.

When a signal (or determination) to close the first door 31 is not identified before the second door 32 is completely closed in 1750, the refrigerator 1 may identify whether the second door 32 is completely closed in 1740.

When the signal (or determination) to close the first door 31 is identified in 1750 before the second door 32 is completely closed, the refrigerator 1 may stop closing the second door 32, in 1760.

The processor 290 may control the second driving motor 282 to stop closing the second door 32 to close the first door 31 without interference.

The refrigerator 1 may then start closing the first door 31, in 1770.

The processor 290 may control the first driving motor 272 to start closing the first door 31.

The refrigerator 1 may identify whether the first door 31 is completely closed, in 1780.

The operation 1780 may be the same as the operation 1445 of FIG. 27.

When the first door 31 is identified as not being completely closed in 1780, the refrigerator 1 may resume closing the first door 31.

When the first door 31 is identified as being completely closed in 1780, the refrigerator 1 may resume closing the second door 32 and complete closing the second door 32, in 1790.

The processor 290 may control the second driving motor 282 to resume closing the second door 32.

When the second door 32 is identified as being completely closed in 1740, the refrigerator 1 may identify that the second door 32 is completely closed.

As such, the refrigerator 1 may close the second door 32 completely after complete closing of the first door 31 by stopping closing the second door 32 when a user input to close the second door 32 and a user input to close the first door 31 are entered sequentially. Hence, the refrigerator 1 may completely close both the first and second doors 31 and 32 without interference between the first and second doors 31 and 32.

Figure 34:
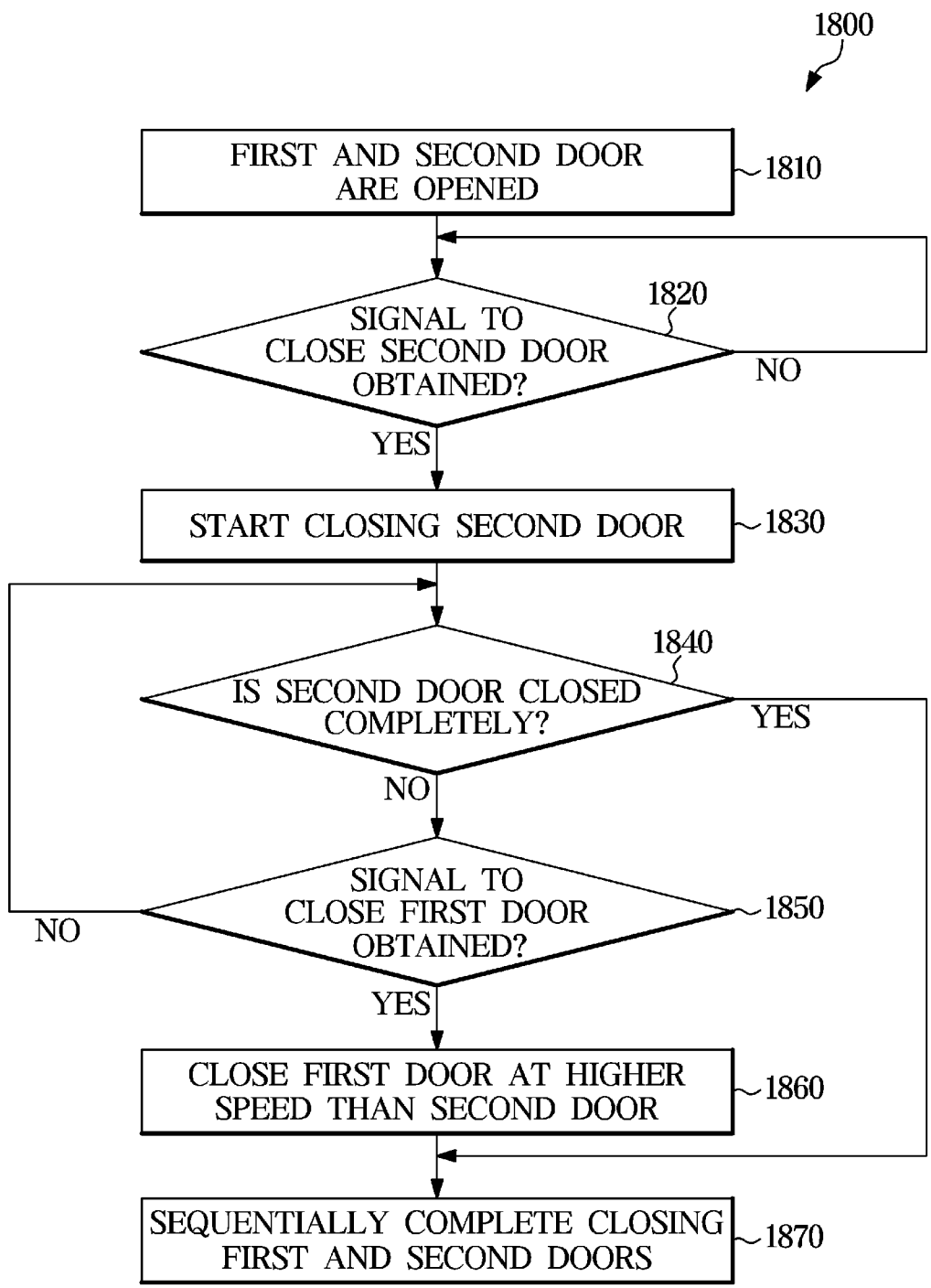
FIG. 34 is a flowchart illustrating how a refrigerator sequentially closes first and second doors, according to an embodiment of the disclosure.

FIG. 34 is a flowchart illustrating how a refrigerator sequentially closes first and second doors, according to an embodiment of the disclosure.

In conjunction with FIG. 34, a method 1800 of the refrigerator 1 sequentially closing the first and second doors 32 and 32 will be described.

The first and second doors 31 and 32 of the refrigerator 1 may be in the opened state, in 1810. The refrigerator 1 may identify whether a signal to selectively close the second door 32 is obtained, in 1820. When the signal (or determination) to close the second door 32 is identified in 1820, the refrigerator 1 may start closing the second door 32, in 1830. Subsequently, the refrigerator 1 may identify whether the second door 32 is completely closed, in 1840. When the second door 32 is identified as not being completely closed in 1840, the refrigerator 1 may identify whether a signal to selectively close the first door 31 is obtained, in 1850.

The operations 1810, 1820, 1840, and 1850 may be the same as the operations 1710, 1720, 1730, 1740 and 1750 shown in FIG. 33, respectively.

When a signal (or determination) to close the first door 31 is not identified before the second door 32 is completely closed in 1850, the refrigerator 1 may identify whether the second door 32 is completely closed in 1840.

When the signal (or determination) to close the first door 31 is identified in 1850 before the second door 32 is completely closed, the refrigerator 1 may close the first door 31 at a higher speed than the speed at which to close the second door 32, in 1860.

The processor 290 may control the first and second driving motors 272 and 282 to close the first door at a higher speed than the second door 32.

For example, the processor 290 may control the second motor driver 281 for the second driving motor 282 for rotating the second door 32 to keep at a rotation speed, and control the first motor driver 271 for the first driving motor 272 for rotating the first door 31 to be rotated faster than the second driving motor 282. The processor 290 may determine the rotation speed of the first driving motor 272 based on the angle Θ1 of the first door 31, the angle Θ2 of the second door 32, and rotation speed of the second driving motor 282.

In another example, the processor 290 may control the second motor driver 281 to decrease the rotation speed of the second driving motor 282, and control the first motor driver 271 to make the first driving motor 272 rotate faster than the second driving motor 282. The processor 290 may determine the rotation speed of the first driving motor 282 and the rotation speed of the second driving motor 282 based on the angle Θ1 of the first door 31 and the angle Θ2 of the second door 32.

The refrigerator 1 may sequentially complete closing the first and second doors 31 and 32, in 1870.

The processor 290 may control the first and second driving motors 272 and 282 to make the speed at which to close the first door 31 higher than the speed at which to close the second door 32. Accordingly, the first door 31 may be closed first and then the second door 32 may be closed.

As such, the refrigerator 1 may close the second door 32 completely after complete closing of the first door 31 by closing the first door 31 at a higher speed than the second door 32 when a user input to close the second door 32 and a user input to close the first door 31 are entered sequentially. Hence, the refrigerator 1 may completely close both the first and second doors 31 and 32 without interference between the first and second doors 31 and 32.

Figure 35:
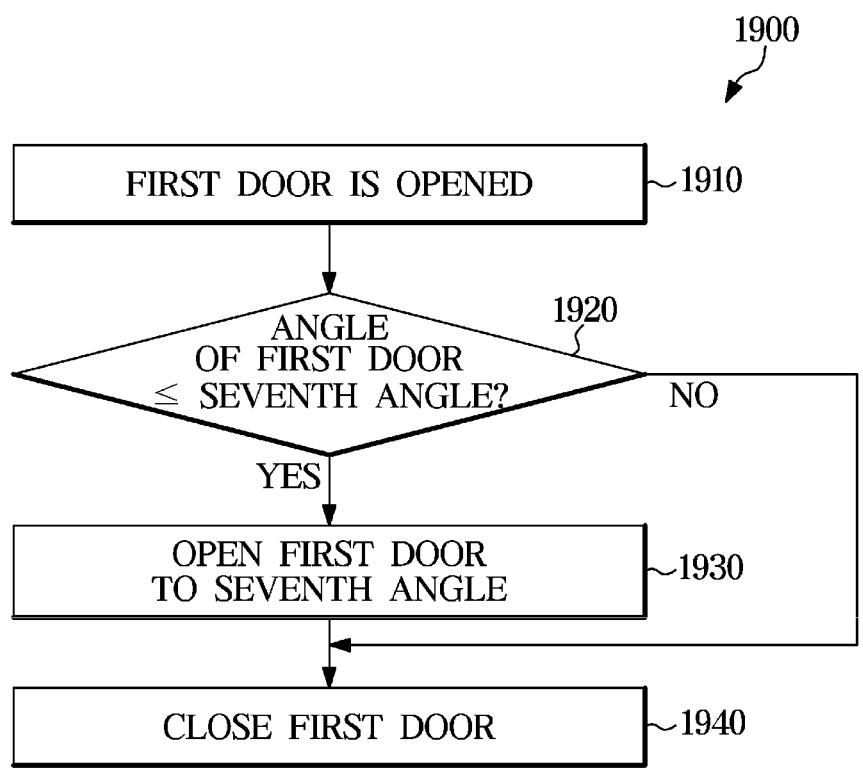
FIG. 35 is a flowchart illustrating how a refrigerator closes a first door, according to an embodiment of the disclosure.
Figure 36:
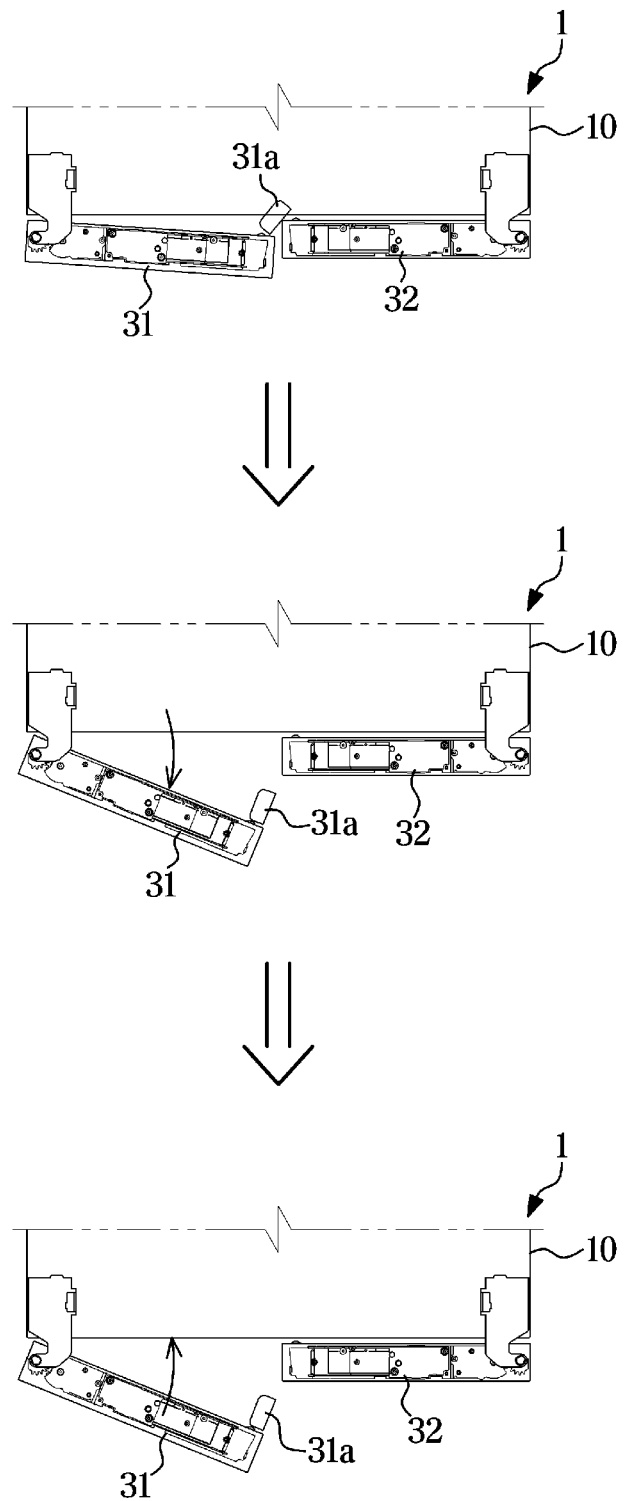
FIG. 36 illustrates an example of a refrigerator closing a first door, according to an embodiment of the disclosure.

FIG. 35 is a flowchart illustrating how a refrigerator closes a first door, according to an embodiment of the disclosure. FIG. 36 illustrates an example of a refrigerator closing a first door, according to an embodiment of the disclosure.

In conjunction with FIGS. 35 and 36, a method 1900 of the refrigerator 1 closing the first door 31 will be described.

In the refrigerator 1, the first door 31 may be in the opened state and the second door 32 may be in the closed state, in 1910.

The operation 1910 may be the same as the operation 1510 of FIG. 29.

The refrigerator 1 may identify whether the angle Θ1 of the first door 31 is smaller than a seventh reference angle, in 1920.

The processor 290 may compare the angle Θ1 of the first door 31 with the seventh reference angle, and identify whether the angle Θ1 of the first door 31 is smaller than the seventh reference angle.

The seventh reference angle may be set to an angle at which the first door 31 may be stably closed. When the first door 31 is closed while the second door 32 is in the closed state, a very heavy load may be applied to the first driving motor 272. For example, a food contained in the door guard 35 of the first door 31 may act as a load to the first driving motor 272. Furthermore, when the first door 31 is closed while the second door 32 is in the closed state, air in the storeroom 30 may be compressed. The compressed air in the storeroom 30 may also act as a load to the first driving motor 272.

For this reason, enough speed and/or momentum is required to stably close the first door 31. Furthermore, an enough angular distance is required to accelerate the first door 31 to enough speed.

The seventh reference angle may be an angle at which the first door 31 is accelerated to the enough speed. The seventh reference angle may be set experimentally or empirically.

When the angle Θ1 of the first door 31 is smaller than the seventh reference angle in 1920, the refrigerator 1 may open the first door 31 to an extent of the seventh reference angle, in 1930.

The processor 290 may control the first driving motor 272 to open the first door 31 to an extent of the seventh reference angle or more when the angle Θ1 of the first door 31 is smaller than the seventh reference angle, as shown in FIG. 36. In other words, the processor 290 may control the first motor driver 271 for the first driving motor 272 to generate torque to open the first door 31 to an extent of the seventh reference angle or more.

The refrigerator 1 may then start closing the first door 31, in 1940. Furthermore, when the angle Θ1 of the first door 31 is not smaller than the seventh reference angle in 1920, the refrigerator 1 may start closing the first door 31, in 1940.

The processor 290 may control the first driving motor 272 to close the first door 31, as shown in FIG. 36. Specifically, the processor 290 may control the first motor driver 271 for the first driving motor 272 to generate torque to close the first door 31.

As such, the refrigerator 1 may open the first door 31 to increase the angle Θ1 of the first door 31 and after this, close the first door 31 when the angle Θ1 of the first door 31 is smaller than a minimum angle for closing the first door 31. Accordingly, the refrigerator 1 may stably close the first door 31.

Figure 37:
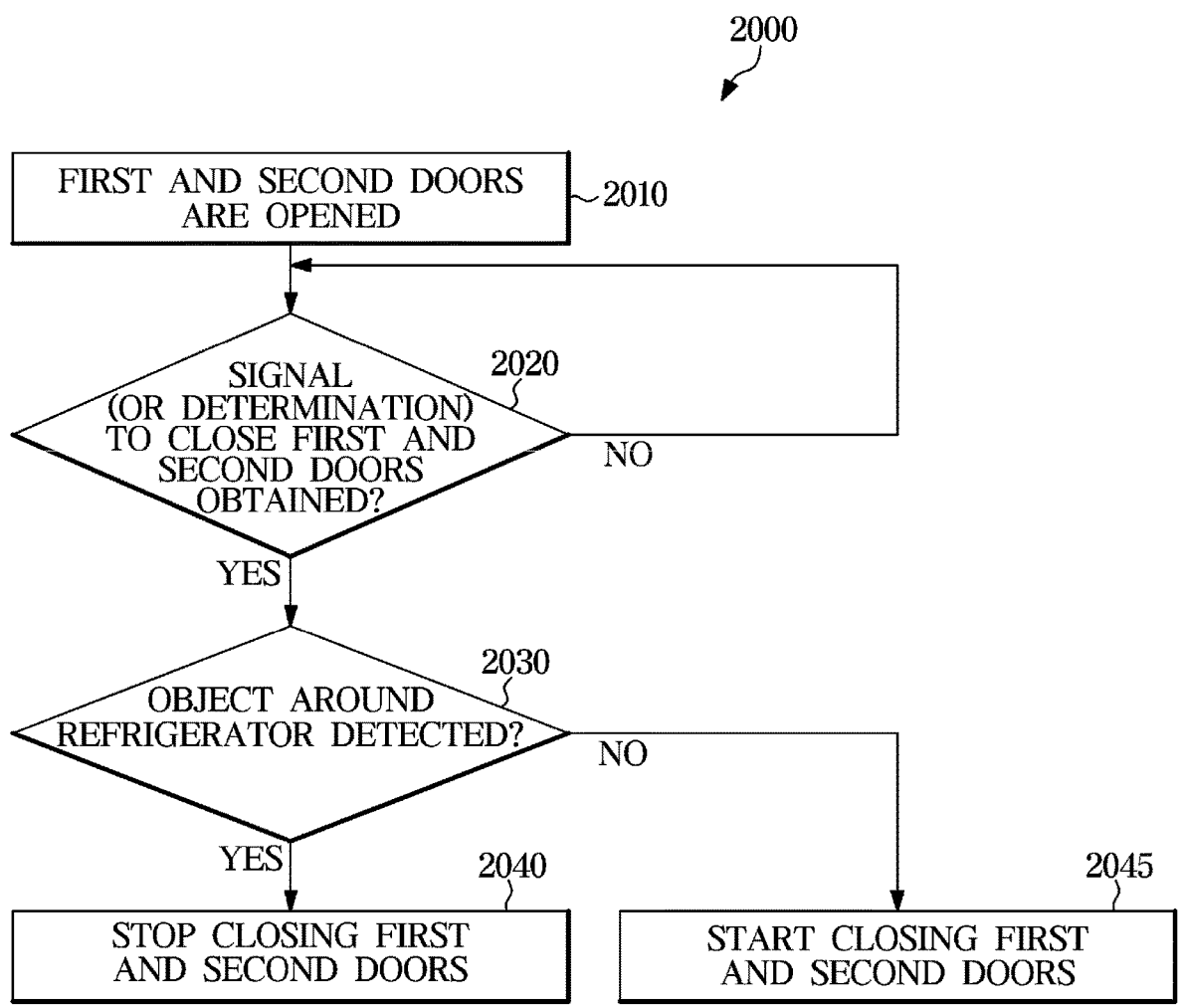
FIG. 37 is a flowchart illustrating how a refrigerator closes first and second doors, according to an embodiment of the disclosure.

FIG. 37 is a flowchart illustrating how a refrigerator closes first and second doors, according to an embodiment of the disclosure.

In conjunction with FIG. 37, a method 2000 of the refrigerator 1 closing the first and second doors 31 and 32 will be described.

The first and second doors 31 and 32 of the refrigerator 1 may be in the opened state, in 2010. The refrigerator 1 may identify whether a signal to close both the first and second doors 31 and 32 is obtained or whether to close both the first and second doors 31 and 32, in 2020.

The operations 2010 and 2020 may be the same as the operations 1010 and 1020 shown in FIG. 17, respectively.

The refrigerator 1 may identify whether there is an object detected around the refrigerator 1, in 2030.

The processor 290 may identify an object located in front of the refrigerator 1 based on an output signal of the object sensor 230. For example, the processor 290 may identify whether there is an object that may interfere with opening or closing the first door 31 or the second door 32.

When the object around the refrigerator 1 is detected in 2030, the refrigerator 1 may stop closing the first and second doors 31 and 32 in 2040.

The processor 290 may not start closing the first and second doors 31 and 32 when not starting to close the first and second doors 31 and 32. Furthermore, the processor 290 may control the first and second driving motors 272 and 282 to stop closing the first and second doors 31 and 32 when the first and second doors 31 and 32 are being closed.

When no object is detected around the refrigerator 1 in 2030, the refrigerator 1 may start closing the first and second doors 31 and 32 in 2045.

The processor 290 may control the first and second driving motors 272 and 282 to start closing the first and second doors 31 and 32.

As such, the refrigerator 1 may identify whether there is an object in the front, which is likely to interfere with opening or closing the first door 31 or the second door 32, and may stop closing the first and second doors 31 and 32 based on when there is the object in front of the refrigerator 1.

Figure 38:
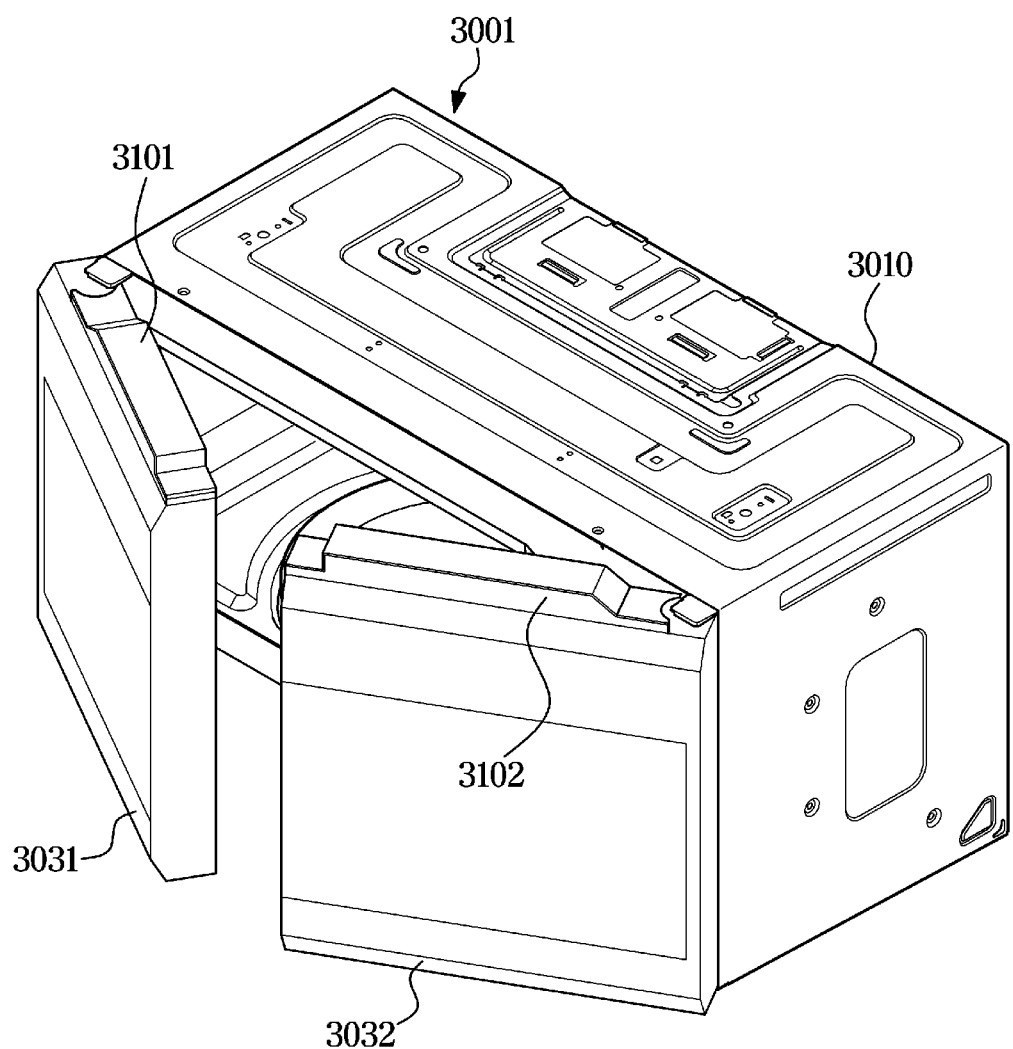
FIG. 38 illustrates an oven as an example of an electric apparatus, according to an embodiment of the disclosure.
Figure 39:
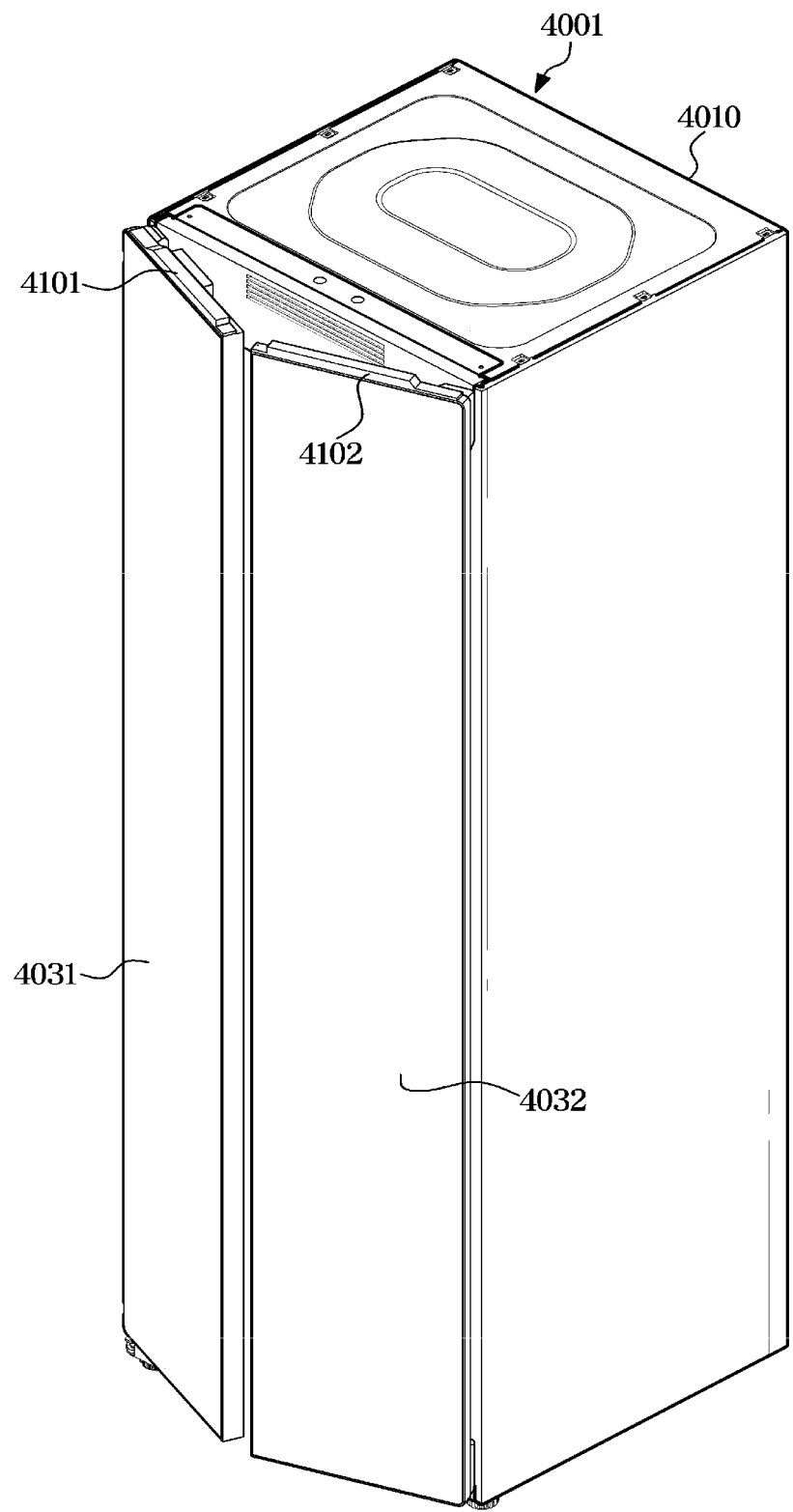
FIG. 39 illustrates a garment care system as an example of an electric apparatus, according to an embodiment of the disclosure.
Figure 40:
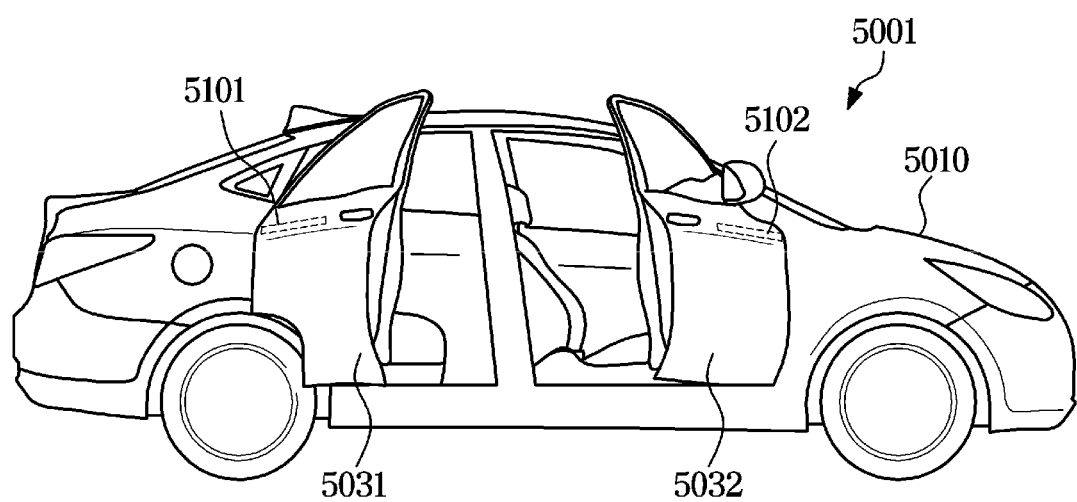
FIG. 40 illustrates a vehicle as an example of an electric apparatus, according to an embodiment of the disclosure.

FIG. 38 illustrates an oven as an example of an electric apparatus, according to an embodiment of the disclosure. FIG. 39 illustrates a garment care system as an example of an electric apparatus, according to an embodiment of the disclosure. FIG. 40 illustrates a vehicle as an example of an electric apparatus, according to an embodiment of the disclosure.

As described above, an electric apparatus according to the disclosure is not limited to the refrigerator, but may be any device that includes swing double doors.

For example, the electric apparatus may be an oven 3001 as shown in FIG. 38.

The oven 3001 may include a first door 3031 and a second door 3032 rotationally installed respectively at both ends of the front of a main body 3010. The oven 3001 may further include a first door opening/closing device 3101 that is able to open or close the first door 3031, and a second door opening/closing device 3102 that is able to open or close the second door 3032.

The oven 3001 may control the first and/or second door opening/closing devices 3101 and/or 3102 to open or close the first and/or second doors 3031 and/or 3032 in response to a user input.

The oven 3001 may control the first and/or second door opening/closing devices 3101 and/or 3102 to close the first and second doors 3031 and 3032 sequentially based on a signal to close both the first and second doors 3031 and 3032.

In another example, the electric apparatus may be a garment care system 4001 as shown in FIG. 39.

The garment care system 4001 may include a first door 4031 and a second door 4032 rotationally installed respectively at both ends of the front of a main body 4010. The garment care system 4001 may further include a first door opening/closing device 4101 that is able to open or close the first door 4031, and a second door opening/closing device 4102 that is able to open or close the second door 4032.

The garment care system 4001 may control the first and/or second door opening/closing devices 4101 and/or 4102 to open or close the first and/or second doors 4031 and/or 4032 in response to a user input.

The garment care system 4001 may control the first and/or second door opening/closing devices 4101 and/or 4102 to close the first and second doors 4031 and 4032 sequentially based on a signal to close both the first and second doors 4031 and 4032.

In another example, the electric apparatus may be a vehicle 5001 as shown in FIG. 40.

The vehicle 5001 may include a first door 5031 and a second door 5032 rotationally installed on a side of a car body 5010. The vehicle 5001 may further include a first door opening/closing device 5101 that is able to open or close the first door 5031, and a second door opening/closing device 5102 that is able to open or close the second door 5032.

The vehicle 5001 may control the first and/or second door opening/closing devices 5101 and/or 5102 to open or close the first and/or second doors 5031 and/or 5032 in response to a user input.

The vehicle 5001 may control the first and/or second door opening/closing devices 5101 and/or 5102 to close the first and second doors 5031 and 5032 sequentially based on a signal to close both the first and second doors 5031 and 5032.

In an embodiment of the disclosure, an electric apparatus 1, 3001, 4001 or 5001 may include a housing; a first door rotationally arranged on one side of the housing; a second door rotationally arranged on the other side of the housing; a first motor operationally connected to the first door; a second motor operationally connected to the second door; a first motor driver electrically connected to the first motor; a second motor driver electrically connected to the second motor; and a processor electrically connected to the first motor driver and the second motor driver. The processor may control the first and second motor drivers to close the first and second doors at different times.

Hence, both the first and second doors may be completely closed without interference between the first and second doors.

The processor may control the first and second motor drivers to close the first door at a different time from the second door based on a user input to close both the first and second doors.

Hence, both the first and second doors may be completely closed without interference between the first and second doors in response to the user input.

The processor may control the first and second motor drivers to close the first and second doors at different times based on a time for which the first and second doors are opened equal to or more than a reference time.

Hence, both the first and second doors may be completely closed while preventing the first and second doors from being opened for a long time.

The electric apparatus may further include a first position sensor for outputting a first signal corresponding to rotational displacement of the first door; and a second position sensor for outputting a second signal corresponding to rotational displacement of the second door. The processor may be electrically connected to the first position sensor and the second position sensor. The processor may identify the rotational displacement of the first door and the rotational displacement of the second door based on the first signal and the second signal, respectively, and control the first and second motor drivers based on the rotational displacement of the first door and the rotational displacement of the second door.

As such, the electric apparatus may control speed at which to close each of the first and second doors depending on an angle by which each of the first and second doors is opened. Accordingly, the electric apparatus may close the first and second doors more naturally.

The processor may control the first motor driver to start closing the first door, and control the second motor driver to start closing the second door in response to an angle by which the first door is opened smaller than an angle by which the second door is opened and a difference between the angle by which the first door is opened and the angle by which the second door is opened equal to or larger than a first reference angle.

Hence, the refrigerator may completely close the first door without interference with the second door by delaying closing the second door.

The processor may control the first motor driver to start closing the first door, and control the second motor driver to start closing the second door in response to when a time elapsed after starting to close the first door is equal to or larger than a reference time.

Hence, the refrigerator may completely close the first door without interference with the second door by delaying closing the second door.

The processor may control the first and second motor drivers to close the first and second doors at different speeds.

Hence, the refrigerator may completely close the first door without interference with the second door by delaying closing the second door.

The processor may control the first and second motor drivers to close the first and second doors at the same speed based on when an angle by which the first door is opened is smaller than an angle by which the second door is opened. Furthermore, the processor may control the first and second motor drivers to close the first and second doors at different speeds based on when an angle by which the first door is opened is equal to or larger than an angle by which the second door is opened.

Hence, the refrigerator may completely close the first door without interference with the second door by delaying closing the second door.

The processor may control the first and second motor drivers to start closing the first and second doors, control the second motor driver to stop closing the second door while closing the first door, and control the second motor driver to resume closing the second door based on completion of closing the first door.

Hence, the refrigerator may completely close the first door without interference with the second door by temporarily stopping closing the second door to close the first door.

The processor may control the second motor driver to open the second door based on when the second door is completely closed and the first door is being closed, and control the second motor driver to close the second door based on completion of closing the first door.

Hence, the refrigerator may completely close the first door without interference with the second door by temporarily opening the second door to close the first door.

The processor may control the second motor driver to open the second door based on when the second door is completely closed and closing of the first door is stopped, and control the second motor driver to close the second door based on completion of closing the first door.

The processor may control the first and second motor drivers to start closing the first door and stop closing the second door based on a user input to close the first door while the second door is being closed, and control the second motor driver to resume closing the second door based on completion of closing the first door.

Hence, even when the user sequentially inputs commands to close the first and second doors, the refrigerator may completely close the first door without interference with the second door.

The processor may control the first and second motor drivers to close the first and second doors at different speeds based on a user input to close the first door while the second door is being closed.

Hence, even when the user sequentially inputs commands to close the first and second doors, the refrigerator may completely close the first door without interference with the second door.

In an embodiment of the disclosure, a control method of an electric apparatus 1, 3001, 4001 or 5001 including a housing, a first door rotationally installed on one side of the housing, and a second door rotationally installed on the other side of the housing may include receiving a signal to close both the first and second doors; and closing the first door at a different time from the second door based on the signal.

The closing of the first door at the different time from the second door may include starting to close the first door, and starting to close the second door in response to an angle by which the first door is opened smaller than an angle by which the second door is opened and a difference between the angle by which the first door is opened and the angle by which the second door is opened equal to or larger than a first reference angle.

The closing of the first door at the different time from the second door may include starting to close the first door, and starting to close the second door in response to a time elapsed after starting to close the first door equal to or larger than a reference time.

The closing of the first door at the different time from the second door may include closing the first and second doors at different speeds.

The closing of the first door at the different time from the second door may include closing the first and second doors at the same speed based on when an angle by which the first door is opened is smaller than an angle by which the second door is opened, and closing the first and second doors at different speeds based on when an angle by which the first door is opened is equal to or larger than an angle by which the second door is opened.

The closing of the first door at the different time from the second door may include starting to close the first and second doors, stopping closing the second door while closing the first door, and resuming closing the second door based on completion of closing the first door.

In an embodiment of the disclosure, an electric apparatus 1, 3001, 4001 or 5001 may include a housing; a first door rotationally arranged on one side of the housing; a second door rotationally arranged on the other side of the housing; a first motor operationally connected to the first door; a second motor operationally connected to the second door; a first motor driver electrically connected to the first motor; a second motor driver electrically connected to the second motor; and a processor electrically connected to the first motor driver and the second motor driver. The processor may control the first and second motor drivers to sequentially close the first and second doors based on a signal or determination to close both the first and second doors.

According to embodiments of the disclosure, provided are an electric apparatus capable of automatically opening or closing doors without interference with each other and a control method of the electric apparatus.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

The machine-readable storage medium may be provided in the form of a non-transitory storage medium. Here, when a storage medium is referred to as "non-transitory," it may be understood that the storage medium is tangible and does not include a signal, but rather that data is semi-permanently or temporarily stored in the storage medium.

According to one embodiment, the methods according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed through an application store (e.g., Play Store™) online. In the case of online distribution, at least a portion of the computer program product may be stored at least semi-permanently or may be temporarily generated in a storage medium, such as a memory of a server of a manufacturer, a server of an application store, or a relay server.

Although embodiments of the present disclosure have been described with reference to the accompanying drawings, those skilled in the art will appreciate that these inventive concepts may be embodied in different forms without departing from the scope and spirit of the disclosure, and should not be construed as limited to the embodiments set forth herein.

What is claimed is:

1. An electric apparatus comprising:
a housing;
a first door rotationally arranged on one side of the housing;
a second door rotationally arranged on another side of the housing;
a first motor operationally connected to the first door;
a second motor operationally connected to the second door;
a first motor driver electrically connected to the first motor;
a second motor driver electrically connected to the second motor; and a processor electrically connected to the first motor driver and the second motor driver, and configured to control the first door and the second door to open or close, respectively,
wherein the processor is configured to:
in response to receiving a user input to automatically close both the first door and the second door, identify whether the first door and the second door are open or closed; and
in response to identifying that the first door is open, control the first motor driver to drive the first motor to close the first door, and control the second motor driver to drive the second motor to close the second door after closing of the first door is completed.

2. The electric apparatus of claim 1, wherein the processor is configured to control the first motor driver to drive the first motor to close the first door at a time different than a time the second door closes based on a time during which the first door is open and a time during which the second door is open being equal to or more than a reference time.

3. The electric apparatus of claim 1, further comprising:
a first position sensor configured to output a first signal corresponding to a rotational displacement of the first door; and
a second position sensor configured to output a second signal corresponding to a rotational displacement of the second door,
wherein the processor is electrically connected to the first position sensor and the second position sensor, and the processor is configured to:
identify the rotational displacement of the first door and the rotational displacement of the second door based on the first signal and the second signal, respectively, and
control the first motor driver and the second motor driver based on the rotational displacement of the first door and the rotational displacement of the second door.

4. The electric apparatus of claim 1, wherein the processor is configured to:
control the first motor driver to drive the first motor to start closing the first door, and
control the second motor driver to drive the second motor to start closing the second door based on an angle of the first door while open being smaller than an angle of the second door while open and a difference between the angle of the first door while open and the angle of the second door while open being equal to or larger than a reference angle.

5. The electric apparatus of claim 1, wherein the processor is configured to:
control the first motor driver to drive the first motor to start closing the first door, and
control the second motor driver to drive the second motor to start closing the second door based on a time elapsed after starting to close the first door being equal to or larger than a reference time.

6. The electric apparatus of claim 1, wherein the processor is configured to control the first motor driver to drive the first motor and the second motor driver to drive the second motor to respectively close the first door and the second door at different speeds.

7. The electric apparatus of claim 1, wherein the processor is configured to:
control the first motor driver to drive the first motor and control the second motor driver to drive the second motor to respectively close the first door and the second door at a same speed based on an angle of the first door while open being smaller than an angle of the second door while open; and
control the first motor driver to drive the first motor and the second motor driver to drive the second motor to respectively close the first door and the second door at different speeds based on an angle of the first door while open being equal to or larger than an angle of the second door while open.

8. The electric apparatus of claim 1, wherein the processor is configured to:
control the first motor driver to drive the first motor and the second motor driver to drive the second motor to respectively start closing the first door and the second door-;
control the second motor driver to stop driving the second motor to stop closing the second door while closing the first door; and
control the second motor driver to resume driving the second motor to close the second door based on completion of closing the first door.

9. The electric apparatus of claim 1, wherein the processor is configured to
while the second door is closed and the first door is opened, control the second motor driver to drive the second motor to open the second door;
in response to opening the second door, control the first motor driver to drive the first motor to close the first door; and
control the second motor driver to drive the second motor to close the second door based on completion of closing the first door.

10. The electric apparatus of claim 1, wherein the processor is configured to:
while the second door is closed, control the first motor driver to drive the first motor to close the first door;
identify whether closing of the first door has stopped;
in response to identifying that the closing of the first door has stopped, control the second motor driver to drive the second motor to open the second door;
in response to opening the second door, control the first motor driver to drive the first motor to close the first door; and
control the second motor driver to drive the second motor to close the second door based on completion of closing the first door.

11. The electric apparatus of claim 1, wherein the processor is configured to:
control the first motor driver to drive the first motor and second motor driver to drive the second motor to start closing the first door and stop closing the second door based on a user input to close the first door while closing the second door, and
control the second motor driver to drive the second motor to resume closing the second door based on completion of closing the first door.

12. The electric apparatus of claim 1, wherein the processor is configured to control the first motor driver to drive the first motor and the second motor driver to drive the second motor to close the first door and the second door at different speeds based on a user input to close the first door while closing the second door.

13. The electric apparatus of claim 1, further comprising a microphone to receive a voice signal, wherein the voice signal includes the user input to automatically close both the first door and the second door.

14. A control method of an electric apparatus including a housing, a first door rotationally arranged on one side of the housing, a second door rotationally arranged on another side of the housing, a first motor operationally connected to the first door, a second motor operationally connected to the second door, a first motor driver electrically connected to the first motor, a second motor driver electrically connected to the second motor, and a processor electrically connected to the first motor driver and the second motor driver, the control method comprising:
- receiving a user input to automatically close both the first door and the second door;
- in response to the receiving of the user input, identifying whether the first door and the second door are open or closed;
- in response to the identifying that the first door is open, controlling, by the processor, the first motor driver to drive the first motor to close the first door; and
- in response to the closing of the first door, controlling the second motor driver to drive the second motor to close the second door to complete the closing of both the first door and the second door.

15. The control method of claim 14, wherein the controlling of the first door to close at a time different than a time the second door closes comprises:
- starting to close the first door, and
- starting to close the second door based on an angle of the first door while open being smaller than an angle of the second door while open and a difference between the angle of the first door while open and the angle of the second door while open being equal to or larger than a reference angle.

16. The control method of claim 14, wherein the controlling of the first door to close at a time different than a time the second door closes comprises:
- starting to close the first door, and
- starting to close the second door based on a time elapsed after starting to close the first door being equal to or larger than a reference time.

17. The control method of claim 14, wherein the controlling of the first door to close at a time different than a time the second door closes comprises:
- closing the first door and the second door at different speeds.

18. The control method of claim 14, wherein the controlling of the first door to close at a time different than a time the second door closes comprises:
- closing the first door and the second door at a same speed based on an angle of the first door while open being smaller than an angle of the second door while open; and
- closing the first door and the second door at different speeds based on an angle of the first door while open being equal to or larger than an angle of the second door while open.

19. The control method of claim 14, wherein the controlling of the first door to close at a time different than a time the second door closes comprises:
- starting to close the first door and the second door;
- stopping to close the second door while closing the first door; and
- closing the second door based on completion of closing the first door.

20. An electric apparatus comprising:
- a housing;
- a first door rotationally arranged on one side of the housing;
- a second door rotationally arranged on another side of the housing;
- a first motor operationally connected to the first door;
- a second motor operationally connected to the second door;
- a first motor driver electrically connected to the first motor;
- a second motor driver electrically connected to the second motor; and
- a processor electrically connected to the first motor driver and the second motor driver, and configured to control the first motor driver to drive the first motor to open or close the first door, and control the second motor driver to drive the second motor to open or close the second door,
- wherein the processor is configured to:
  - in response to receiving a user input to automatically close both the first door and the second door, identify whether the first door is open or closed;
  - in response to identifying that the first door is open, control the second motor driver to drive the second motor to move the second door so that a difference between an angle $\Theta 1$ of the first door and an angle $\Theta 2$ of the second door is equal to or a larger than a reference angle to close the first door without an interference of the second door; and
  - in response to closing the first door, control the second motor driver to drive the second motor to close the second door to complete the closing of both the first door and the second door automatically,
- wherein the angle $\Theta 1$ of the first door is an angle between a position at which the first door is closed and a position at which the first door is opened, and
- wherein the angle $\Theta 2$ of the second door is an angle between a position at which the second door is closed and a position at which the second door is opened.

21. The electric apparatus of claim 20, further comprises a rotating bar arranged at an edge of the first door to seal a gap between the first door and the second door when both the first door and the second door are closed, and
- wherein the processor is further configured to:
  - in response to identifying that the first door is open, identify whether the rotating bar of the first door interferes with the second door;
  - in response to identifying that the rotating bar interferes with the second door, control the second motor driver to drive the second motor to move the second door the angle equal to or larger than the reference angle;
  - control the first motor driver to drive the first motor to close the first door to place the rotating bar in a position to seal the gap;
  - in response to closing the first door, control the second motor driver to drive the second motor to close the second door to automatically complete the closing of both the first door and the second door.

22. The electric apparatus of claim 20, further comprising a microphone to receive a voice signal, wherein the voice signal includes the user input to automatically close both the first door and the second door.

* * * * *